(12) United States Patent
Li et al.

(10) Patent No.: US 11,922,639 B2
(45) Date of Patent: Mar. 5, 2024

(54) HDR IMAGE GENERATION FROM SINGLE-SHOT HDR COLOR IMAGE SENSORS

(71) Applicant: Dolby Laboratories Licensing Corporation, San Francisco, CA (US)

(72) Inventors: Yuelong Li, San Jose, CA (US); Jon Scott McElvain, Manhattan Beach, CA (US); Mohammad Tofighi, San Jose, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 597 days.

(21) Appl. No.: 16/972,597

(22) PCT Filed: Jun. 4, 2019

(86) PCT No.: PCT/US2019/035454
§ 371 (c)(1),
(2) Date: Dec. 6, 2020

(87) PCT Pub. No.: WO2019/236626
PCT Pub. Date: Dec. 12, 2019

(65) Prior Publication Data
US 2021/0248758 A1     Aug. 12, 2021

Related U.S. Application Data

(60) Provisional application No. 62/837,361, filed on Apr. 23, 2019, provisional application No. 62/681,789, filed on Jun. 7, 2018.

(30) Foreign Application Priority Data

Jun. 7, 2018   (EP) .................................. 18176403

(51) Int. Cl.
G06T 7/246   (2017.01)
G06T 7/55    (2017.01)
(Continued)

(52) U.S. Cl.
CPC ............ G06T 7/248 (2017.01); G06T 3/4015 (2013.01); G06T 7/55 (2017.01); H04N 23/12 (2023.01);
(Continued)

(58) Field of Classification Search
CPC ...... H04N 23/73; H04N 23/741; H04N 25/58; H04N 25/581; H04N 25/583;
(Continued)

(56) References Cited

U.S. PATENT DOCUMENTS 7,940,282 B2   5/2011  Milanfar
8,059,174 B2  11/2011  Mann
(Continued)

FOREIGN PATENT DOCUMENTS

CN   101465966 A   6/2009
CN   101764959 A   6/2010
(Continued)

OTHER PUBLICATIONS

Haraldsoon, H. et al."Reconstruction of a High Dynamic Range and High Resolution Image from a Multisampled Image Sequence" IEEE on Image Analysis and Processing, Sep. 10-14, 2007.
(Continued)

Primary Examiner — Ian L Lemieux
Assistant Examiner — Woo C Rhim

(57) ABSTRACT

A method for generating an high-dynamic-range (HDR) color image from a dual-exposure-time single-shot HDR color image sensor includes obtaining pixel values generated by a local region of sensor pixels of the image sensor, determining a motion parameter for the local region from
(Continued)

US 11,922,639 B2

Page 2 pixel values associated with a first color, and demosaicing the pixel values of the local region to determine, for each of three colors, an output value of the images pixel, wherein relative contributions of short-exposure-time pixels and long-exposure-time pixels to the output value are weighted according to the motion parameter. A method for generating an HDR color image from a triple-exposure-time single-shot HDR color image sensor includes generating a first dual-exposure-time HDR image from short-exposure-time and medium-exposure-time pixel values, generating a second dual-exposure-time HDR image from medium-exposure-time and long-exposure-time pixel values, and generating a triple-exposure-time HDR color image from the first and second dual-exposure-time HDR images.

26 Claims, 22 Drawing Sheets

(51) Int. Cl.
  *H04N 23/12* (2023.01)
  *H04N 23/741* (2023.01)
(52) U.S. Cl.
  CPC . *H04N 23/741* (2023.01); *G06T 2207/10024* (2013.01); *G06T 2207/20224* (2013.01)
(58) Field of Classification Search
  CPC .. H04N 25/533; H04N 25/535; H04N 25/587; H04N 25/589; H04N 23/70; H04N 23/71; H04N 23/84; H04N 23/843; H04N 25/46; G06T 5/007; G06T 2207/20208; G06T 2207/10144; G06T 5/002; G06T 5/003; G06T 3/4015
  See application file for complete search history.

(56) References Cited

U.S. PATENT DOCUMENTS

| | | | |
|---|---|---|---|
| 8,073,246 B2 | 12/2011 | Adams, Jr. | |
| 8,159,579 B2 | 4/2012 | Jannard | |
| 8,368,771 B2 | 2/2013 | Kino | |
| 8,405,750 B2 | 3/2013 | Smith | |
| 8,462,221 B2 | 6/2013 | Morales | |
| 8,730,359 B2 | 5/2014 | Sharman | |
| 8,749,646 B2 | 6/2014 | Mitsunaga | |
| 8,913,153 B2 | 12/2014 | Li | |
| 9,040,892 B2 | 5/2015 | Smith | |
| 9,055,178 B2 * | 6/2015 | Hirakawa | H04N 23/10 |
| 9,160,936 B1 * | 10/2015 | Rivard | H04N 23/741 |
| 9,344,639 B2 | 5/2016 | Musatenko | |
| 9,578,223 B2 | 2/2017 | Luo | |
| 9,813,635 B2 | 11/2017 | Richards | |
| 9,832,388 B2 | 11/2017 | Motta | |
| 2012/0257079 A1 * | 10/2012 | Ninan | H04N 5/265 348/222.1 |
| 2013/0063622 A1 * | 3/2013 | Schoeberl | H04N 25/583 348/222.1 |
| 2014/0063300 A1 | 3/2014 | Lin | |
| 2014/0152694 A1 * | 6/2014 | Narasimha | G06T 5/008 345/629 |
| 2014/0184894 A1 * | 7/2014 | Motta | H04N 25/134 348/362 |
| 2014/0340553 A1 * | 11/2014 | Kuang | H04N 25/583 348/302 |
| 2015/0062368 A1 * | 3/2015 | Li | H04N 25/46 348/222.1 |
| 2016/0104270 A1 * | 4/2016 | Blonde | H04N 23/743 382/167 |
| 2017/0041542 A1 * | 2/2017 | Ono | H04N 23/6811 |
| 2017/0104942 A1 | 4/2017 | Hirota | |
| 2017/0238029 A1 | 8/2017 | Kiser | |
| 2017/0339325 A1 | 11/2017 | Dabral | |
| 2019/0305018 A1 * | 10/2019 | Price | H04N 25/75 |
| 2021/0327931 A1 * | 10/2021 | Price | H01L 27/14605 |

FOREIGN PATENT DOCUMENTS

| | | | | |
|---|---|---|---|---|
| CN | 101867727 | A | 10/2010 | |
| CN | 202535464 | U | 11/2012 | |
| CN | 102970488 | A | 3/2013 | |
| CN | 202856877 | U | 4/2013 | |
| CN | 103141081 | A | 6/2013 | |
| CN | 103190145 | A | 7/2013 | |
| CN | 103945145 | A | 7/2014 | |
| CN | 103973989 | A | 8/2014 | |
| CN | 104184965 | B | 12/2014 | |
| CN | 104349070 | B | 2/2015 | |
| CN | 104639920 | A | 5/2015 | |
| CN | 105323498 | A | 2/2016 | |
| CN | 107395998 | A | 11/2017 | |
| CN | 107409180 | B | 11/2017 | |
| CN | 107925726 | B | 4/2018 | |
| IN | 103856720 | A | 6/2014 | |
| JP | 2004056573 | A | 2/2004 | |
| JP | 2014030073 | A * | 2/2014 | G06T 5/008 |
| JP | 2014220759 | A | 11/2014 | |
| JP | 2014220760 | A | 11/2014 | |
| JP | 2015041984 | A | 3/2015 | |
| JP | 2015508589 | A | 3/2015 | |
| JP | 2015082675 | A | 4/2015 | |
| JP | 2017098784 | A | 6/2017 | |
| WO | WO-2014020970 | A1 * | 2/2014 | G06T 5/008 |
| WO | 2016073797 | | 5/2016 | |

OTHER PUBLICATIONS

Hirakawa, K. et al. "Single-Shot High Dynamic Range Imaging with Conventional Camera Hardware" IEEE International Conference on Computer Vision, Nov. 6-13, 2011.
Hu, J. et al. "HDR Deghosting: How to deal with Saturation?", IEEE conference on Computer Vision and Pattern Recognition, Jun. 23-28, 2013.
Lasang, P. et al. "CFA-Based Motion Blur Removal" ICCE Digest of Technical Papers International Conference on Consumer Electronics, Jan. 9-13, 2010.
Li, Y. et al., "A Maximum A Posteriori Estimation Framework for Robust High Dynamic Range Video Synthesis", IEEE Transactions on Image Processing, vol. 26, issue 3, pp. 1143-1157, Mar. 2017.
Mertens, T. et al Exposure Fusion 15th Pacific Conference on Computer Graphics and Applications, Oct. 29-Nov. 2, 2007, 15th Pacific Conference on Computer Graphics and Applications, pp. 382-390.

* cited by examiner

```
                                    ┌─────────────────────────┐
                                500 │                         │
                                    └─────────────────────────┘

┌─────────────────────────────────────────────────────────────────────────┐
│ OBTAIN PIXEL VALUES GENERATED BY A LOCAL REGION OF RESPECTIVE SENSOR    │
│ PIXELS OF THE DUAL-EXPOSURE-TIME SINGLE-SHOT HDR COLOR IMAGE SENSOR     │
│                                  510                                    │
└─────────────────────────────────────────────────────────────────────────┘
                                     │
                                     ▼
┌─────────────────────────────────────────────────────────────────────────┐
│         FOR EACH COLOR, EVALUATE IF MOTION COMPENSATION IS APPROPRIATE  │
│                                  520                                    │
│  ┌──────────────┐   ┌──────────────┐   ┌──────────────┐                 │
│  │   EVALUATE   │   │   EVALUATE   │   │   EVALUATE   │                 │
│  │  SATURATION  │   │   DISPARITY  │   │   VARIANCE   │                 │
│  │     522      │   │     524      │   │     526      │                 │
│  └──────────────┘   └──────────────┘   └──────────────┘                 │
└─────────────────────────────────────────────────────────────────────────┘
                                                                      NO
                                  YES                                  │
 ┌──────────────────┐              │                                   │
 │ SELECT FIRST COLOR│─────────────┤                                   │
 │       502        │              │                                   │
 └──────────────────┘              ▼                                   │
┌─────────────────────────────────────────────────────────────────────┐ │
│ DETERMINE A MOTION PARAMETER FOR THE LOCAL REGION FROM THE PIXEL    │ │
│ VALUES OF THE SHORT-EXPOSURE-TIME PIXELS AND THE LONG-EXPOSURE-     │ │
│         TIME PIXELS ASSOCIATED WITH A FIRST COLOR                   │ │
│                              530                                    │ │
└─────────────────────────────────────────────────────────────────────┘ │
                                  │                                     │
                                  ▼                                     │
┌─────────────────────────────────────────────────────────────────────┐ │
│ DEMOSAIC THE PIXEL VALUES OF THE LOCAL REGION TO DETERMINE, FOR     │ │
│ EACH COLOR (OR FOR EACH BELOW-SATURATION COLOR), AN OUTPUT VALUE    │ │
│ OF THE IMAGE PIXEL FROM THE SHORT-EXPOSURE-TIME PIXELS AND THE      │ │
│ LONG-EXPOSURE-TIME PIXELS, RELATIVE CONTRIBUTIONS OF THE SHORT-     │ │
│ EXPOSURE-TIME PIXELS AND THE LONG-EXPOSURE-TIME PIXELS TO THE       │ │
│ OUTPUT VALUE BEING WEIGHTED ACCORDING TO THE MOTION PARAMETER       │ │
│                              540                                    │ │
└─────────────────────────────────────────────────────────────────────┘ │
                                                                        ▼
                                              ┌──────────────────────────┐
                                              │   PERFORM NON-MOTION-    │
                                              │ COMPENSATED DEMOSAICING  │
                                              │    TO DETERMINE, FOR     │
                                              │ THE COLOR, THE OUTPUT    │
                                              │ VALUE OF THE IMAGE PIXEL │
                                              │           550            │
                                              └──────────────────────────┘

FIG. 5
```

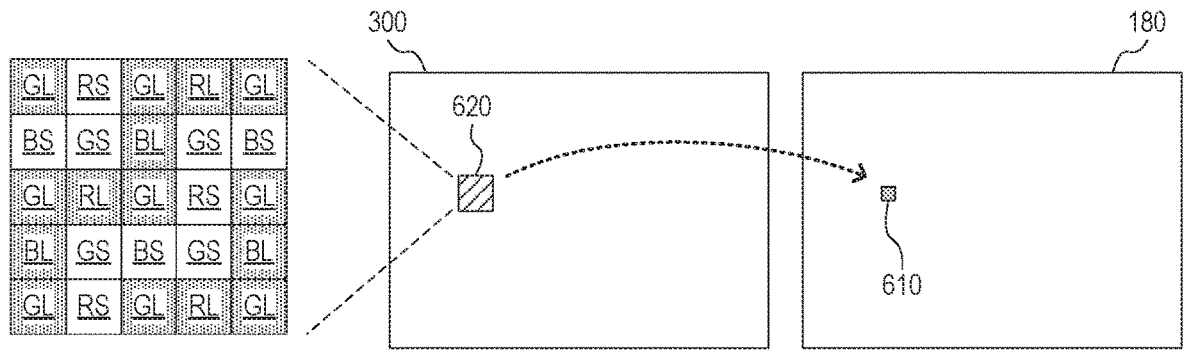
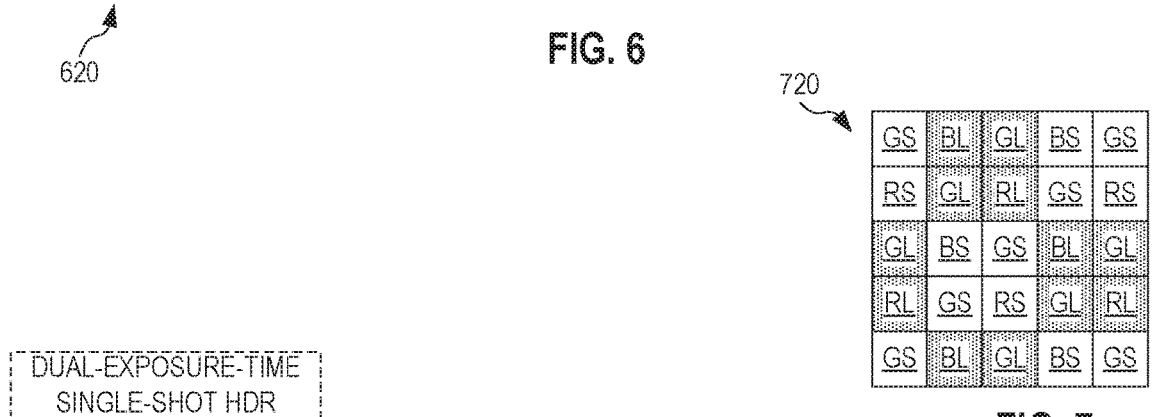
FIG. 6
FIG. 7
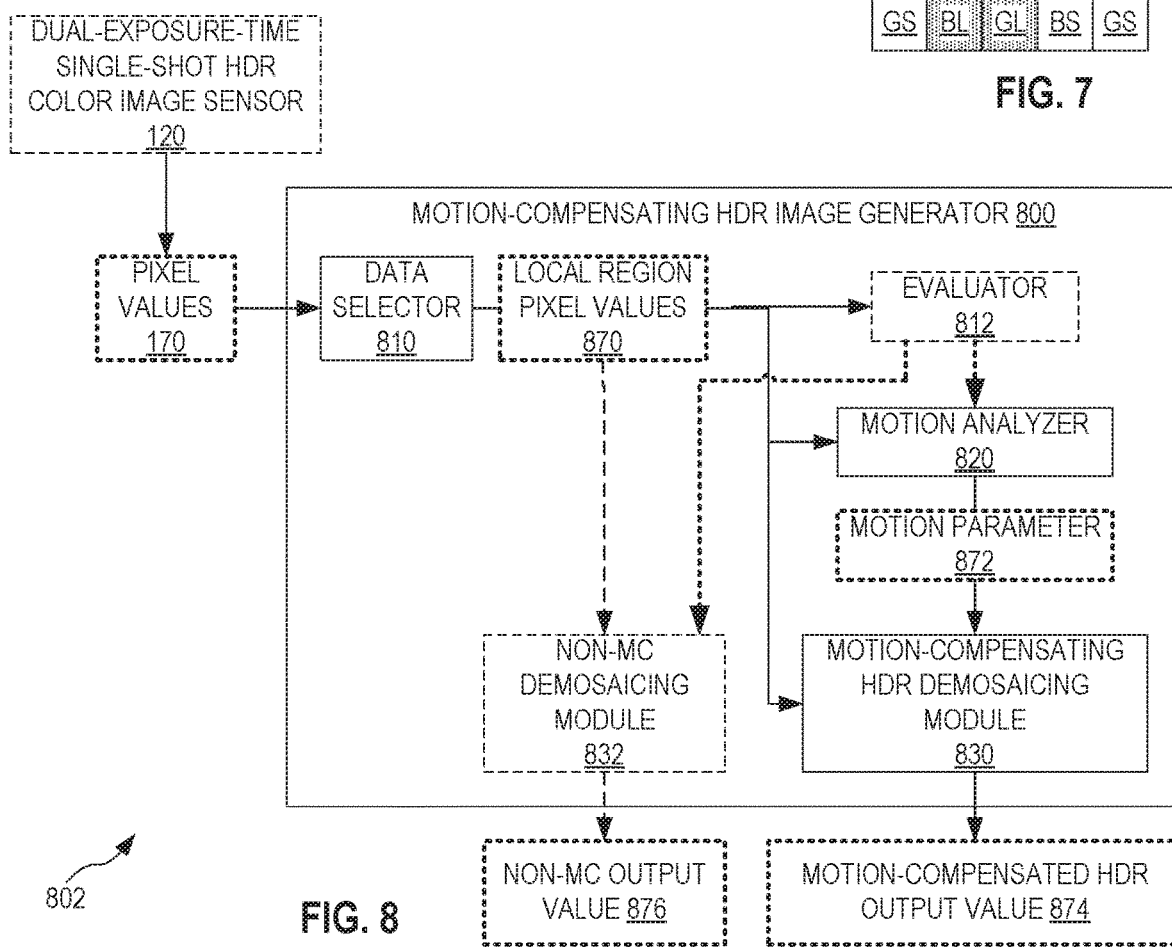
FIG. 8

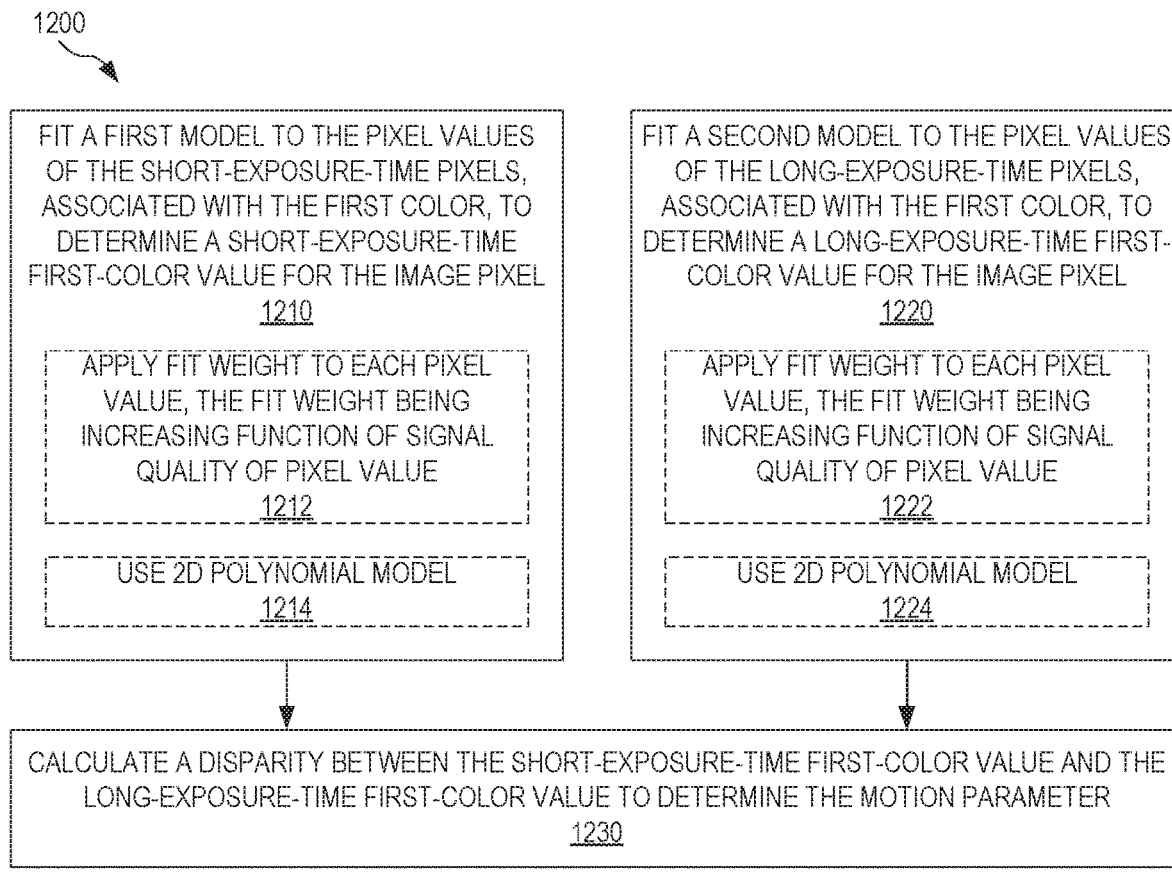
FIG. 12
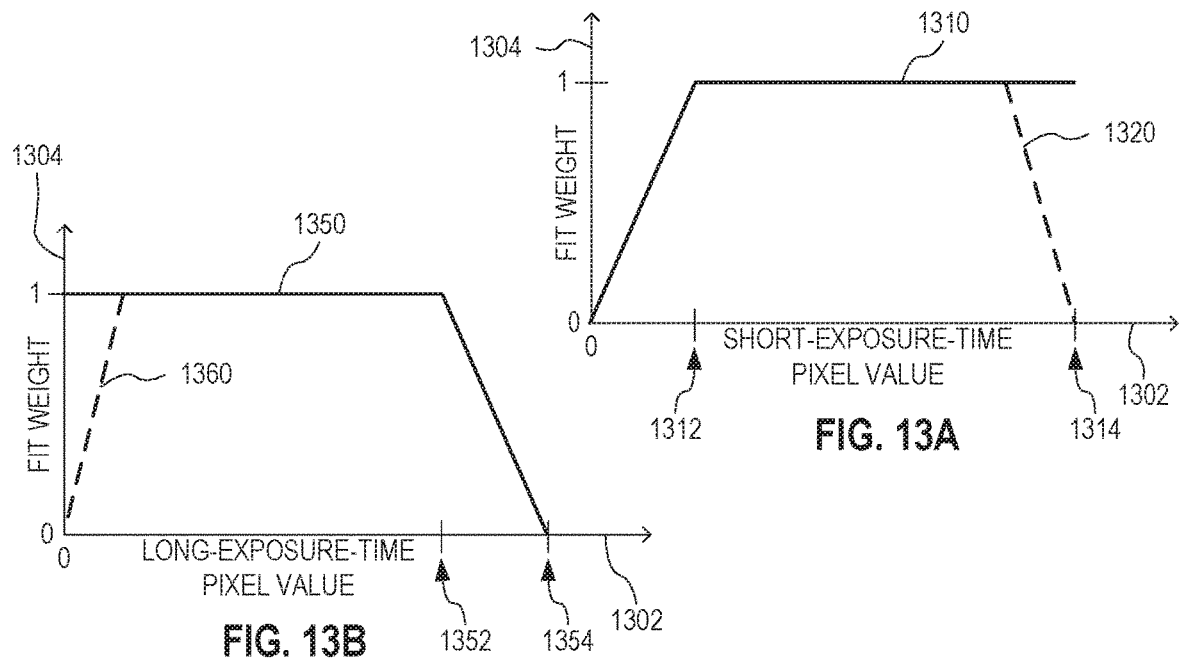
FIG. 13A
FIG. 13B

1400

```
┌─────────────────────────────────────┐   ┌─────────────────────────────────────┐
│ DETERMINE A SHORT-EXPOSURE-TIME     │   │ DETERMINE A LONG-EXPOSURE-TIME VALUE│
│ VALUE FOR THE IMAGE PIXEL BASED UPON│   │ FOR THE IMAGE PIXEL BASED UPON THE  │
│ THE SHORT-EXPOSURE TIME PIXELS      │   │ LONG-EXPOSURE TIME PIXELS ASSOCIATED│
│ ASSOCIATED WITH THE COLOR           │   │ WITH THE COLOR                      │
│ 1410                                │   │ 1420                                │
│                                     │   │                                     │
│  ┌───────────────────────────────┐  │   │  ┌───────────────────────────────┐  │
│  │ FIT A FIRST MODEL TO THE PIXEL│  │   │  │ FIT A SECOND MODEL TO THE PIXEL│ │
│  │ VALUES OF THE SHORT-EXPOSURE- │  │   │  │ VALUES OF THE LONG-EXPOSURE-  │  │
│  │ TIME PIXELS, ASSOCIATED WITH THE│ │   │  │ TIME PIXELS, ASSOCIATED WITH THE│ │
│  │ COLOR, TO DETERMINE A SHORT-  │  │   │  │ COLOR, TO DETERMINE A LONG-   │  │
│  │ EXPOSURE-TIME FIRST-COLOR VALUE│ │   │  │ EXPOSURE-TIME FIRST-COLOR VALUE│ │
│  │ FOR THE IMAGE PIXEL           │  │   │  │ FOR THE IMAGE PIXEL           │  │
│  │ 1412                          │  │   │  │ 1422                          │  │
│  │                               │  │   │  │                               │  │
│  │  ┌─────────────────────────┐  │  │   │  │  ┌─────────────────────────┐  │  │
│  │  │ APPLY FIT WEIGHT TO EACH│  │  │   │  │  │ APPLY FIT WEIGHT TO EACH│  │  │
│  │  │ PIXEL VALUE, THE FIT WEIGHT│ │   │  │  │ PIXEL VALUE, THE FIT WEIGHT│ │  │
│  │  │ BEING INCREASING FUNCTION│ │  │   │  │  │ BEING INCREASING FUNCTION│ │  │
│  │  │ OF SIGNAL QUALITY OF PIXEL││  │   │  │  │ OF SIGNAL QUALITY OF PIXEL││  │
│  │  │ VALUE                   │  │  │   │  │  │ VALUE                   │  │  │
│  │  │ 1414                    │  │  │   │  │  │ 1424                    │  │  │
│  │  └─────────────────────────┘  │  │   │  │  └─────────────────────────┘  │  │
│  │                               │  │   │  │                               │  │
│  │  ┌─────────────────────────┐  │  │   │  │  ┌─────────────────────────┐  │  │
│  │  │ USE 2D POLYNOMIAL MODEL │  │  │   │  │  │ USE 2D POLYNOMIAL MODEL │  │  │
│  │  │ 1416                    │  │  │   │  │  │ 1426                    │  │  │
│  │  └─────────────────────────┘  │  │   │  │  └─────────────────────────┘  │  │
│  └───────────────────────────────┘  │   │  └───────────────────────────────┘  │
│                                     │   │                                     │
│  ┌───────────────────────────────┐  │   │  ┌───────────────────────────────┐  │
│  │ FOR THE FIRST COLOR, USE SHORT-│ │   │  │ FOR THE FIRST COLOR, USE LONG- │ │
│  │ EXPOSURE-TIME FIRST-COLOR VALUE│ │   │  │ EXPOSURE-TIME FIRST-COLOR VALUE│ │
│  │ DETERMINED IN STEP 1210       │  │   │  │ DETERMINED IN STEP 1210       │  │
│  │ 1418                          │  │   │  │ 1428                          │  │
│  └───────────────────────────────┘  │   │  └───────────────────────────────┘  │
└─────────────────────────────────────┘   └─────────────────────────────────────┘
                     │                                       │
                     ▼                                       ▼
┌──────────────────────────────────────────────────────────────────────────────┐
│ CALCULATE THE OUTPUT VALUE AS A WEIGHTED AVERAGE OF THE SHORT-EXPOSURE-TIME  │
│ VALUE AND THE LONG-EXPOSURE-TIME VALUE, USING THE MOTION PARAMETER AS WEIGHT │
│ 1430                                                                         │
└──────────────────────────────────────────────────────────────────────────────┘
```

```
LOCALLY WEIGHT RELATIVE CONTRIBUTIONS, OF THE FIRST AND SECOND DUAL-EXPOSURE-
TIME HDR IMAGES TO THE TRIPLE-EXPOSURE-TIME HDR COLOR IMAGE, AT LEAST PARTLY
BASED UPON AT LEAST ONE OF (A) THE DEGREE OF DISPARITY BETWEEN THE SHORT-
EXPOSURE-TIME AND MEDIUM-EXPOSURE-TIME PIXEL VALUES AND (B) THE DEGREE OF
DISPARITY BETWEEN THE MEDIUM-EXPOSURE-TIME AND LONG-EXPOSURE-TIME PIXEL VALUES
2610
```

```
IN LOCAL REGIONS CHARACTERIZED BY ONE OR MORE LONG-EXPOSURE-TIME PIXEL
VALUES FAILING TO MEET THE BELOW-SATURATION CRITERION, GENERATE THE TRIPLE-
EXPOSURE-TIME HDR IMAGE FROM THE FIRST DUAL-EXPOSURE-TIME HDR IMAGE ALONE
2612
```

```
FUSE THE FIRST AND SECOND DUAL-EXPOSURE-TIME HDR IMAGES, ACCORDING TO A LOCAL
OPTIMIZATION OF ONE OR MORE QUALITY MEASURES OF THE TRIPLE-EXPOSURE-TIME HDR
COLOR IMAGE
2710
```

```
SET RELATIVE CONTRIBUTIONS, OF THE FIRST AND SECOND DUAL-EXPOSURE-TIME HDR
IMAGES TO THE TRIPLE-EXPOSURE-TIME HDR COLOR IMAGE, EXCLUSIVELY ACCORDING
TO THE LOCAL OPTIMIZATION, WITHOUT CONSIDERATION OF EITHER ONE OF (A) THE
DEGREE OF DISPARITY BETWEEN THE SHORT-EXPOSURE-TIME AND MEDIUM-EXPOSURE-
TIME PIXEL VALUES AND (B) THE DEGREE OF DISPARITY BETWEEN THE MEDIUM-
EXPOSURE-TIME AND LONG-EXPOSURE-TIME PIXEL VALUES
2712
```

```
OPTIMIZE CONTRAST, SATURATION, AND/OR WELL-EXPOSEDNESS
2714
```

```
SCALE AT LEAST ONE OF THE FIRST AND SECOND DUAL-EXPOSURE-TIME HDR IMAGES TO
PLACE THE FIRST AND SECOND DUAL-EXPOSURE-TIME HDR IMAGES ON A COMMON SCALE
2716
```

```
GENERATE THE TRIPLE-EXPOSURE-TIME HDR COLOR IMAGE WITH A DYNAMIC RANGE
THAT ENCOMPASSES THE DYNAMIC RANGE OF EACH OF THE FIRST AND SECOND DUAL-
EXPOSURE-TIME HDR IMAGES
2718
```

FIG. 27

HDR IMAGE GENERATION FROM SINGLE-SHOT HDR COLOR IMAGE SENSORS

CROSS-REFERENCE TO RELATED APPLICATIONS

This application claims the benefit of priority from U.S. Provisional patent application No. 62/681,789 filed on Jun. 7, 2018 and European Patent Application No. 18176403.6 filed Jun. 7, 2018 and U.S. Provisional Patent Application No. 62/837,361 filed Apr. 23, 2019, which are hereby incorporated by reference in their entirety.

TECHNICAL FIELD

The present application relates to high-dynamic-range imaging.

BACKGROUND

Most handheld camera devices, such as smartphones, utilize an image sensor having a bit depth of 8 bits or may be 10 bits. For many scenes, this bit depth is insufficient to capture both the brightest and darkest areas of the scene. For example, when taking a photo of a person that is backlit, the person's face may appear underexposed or, alternatively, the brighter background may appear overexposed.

High-dynamic-range (HDR) imaging functionality seeks to overcome this problem. In a typical approach, an HDR digital camera captures two images of the same scene: one image with a short exposure time to get good image data for bright portion of a scene, and another image with a longer exposure time to get good image data for darker portions of the scene. These two images are scaled to a common scale and combined to produce a single HDR image of the scene that properly depicts both the brighter and the darker scene portions. Such HDR imaging works well in many situations, and HDR imaging functionality has become a standard feature in many devices such as smartphones. However, the short and long exposures are recorded at different times with at least a full-frame readout process in between, and the image combination therefore often produces undesirable artifacts when the scene is not static. If an object moves between the short exposure and the long exposure, the HDR image may show, in severe cases, offset duplicate images of the moving object or, in less severe cases, edge artifacts at the moving object.

In an effort to eliminate motion artifacts in HDR images, the industry has developed so called "single-shot" HDR image sensors that achieve brighter and dimmer exposures in a single shot. One class of single-shot image sensors integrates large and small pixels in the same pixel array. The small pixels collect less light than the larger pixels. Thus, the size difference between the small and large pixels provide a dynamic range benefit similar to that of using short and long exposure times. Unfortunately, the pixel layout of such dual-size image sensors adds significant manufacturing complexity. Another type of single-shot HDR image sensor has pixels that are all of the same size, but applies a short exposure time to some pixels and a long exposure time to other pixels. This design greatly reduces motion artifacts since the exposure of the two different types of pixels is overlapped in time rather than being completely separate.

Nevertheless, the presence of motion may still adversely affect the quality of the recorded image even if the exposure times of the two different types of pixels are overlapped. At this, the motion may be caused e.g. due to movement of any mobile objects recorded with the help of the image sensor or due to movement of the image sensor itself. Regardless of whether pixel sensors with long exposure times and pixel sensors with short exposure times are recording during overlapping or non-overlapping time intervals, the resulting images may differ due to the different exposure times of the pixel sensors. Thus, it may be regarded as an object of the present document to provide an improved image generation method for generating images based short-exposure and long-exposure pixel values. More specifically, it is an object of the present document to provide an improved image generation method for dual-exposure-time single-shot image sensors, wherein said method is robust with regard to motion.

US2015062368 (A1) describes an electronic device with image sensors that capture interleaved images having rows of long-exposure pixel values interleaved with rows of short-exposure pixel values. Processing circuitry in the electronic device may (spatially) partition the interleaved images into multiple bins. The processing circuitry may generate a weighted long-exposure pixel value for each bin and a weighted short-exposure pixel value for each bin. The weighted long and short exposure values in each bin may be combined to generate a binned high-dynamic-range (HDR) pixel value for that bin. The processing circuitry may output a binned HDR image formed from the binned HDR pixel values to additional circuitry such as video processing circuitry for performing additional image processing operations. If desired, the image sensor and processing circuitry may be combined into an integrated structure that generates a single binned HDR pixel value and multiple integrated structures may be used.

US2014152694 (A1) describes a method of generating a high dynamic range (HDR) image. The method includes capturing a long exposure image and a short exposure image of a scene, computing a merging weight for each pixel location of the long exposure image based on a pixel value of the pixel location and a saturation threshold, and computing a pixel value for each pixel location of the HDR image as a weighted sum of corresponding pixel values in the long exposure image and the short exposure image, wherein a weight applied to a pixel value of the pixel location of the short exposure image and a weight applied to a pixel value of the pixel location in the pixel long exposure image are determined based on the merging weight computed for the pixel location and responsive to motion in a scene of the long exposure image and the short exposure image.

SUMMARY

In an embodiment, a method for generating a motion-compensated high-dynamic-range (HDR) color image from a dual-exposure-time single-shot HDR color image sensor includes obtaining pixel values generated by a local region of respective sensor pixels of the dual-exposure-time single-shot HDR color image sensor. The local region corresponds to position of an image pixel of the motion-compensated HDR color image. The sensor pixels of the local region include, for each of three different colors, a plurality of short-exposure-time pixels and a plurality of long-exposure-time pixels sensitive to the respective color. The method further includes (a) determining a motion parameter for the local region from the pixel values of the short-exposure-time pixels and the long-exposure-time pixels associated with a first color, and (b) demosaicing the pixel values of the local region to determine, for each color, an output value of the image pixel from the short-exposure-time pixels and the long-exposure-time pixels, wherein relative contributions of the short-exposure-time pixels and the long-exposure-time pixels to the output value are weighted according to the motion parameter.

In an embodiment, a product for generating a motion-compensated high-dynamic-range (HDR) color image from a dual-exposure-time single-shot HDR color image sensor includes machine-readable instructions encoded in non-transitory memory. The instructions include data selection instructions that, when executed by a processor, retrieve pixel values generated by a local region of respective sensor pixels of the dual-exposure-time single-shot HDR color image sensor. The local region corresponds to position of an image pixel of the motion-compensated HDR color image. The sensor pixels of the local region include, for each of three different colors, a plurality of short-exposure-time pixels and a plurality of long-exposure-time pixels sensitive to the respective color. The instructions further include (a) motion instructions that, when executed by the processor, determine a motion parameter for the local region from the pixel values of the short-exposure-time pixels and the long-exposure-time pixels associated with a first color, and (b) demosaicing instructions that, when executed by a processor, demosaic the pixel values of the local region to determine, for each color, an output value of the image pixel from the short-exposure-time pixels and the long-exposure-time pixels, wherein relative contributions of the short-exposure-time pixels and the long-exposure-time pixels to the output value are weighted according to the motion parameter.

In an embodiment, a method is configured to generate a high-dynamic-range (HDR) color image from a triple-exposure-time single-shot HDR color image sensor having a plurality of short-exposure-time pixels, a plurality of medium-exposure-time pixels, and a plurality of long-exposure-time pixels. The method includes (I) generating a first dual-exposure-time HDR image from a first combination of (a) short-exposure-time pixel values from the short-exposure-time pixels and (b) medium-exposure-time pixel values from the medium-exposure-time pixels, (II) generating a second dual-exposure-time HDR image from a second combination of (a) medium-exposure-time pixel values from the medium-exposure-time pixels and (b) long-exposure-time pixel values from the long-exposure-time pixels; and (III) generating a triple-exposure-time HDR color image from the first dual-exposure-time HDR image and the second dual-exposure-time HDR image.

In an embodiment, a product is configured to generate a high-dynamic-range (HDR) color image from a triple-exposure-time single-shot HDR color image sensor having a plurality of short-exposure-time pixels, a plurality of medium-exposure-time pixels, and a plurality of long-exposure-time pixels. The product includes machine-readable instructions encoded in non-transitory memory. The instructions include (I) dual-exposure-time instructions that, when executed by a processor, generate a dual-exposure-time HDR image from either (a) a first combination of short-exposure-time pixel values from the short-exposure-time pixels and medium-exposure-time pixel values from the medium-exposure-time pixels or (b) a second combination of medium-exposure-time pixel values from the medium-exposure-time pixels and long-exposure-time pixel values from the long-exposure-time pixels, and (II) dual-to-triple HDR instructions that, when executed by the processor, generate a triple-exposure-time HDR image from a combination of (a) a first instance of the dual-exposure-time HDR image based upon the first combination and (b) a second instance of the dual-exposure-time HDR image based upon the second combination.

BRIEF DESCRIPTION OF THE DRAWINGS

FIG. 5 illustrates a method for generating an output value for an image pixel of a motion-compensated HDR color image based upon a single image frame captured by dual-exposure-time single-shot HDR color image sensor, according to an embodiment.

FIG. 6 illustrates an example of a portion of the method of FIG. 5 that is based upon a zig-zag HDR color image sensor.

FIG. 7 illustrates an example of a portion of the method of FIG. 5 that is based upon an extended-Bayer HDR color image sensor.

FIG. 8 illustrates a motion-compensating HDR image generator for generating motion-compensated HDR output values for one or more image pixels of a motion-compensated HDR color image, according to an embodiment.

FIG. 12 illustrates a method for evaluating motion discrepancy between short-exposure-time pixels and long-exposure-time pixels, according to an embodiment.

FIGS. 13A and 13B show example fit weight functions.

FIG. 14 illustrates a method for motion-compensating demosaicing of the pixel values of the local region associated with an image pixel of an HDR color image, according to an embodiment.

FIG. 26 illustrates a disparity-based method for generating a triple-exposure-time HDR color image from two dual-exposure-time HDR images, according to an embodiment.

FIG. 27 illustrates a fusion-based method for generating a triple-exposure-time HDR color image from two dual-exposure-time HDR images, according to an embodiment.

DESCRIPTION OF EXAMPLE EMBODIMENTS

Figure 1:
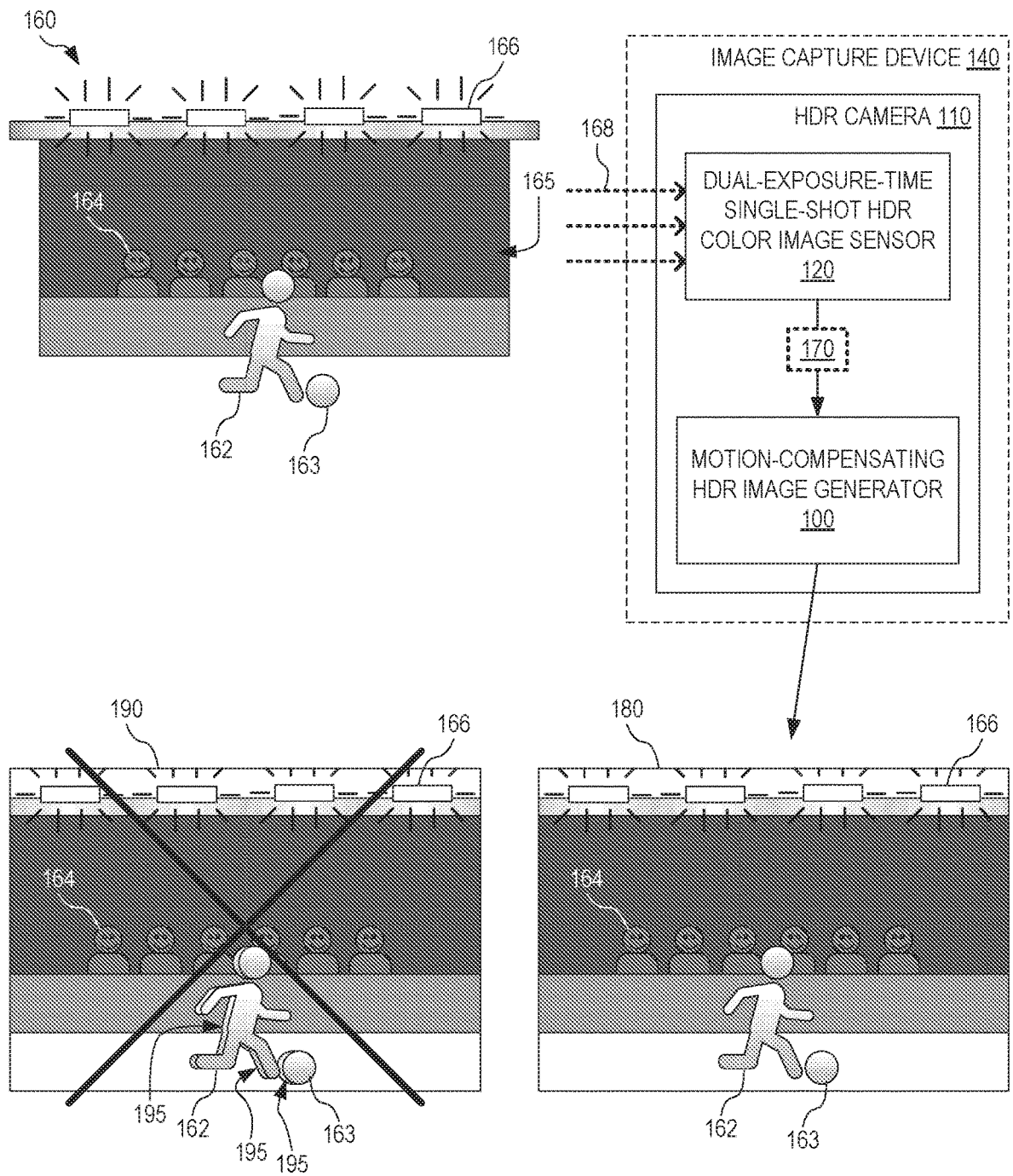
FIG. 1 illustrates a motion-compensated high-dynamic-range (HDR) camera for generating motion-compensated HDR images, according to an embodiment.

FIG. 1 illustrates one motion-compensated high-dynamic-range (HDR) camera 110 for generating motion-compensated HDR color images 180. HDR camera 110 includes a dual-exposure-time single-shot HDR color image sensor 120 and a motion-compensating HDR image generator 100. Image sensor 120 is configured to expose some of its photosensitive pixels at a short exposure time and others of its photosensitive pixels at a longer exposure time. Hence, each image frame captured by image sensor 120 contains both short-exposure-time image data and long-exposure time image data. Nevertheless, due to the different durations of the shorter and longer exposure times, the short-exposure-time image data and long-exposure time image data may be representative of different scene compositions when the scene is subject to motion. Motion-compensating HDR image generator 100 combines short-exposure-time image data and long-exposure time image data, generated by the recording of a single frame (i.e., single shot) by image sensor 120, into a single HDR image while compensating for motion in the scene to eliminate or at least reduce motion-artifacts.

HDR camera 110 may be implemented in an image capture device 140. Image capture device 140 is, for example, a smartphone, a digital single-lens reflex (DSLR) camera, or another handheld device.

In the use scenario depicted in FIG. 1, image sensor 120 receives light 168 from a scene 160. It is understood that HDR camera 110 or image capture device 140 may include a lens or imaging objective, not shown in FIG. 1 for clarity of illustration, to form an image of scene 160 on image sensor 120. Scene 160 has both bright areas (e.g., stadium lights 166) and dark areas (e.g., spectator area 165 and spectators 164 not lit by stadium lights 166). Scene 160 also includes moving objects, namely soccer player 162 and ball 163. Motion-compensating HDR image generator 100 processes pixel values 170, generated by both short- and long-exposure-time pixels of image sensor 120, to generate motion-compensated HDR color image 180. Motion-compensating HDR image generator 100 takes advantage of the HDR functionality of image sensor 120 to produce a motion-compensated HDR color image 180 of scene 160 that accurately depicts both bright stadium lights 166 and spectators 164 in the unlit spectator area 165. When combining pixel values 170 from short- and long-exposure-time pixels of image sensor 120, HDR image generator 100 compensating for motion, and the resulting motion-compensated HDR color image 180 therefore also shows soccer player 162 and ball 163 without motion artifacts.

In contrast, if motion-compensated HDR image generator 100 was replaced by a conventional image combination algorithm that does not compensate for motion, the resulting system would instead produce an HDR image 190 suffering from motion-artifacts 195 at edges of soccer player 162 and ball 163 (commonly known as "ghosting" in the literature).

Figure 2:
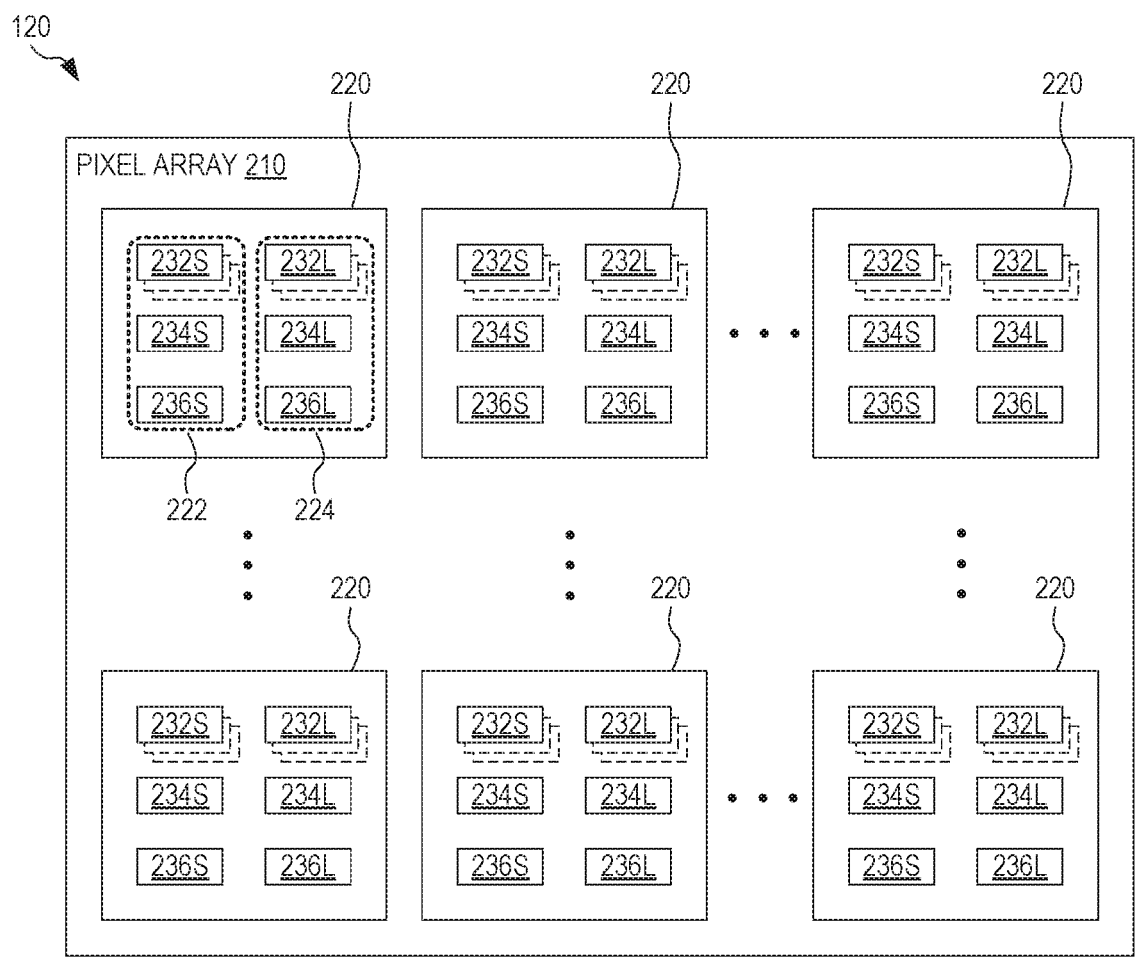
FIG. 2 shows a dual-exposure-time single-shot color HDR image sensor of the camera of FIG. 1 in further detail, according to an embodiment.

FIG. 2 shows dual-exposure-time single-shot HDR color image sensor 120 in further detail. Image sensor 120 includes a pixel array 210 having a plurality of identical pixel groups 220. Each pixel group 220 includes short-exposure-time pixels 222 and long-exposure-time pixels 224. Image sensor 120 is configured to expose long-exposure-time pixels 224 longer than short-exposure-time pixels 222. Short-exposure-time pixels 222 include pixels 232S, 234S, and 236S, sensitive to light 168 of a first, second, and third color, respectively. Similarly, long-exposure-time pixels 224 include pixels 232L, 234L, and 236L, sensitive to light 168 of a first, second, and third color, respectively. The first, second, and third colors are, for example, green, red, and blue.

Each pixel group 220 may, without departing from the scope hereof, include more than one instance of one or more of sensor pixels 232S, 234S, 236S, 232L, 234L, and 236L. For example, each pixel group 220 may include a plurality of pixels 232S and a plurality of pixels 232L sensitive to the first color. In one implementation, the first color is green.

Referring again to FIG. 1, motion-compensating HDR image generator 100 processes pixel values 170 produced by sensor pixels 232S, 234S, 236S, 232L, 234L, and 236L of each pixel group 220 to generate motion-compensated HDR color image 180.

Motion-compensating HDR image generator 100 may be implemented in the form of a processor and machine-readable instructions, encoded in non-transitory memory, that, upon execution by the processor, process pixel values 170 from image sensor 120 to generate motion-compensated HDR color image 180 or a portion thereof. Certain embodiments of motion-compensating HDR image generator 100 are provided as machine-readable instructions encoded in non-transitory memory, wherein the machine-readable instructions are configured to cooperate with a processor provided by a third party to process pixel values 170 from image sensor 120 to generate motion-compensated HDR color image 180 or a portion thereof.

Without departing from the scope hereof, HDR image generator 100 may be provided as a stand-alone product configured to generate motion-compensated HDR color image 180 from pixel values 170 received from a dual-exposure-time single-shot HDR color image sensor 120 provided by a third party.

Figure 3:
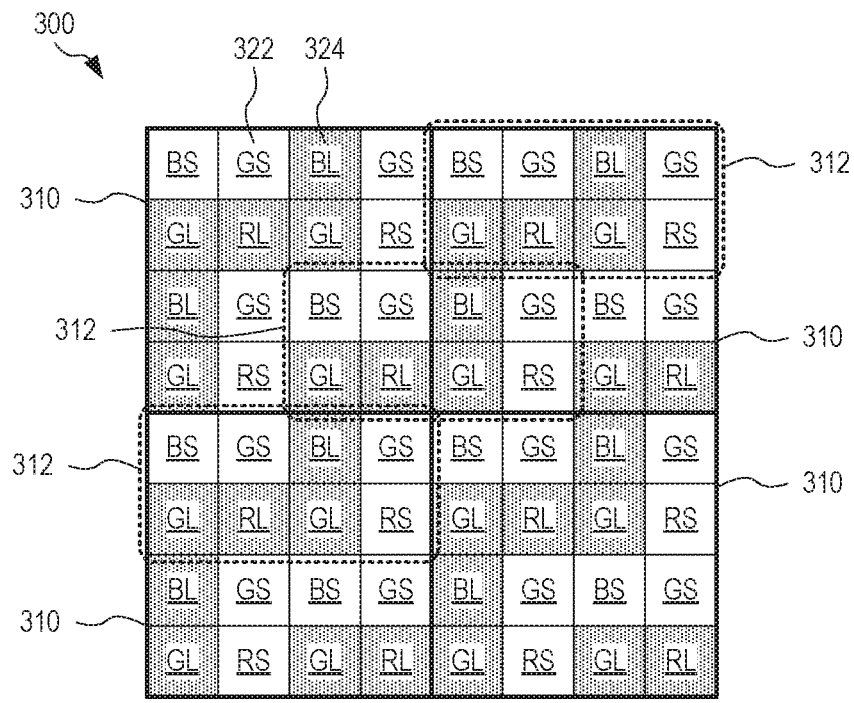
FIG. 3 illustrates a zig-zag HDR color image sensor, according to an embodiment.

FIG. 3 illustrates a zig-zag HDR color image sensor 300. Image sensor 300 is an embodiment of dual-exposure-time single-shot HDR color image sensor 120. Pixels of image sensor 300 are arranged in square pixel groups 310. It is understood that image sensor 300 may include more pixel groups 310 than depicted in FIG. 3, for example hundreds or thousands of pixel groups 310. Each pixel group 310 includes short-exposure-time pixels 322 (shown with white background in FIG. 3) and long-exposure-time pixels 324 (shown with shaded background in FIG. 3). In each pixel group 310, short-exposure-time pixels 322 includes four pixels "GS" sensitive to green light, two pixels "RS" sensitive to red light, and two pixels "BS" sensitive to blue light, and long-exposure-time pixels 324 includes four pixels "GL" sensitive to green light, two pixels "RL" sensitive to red light, and two pixels "BL" sensitive to blue light. Pixel groups 310 arrange short-exposure-time pixels 322 and long-exposure-time pixels 324 along alternating zig-zag paths (see the white and shaded zig-zag paths in FIG. 3). Alternatively, image sensor 300 may be viewed as containing a plurality of staggered pixel groups 312. Each pixel group 312 is composed of two GS pixels, two GL pixels, one RS pixel, one RL pixel, one BS pixel, and one BL pixel. Each of pixel group 310 and pixel group 312 is an embodiment of pixel group 220.

Figure 4:
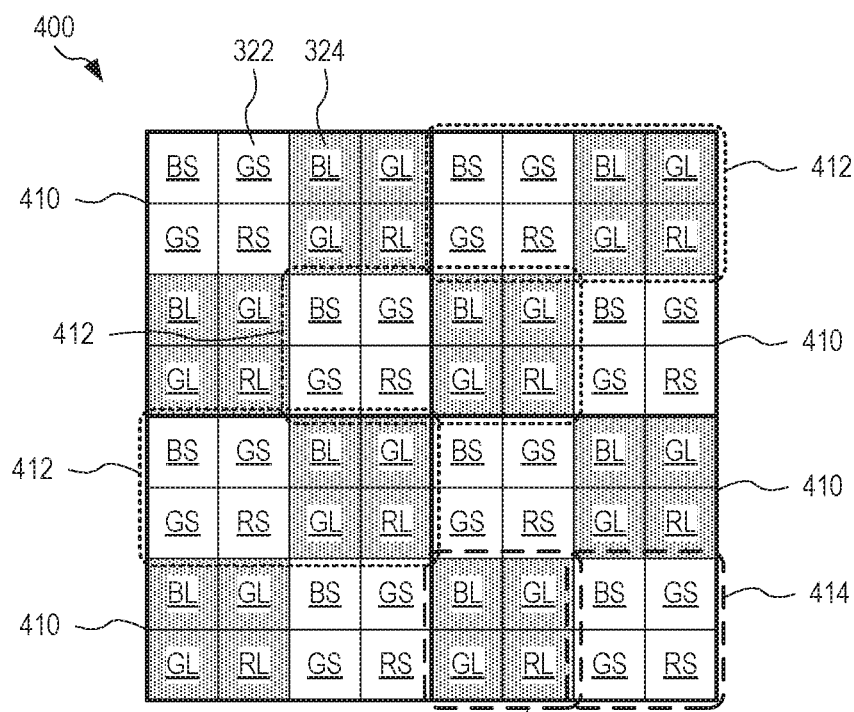
FIG. 4 illustrates an extended-Bayer HDR color image sensor, according to an embodiment.

FIG. 4 illustrates an extended-Bayer HDR color image sensor 400. Image sensor 400 is an embodiment of dual-exposure-time single-shot HDR color image sensor 120. Pixels of image sensor 400 are arranged in square pixel groups 410. It is understood that image sensor 400 may include more pixel groups 410 than depicted in FIG. 4, for example an array of hundreds or thousands of pixel groups 410. Each pixel group 410 includes short-exposure-time pixels 322 and long-exposure-time pixels 324. In each pixel group 410, short-exposure-time pixels 322 includes four pixels "GS" sensitive to green light, two pixels "RS" sensitive to red light, and two pixels "BS" sensitive to blue light, and long-exposure-time pixels 324 includes four pixels "GL" sensitive to green light, two pixels "RL" sensitive to red light, and two pixels "BL" sensitive to blue light. In each pixel group 410, these pixels are arranged in four Bayer-type blocks: two Bayer-type blocks 414 that each has two GS pixels, one RS pixel, and one BS pixel, and two Bayer-type blocks 416 that each has two GL pixels, one RL pixel, and one BL pixel. Image sensor 400 may be viewed as containing a plurality of staggered pixel groups 412 that is composed of one Bayer-type block 414 and one Bayer-type block 416.

FIG. 5 illustrates one method 500 for generating an output value for an image pixel of motion-compensated HDR color image 180 based upon a single image frame captured by dual-exposure-time single-shot HDR color image sensor 120. Method 500 may be performed by motion-compensating HDR image generator 100. Method 500 may be repeated for each image pixel of HDR color image 180 to populate the full HDR color image 180.

In a step 510, method 500 obtains pixel values 170 generated by a local region of respective sensor pixels of image sensor 120. This local region is at a location within pixel array 210 that corresponds to the position of the considered image pixel of motion-compensated HDR color image 180. The sensor pixels of the local region include, for each of the first, second, and third colors (discussed above in reference to FIG. 2), a plurality of short-exposure-time pixels 222 and a plurality of long-exposure-time pixels 224 sensitive to the respective color. Thus, the local region includes a plurality of each of sensor pixels 232S, 234S, 236S, 232L, 234L, and 236L.

FIG. 6 illustrates an example of step 510 of method 500 based upon zig-zag HDR color image sensor 300. In this example, step 510 obtains pixel values 170 from a local region 620 of image sensor 300, based upon which subsequent steps of method 500 generate an output value for a correspondingly located pixel 610 of motion-compensated HDR color image 180. Local region 620 is a 5×5 array of sensor pixels, such that the same type of sensor pixel is found at the center and at each corner of local region 620. Local region 620, shown in FIG. 6, has a pixel GL at its center and at each corner. Alternatively, local region 620 may be centered on a pixel GS, RS, RL, BS, or BL. Local region 620 may also be larger than 5×5 sensor pixels, for example 7×7 sensor pixels.

Without departing from the scope hereof, the correspondence between the locations of local region 620 and image pixel 610 may be configured such that HDR color image 180 is representative of the full pixel array of image sensor 300, or of only a sub-portion thereof.

FIG. 7 illustrates another example of step 510 of method 500 based upon extended-Bayer HDR color image sensor 400. The FIG. 7 example is similar to the FIG. 6 example, except for being based upon image sensor 400 and therefore a different layout of pixels GS, GL, RS, RL, BS, and BL. In the FIG. 7 example, step 510 obtains pixel values 170 from a local region 720 that is 5×5 array of sensor pixels, such that the same type of sensor pixel is found at the center and at each corner of local region 620. Local region 720, shown in FIG. 7, has a pixel GS at its center and at each corner. Alternatively, local region 720 may be centered on a pixel GL, RS, RL, BS, or BL. Local region 720 may also be larger than 5×5 sensor pixels, for example 7×7 sensor pixels.

Referring again to FIG. 5, the local region of step 510 may be configured such that an HDR color image 180 formed by multiple repetitions of method 500 may represent only a portion of pixel array 210 (for example a central region or region of interest). HDR color image 180 may have the same resolution as or lower resolution than the sensor pixel resolution of pixel array 210.

In a step 530, method 500 determines a motion parameter m for the local region from the pixel values of short-exposure-time pixels 232S and long-exposure-time pixels 232L associated with a first color (e.g., green). The motion parameter indicates the degree of motion in the local region from which step 510 obtains pixel values 170. A small motion parameter indicates little motion, and a large motion parameter indicates more motion. In one example, step 530 determines the motion parameter from a disparity Δ between short-exposure-time pixels 232S and long-exposure-time pixels 232L, scaled to a common scale to compensate for the difference in exposure time.

In one embodiment, the disparity Δ is the absolute difference between a short-exposure-time value $\beta_{1,S}$ and a long-exposure-time values $\beta_{1,L}$ (scaled to a common scale to compensate for the difference in exposure time) for the first color of the image pixel:

$$\Delta_a = |r\beta_{1,S} - \beta_{1,L}|, \quad \text{(Eq. 1)}$$

wherein r is the ratio of the long exposure time to the short exposure time. Step 530 derives (a) $\beta_{1,S}$ from pixel values 170 of short-exposure-time pixels 232S obtained in step 510 and (b) $\beta_{1,L}$ from pixel values 170 of long-exposure-time pixels 232L obtained in step 510.

In general, the short-exposure-time value $\beta_{1,S}$ and the long-exposure-time values $\beta_{1,L}$ may be scaled to a common scale in a plurality of different ways. According to a first way, a ratio r may be determined as a ratio of the long exposure time to the short exposure time as described in the forgoing example. This ratio r may then be used to scale the short-exposure-time-value $\beta_{1,S}$ to a common scale by multiplying short-exposure-time value $\beta_{1,S}$ with said ratio r. Alternatively, according to a second way, a second ratio $r_2$ may be determined as a ratio of the short exposure time to the long exposure time. This second ratio $r_2$ may then be used to scale the long-exposure-time-value $\beta_{1,L}$ to a common scale by multiplying long-exposure-time value $\beta_{1,L}$ with the second ratio $r_2$. According to another alternative, the scaling may be achieved by (a) multiplying the long-exposure-time-value $\beta_{1,L}$ with the short exposure time and (b) multiplying the short-exposure-time-value $\beta_{1,S}$ with the long exposure time. Thus, it becomes evident that the skilled person will readily come up with further alternatives for scaling the short-exposure-time value $\beta_{1,S}$ and the long-exposure-time values $\beta_{1,L}$ to a common scale.

In another embodiment, the disparity $\Delta$ is corrected for sensor noise to reflect only a disparity that is statistically significant over the expected pixel value variation originating from sensor noise. In this embodiment, the disparity $\Delta$ may be expressed as an above-noise-disparity:

$$\Delta_n = \max\left[0, |r\beta_{1,S} - \beta_{1,L}| - k\sqrt{\text{Var}(\beta_{1,S}, \beta_{1,L})}\right], \quad \text{(Eq. 2)}$$

wherein k is a constant, and $\text{Var}(\beta_{1,S},\beta_{1,L})$ is a combined noise variance of the pixel values 170 of short-exposure-time pixels 232S and pixel values 170 of long-exposure-time pixels 232L.

In one implementation, $\text{Var}(\beta_{1,S},\beta_{1,L}) = r^2 \text{Var}_S + \text{Var}_L$, wherein $\text{Var}_S$ is the noise variance of pixel values 170 of short-exposure-time pixels 232S, and $\text{Var}_L$ is the noise variance of pixel values 170 of long-exposure-time pixels 232L. Each of $\text{Var}_S$ and $\text{Var}_L$ may be predetermined based upon known or assumed noise properties of image sensor 120. Since sensor noise may depend on the pixel value, $\text{Var}_S$ and $\text{Var}_L$ may be a function of $\beta_{1,S}$ and a long-exposure-time values $\beta_{1,L}$, respectively.

In yet another embodiment, step 530 considers the above-noise-disparity $\Delta_n$ relative to expected pixel value variation originating from sensor noise. In this embodiment, the disparity $\Delta$ may be expressed as a relative above-noise-disparity $$\Delta_r = \max\left[0, \frac{|r\beta_{1,S} - \beta_{1,L}| - k\sqrt{\text{Var}(\beta_{1,S}, \beta_{1,L})}}{\sqrt{\text{Var}(\beta_{1,S}, \beta_{1,L})}}\right]. \quad \text{(Eq. 3)}$$

Step 530 may compute the motion parameter as $m=\sinh(\Delta/\alpha_1)$, as $m=\tanh(\Delta/\alpha_1)$, or as $m=\Delta/\alpha_1$, wherein $\alpha_1$ is a normalizing parameter and the disparity $\Delta$ may be any one of $\Delta_a$, $\Delta_n$, and $\Delta_r$. This functional mapping of the motion parameter m is configured to limit m to a value in the range from 0 to 1. For an example of image sensor 120 having a bit depth of 10 bits, $\alpha_1$ may be in the range between 5 and 50.

If one or more of long-exposure-time pixels 232L are saturated, step 530 may omit such saturated long-exposure-time pixels 232L from consideration, such that the motion parameter is determined from short-exposure-time pixels 232S and unsaturated long-exposure-time pixels 232L.

In a step 540, method 500 demosaics pixel values 170 obtained in step 510 to determine, for each of the first, second, and third colors, an output value of the image pixel. The demosaicing process of step 540 is integrated with HDR combination. More specifically, for each color, step 540 determines the output value of the image pixel from the short-exposure-time pixels 222 associated with the color and the long-exposure-time pixels 224 associated with the color. Step 540 weights relative contributions of short-exposure-time pixels 222 and long-exposure-time pixels 224 to the output value according to the motion parameter m determined in step 530. For each color, the output value $V_{out,C}$ for the image pixel may be expressed as $$V_{out,C} = (1-m)\beta_{C,L} + mr\beta_{C,S}, \quad \text{(Eq. 4)}$$

wherein the index C takes on one of the values 1, 2, and 3 to indicate the first, second, or third color, respectively, and wherein $\beta_{C,S}$ and $\beta_{C,L}$ are short-exposure-time and long-exposure-time values, respectively, for the image pixel and the color under consideration. Step 540 derives $\beta_{C,S}$ and $\beta_{C,L}$ from pixel values 170 obtained in step 510. Step 540 may omit saturated long-exposure-time pixels 224 from consideration and base the determination of each output value on short-exposure-time pixels 222 and unsaturated long-exposure-time pixels 224.

In Eq. 4, the motion parameter m may be in the range from 0 to 1, wherein a smaller motion parameter m may indicate a lower degree of motion in the local region, and wherein a larger motion parameter m may indicate a higher degree of motion in the local region. If, on the one hand, there is no motion in the local region, the motion parameter m may be 0 and the output value $V_{out,C}$ for the image pixel may be determined solely based on the long-exposure-time values $\beta_{C,L}$. If, on the other hand, the amount of motion in the local region exceeds a pre-determined, maximum amount of motion, the motion parameter m may be 1 and the output value $V_{out,C}$ for the image pixel may be determined solely based on the short-exposure-time values $\beta_{C,S}$. That is, in general, a higher degree of motion in the local region will result in a higher weighting of the short-exposure-time values $\beta_{C,S}$ and a lower weighting of the long-exposure-time values $\beta_{C,L}$ such that the output value $V_{out,C}$ for the image pixel is dominated by the short-exposure-time values $\beta_{C,S}$. The other way around, a lower degree of motion in the local region will result in a higher weighting of the long-exposure-time values $\beta_{C,L}$ and a lower weighting of the short-exposure-time values $\beta_{C,S}$ such that the output value $V_{out,C}$ for the image pixel is dominated by the long-exposure-time values $\beta_{C,L}$.

In an embodiment, step 540 fits Eq. 1, for each of color, to pixel values 170 of short-exposure-time pixels 222 associated with the color and the long-exposure-time pixels 224, with the motion parameter m predetermined in step 530.

Referring again to step 530, an alternative (and potentially more accurate) determination of the combined noise variance $\text{Var}(\beta_{1,S}, \beta_{1,L})$ accounts for the relative combination weights 1−m and m used in Eq. 3 and considers that the combined noise variance may depend on the motion parameter m. In this alternative implementation, step 530 considers a combined noise variance of the more general form $\text{Var}(\beta_{1,S}, \beta_{1,L}, m)$. The above-noise-disparity $\Delta_n$ may then instead be expressed as $$\Delta'_n = \max\left[0, |r\beta_{1,S} - \beta_{1,L}| - k\sqrt{\operatorname{Var}(\beta_{1,S}, \beta_{1,L}, m)}\right], \quad \text{(Eq. 5)}$$

and the relative above-noise-disparity $\Delta_r$ may instead be expressed as $$\Delta'_r = \max\left[0, \frac{|r\beta_{1,S} - \beta_{1,L}| - k\sqrt{\operatorname{Var}(\beta_{1,S}, \beta_{1,L}, m)}}{\sqrt{\operatorname{Var}(\beta_{1,S}, \beta_{1,L}, m)}}\right], \quad \text{(Eq. 6)}$$

In implementations based on above-noise-disparity $\Delta_n'$, step 530 may solve one of the following transcendental equations to determine the motion parameter m:

$$m = \sinh\left[\frac{\max\left[0, |r\beta_{1,S} - \beta_{1,L}| - k\sqrt{\operatorname{Var}(\beta_{1,S}, \beta_{1,L}, m)}\right]}{\alpha_1}\right] \quad \text{(Eq. 7)}$$

$$m = \tanh\left[\frac{\max\left[0, |r\beta_{1,S} - \beta_{1,L}| - k\sqrt{\operatorname{Var}(\beta_{1,S}, \beta_{1,L}, m)}\right]}{\alpha_1}\right] \quad \text{(Eq. 8)}$$

$$m = \min\left\{1, \frac{\max\left[0, |r\beta_{1,S} - \beta_{1,L}| - k\sqrt{\operatorname{Var}(\beta_{1,S}, \beta_{1,L}, m)}\right]}{\alpha_1}\right\} \quad \text{(Eq. 9)}$$

In implementations based on above-noise-disparity $\Delta_r'$, step 530 may solve one of the following transcendental equations to determine the motion parameter m:

$$m = \sinh\left[\frac{\max\left[0, |r\beta_{1,S} - \beta_{1,L}| - k\sqrt{\operatorname{Var}(\beta_{1,S}, \beta_{1,L}, m)}\right]}{\alpha_1\sqrt{\operatorname{Var}(\beta_{1,S}, \beta_{1,L}, m)}}\right] \quad \text{(Eq. 10)}$$

$$m = \tanh\left[\frac{\max\left[0, |r\beta_{1,S} - \beta_{1,L}| - k\sqrt{\operatorname{Var}(\beta_{1,S}, \beta_{1,L}, m)}\right]}{\alpha_1\sqrt{\operatorname{Var}(\beta_{1,S}, \beta_{1,L}, m)}}\right] \quad \text{(Eq. 11)}$$

$$m = \min\left\{1, \frac{\max[0, |r\beta_{1,S} - \beta_{1,L}| - k\operatorname{Var}(\beta_{1,S}, \beta_{1,L}, m)]}{\alpha_1\sqrt{\operatorname{Var}(\beta_{1,S}, \beta_{1,L}, m)}}\right\} \quad \text{(Eq. 12)}$$

The combined noise variance may be expressed as $\operatorname{Var}(\beta_{1,S}, \beta_{1,L}, m) = (1-m)\operatorname{Var}_L + mr^2 \operatorname{Var}_S$. The above listed transcendental equations (Eqs. 7-12) may be modified to include an additional term that forces the motion parameter m toward zero, when the pixel values 170 of short-exposure-time pixels 232S approach zero. This modification is explicitly written here for Eq. 11:

$$m = \tanh\left[\frac{\max\left[0, |r\beta_{1,S} - \beta_{1,L}| - k\sqrt{\operatorname{Var}(\beta_{1,S}, \beta_{1,L}, m)}\right]}{\alpha_1\sqrt{\operatorname{Var}(\beta_{1,S}, \beta_{1,L}, m)}}\tanh(\alpha_2\beta_{1,S})\right], \quad \text{(Eq. 13)}$$

wherein $\alpha_2$ is scaling parameter. Each of the transcendental equations Eqs. 7-10 and 12 may be similarly modified. Embodiments of step 530 implementing one of the transcendental equations Eq. 7-13 may solve the transcendental equation for the motion parameter m using numerical methods, such as the iterative Newton's method, or using a lookup table (as will be discussed in further detail in connection with FIGS. 18-21).

Since the disparity $\Delta$ depends on the difference between the short-exposure-time value $\beta_{1,S}$ and the long-exposure-time values $\beta_{1,L}$ (scaled to a common scale to compensate for the difference in exposure time), other effects than motion may couple into the motion parameter m. For example, noise in one or both of the short-exposure-time value $\beta_{1,S}$ and the long-exposure-time values $\beta_{1,L}$ may contribute to the disparity $\Delta$ and thus influence the motion parameter m. Thus, the motion parameter m may be referred to more generally as a "blending function" that accounts for one or more different effects, such as one or both of motion and noise.

Situations may arise where motion-compensation is not appropriate. For example, if, in the local region, all long-exposure-time pixels 232L associated with the first color are saturated, it is not possible to determine if there is motion. Similarly, if, e.g., the majority of long-exposure-time pixels 232L associated with the first color are saturated, it may not be possible to evaluate the degree of motion with sufficient accuracy to warrant motion compensation. To avoid motion artifacts in HDR color image 180 in such situations, it may be preferable to forgo use of pixel values 170 of the long-exposure-time pixels 222. In other situations, pixel values 170 may allow for accurate motion evaluation but, if such motion evaluation reveals that the local region is not significantly affected by motion, it may be computationally efficient to forgo motion compensation and instead combine short-exposure-time pixels 232S and long-exposure-time pixels 232L without considering motion. Additionally, scene portions that are uniform, i.e., scene portions having no or only insignificant variation in brightness or color, are invariant under motion and therefore do not require motion compensation.

An embodiment of method 500 accounts for such situations by performing motion correction only when appropriate. In this embodiment, method 500 further includes steps 520 and 550. Step 520 is performed after step 510 and before potentially proceeding to step 530. Step 520 evaluates, for each of the first, second, and third colors, if motion compensation is appropriate. For each color where step 520 determines that motion compensation is appropriate, method 500 proceeds to process that color according to steps 530 and 540. For each color where step 520 determines that motion compensation is not appropriate, method 500 instead proceeds to process that color according to step 550.

For each color forwarded to step 550, method 500 performs non-motion-compensated demosaicing of pixel values 170 obtained in step 510 to determine an output value of the image pixel. More specifically, for each such color, step 550 determines the output value of the image pixel from either (a) the short-exposure-time pixels 222 associated with the color of (b) a combination of short-exposure-time pixels 222 and long-exposure-time pixels 224 associated with the color without compensating for motion.

Step 520 may include one or more of steps 522, 524, and 526. In step 522, method 500 evaluates saturation of long-exposure-time pixels 224 obtained in step 510. In one example, step 522 determines that more than a threshold number of long-exposure-time pixels 224 associated with the first color, upon which processing in step 530 is based, is saturated, and step 520 then concludes that motion compensation is not appropriate. In another example, step 522 determines that more than a threshold number of long-exposure-time pixels 224 associated with another color than the first color is saturated, and step 522 then concludes that motion compensation for this color is not appropriate since the data available from long-exposure-time pixels 224 associated with this color is insufficient for use in the demosaicing of step 540.

Step 524 evaluates disparity between pixel values of 170 of short-exposure-time pixels 232S and long-exposure-time pixels 232L (scaled to a common scale to compensate for the difference in exposure time) obtained in step 510 to determine if motion is significant. If step 524 determines that there is no motion or only insignificant motion, step 524 concludes that motion compensation is inappropriate. In one implementation, step 524 calculates the disparity using an approach similar to that discussed above in reference to step 530, for example according to one of Eqs. 1-3, 5, and 6. In such implementations, step 524 may instead be performed as part of step 530, with rerouting to step 550 in case the motion parameter determined in step 530 is less than a pre-specified threshold value, and processing according to step 540 only if the motion parameter exceeds the threshold value.

For each color, step 526 evaluates the variance of pixel values 170 obtained in step 510. If both the variance of short-exposure-time pixels 222 associated with the color and the variance of long-exposure-time pixels 224 associated with the color is less than a threshold variance, such as that expected from sensor noise, step 526 determines that motion compensation is unnecessary, whereafter method 500 proceeds to step 550.

It is understood that, in embodiments that include more than one of steps 522, 524, and 526, if one of steps 522, 524, and 526 determines that motion compensation is inappropriate or unnecessary, method 500 may proceed to step 550 without performing the remaining one(s) of steps 522, 524, and 526.

Step 550 may utilize information obtained in step 522 to determine whether or not it is appropriate to include long-exposure-time pixels 222 in the demosaicing process.

Without departing from the scope hereof, instead of processing three classes of pixel values respectively associated with the first, second, and third colors, method 500 may instead process linear combinations of these colors. For example, instead of processing pixel values R, G, and B (respectively obtained from sensor pixels sensitive to red, green, and blue light), method 500 may process G, (R-G)/2, and (B-G)/2.

In an embodiment, method 500 further includes a step 502 of selecting the first color. Step 502 may evaluate the pixel values 170 received in step 510 to determine which color is most suitable for motion evaluation. Typically, for most embodiments of image sensor 120 and in most scenarios, green is the preferred choice for the first color since most image sensors 120 have twice as many green pixels as blue pixels or red pixels. However, if a scene portion has little signal in the green channel, step 502 may select a different color as the first color. In one implementation, step 502 selects the color having the greatest luminance.

FIG. 8 illustrates one motion-compensating HDR image generator 800 for generating motion-compensated HDR output values 874 for one or more image pixels of motion-compensated HDR color image 180. HDR image generator 800 is an embodiment of motion-compensating HDR image generator 100 and may perform method 500. HDR image generator 800 may be coupled with image sensor 120 to form a motion-compensated HDR camera 802. HDR camera 802 is an embodiment of HDR camera 110.

HDR image generator 800 includes a data selector 810, a motion analyzer 820, and a motion-compensating HDR demosaicing module 830. HDR image generator 800 obtains pixel values 170 from a single image frame captured by image sensor 120 and processes these pixel values 170 to produce a motion-compensated HDR output value 874 of motion-compensated HDR color image 180. HDR image generator 800 may process different ones of pixel values 170 to populate the entire HDR color image 180.

To generate each motion-compensated HDR output value 874, HDR image generator 800 operates as discussed in the following. In an example of step 510, data selector 810 selects, from pixel values 170, local region pixel values 870 located in the local region associated with the image pixel under consideration. In an example of step 530, motion analyzer 820 processes a subset of local region pixel values 870, associated with the first color, to determine a motion parameter 872. In an example of step 540, motion-compensating HDR demosaicing module 830 determines, for each of the first, second, and third colors, motion-compensated HDR output value 874 from (a) a subset of local region pixel values 870 associated with the color and (b) motion parameter 872.

In an embodiment, HDR image generator 800 is configured to determine if motion-compensation is appropriate, and perform motion-compensated demosaicing or non-motion-compensated demosaicing accordingly. In this embodiment, HDR image generator 800 further includes evaluator 812 and non-motion-compensating demosaicing module 832. In an example of step 520, for each set of local region pixel values 870 outputted by data selector 810, evaluator 812 determines, for each of the first, second, and third colors, whether or not motion compensation is appropriate. If evaluator 812 determines that motion-compensation is appropriate, HDR image generator 800 applies motion analyzer 820 and motion-compensating HDR demosaicing module 830 to determine motion-compensated HDR output value 874 as discussed above. For each image pixel and associated color where evaluator 812 determines that motion compensation is inappropriate, (a) HDR image generator 800 instead applies non-motion-compensating demosaicing module 832, and (b) in an example of step 550, non-motion-compensating demosaicing module 832 processes an associated subset of local region pixel values 870 to determine a non-motion-compensated HDR output value 876 for that color of the image pixel.

HDR image generator 800 may be implemented in the form of a processor and machine-readable instructions, encoded in non-transitory memory, that, upon execution by the processor, process pixel values 170 from image sensor 120 to generate motion-compensated HDR output value 874 and/or non-motion-compensated output value 876. Data selector 810, motion analyzer 820, and motion-compensating HDR demosaicing module 830 may share the same processor. Furthermore, a non-transitory memory containing such machine-readable instructions associated with data selector 810, motion analyzer 820, and motion-compensating HDR demosaicing module 830 may be provided as a standalone product configured to cooperate with a third-party processor to process pixel values 170 from image sensor 120 to generate motion-compensated HDR output value 874 and/or non-motion-compensated output value 876.

Without departing from the scope hereof, instead of processing three classes of pixel values respectively associated with the first, second, and third colors, HDR image generator 800 may instead process linear combinations of these colors. For example, instead of processing pixel values R, G, and B (respectively obtained from sensor pixels sensitive to red, green, and blue light), HDR image generator 800 may process G, (R-G)/2, and (B-G)/2.

Figure 9:
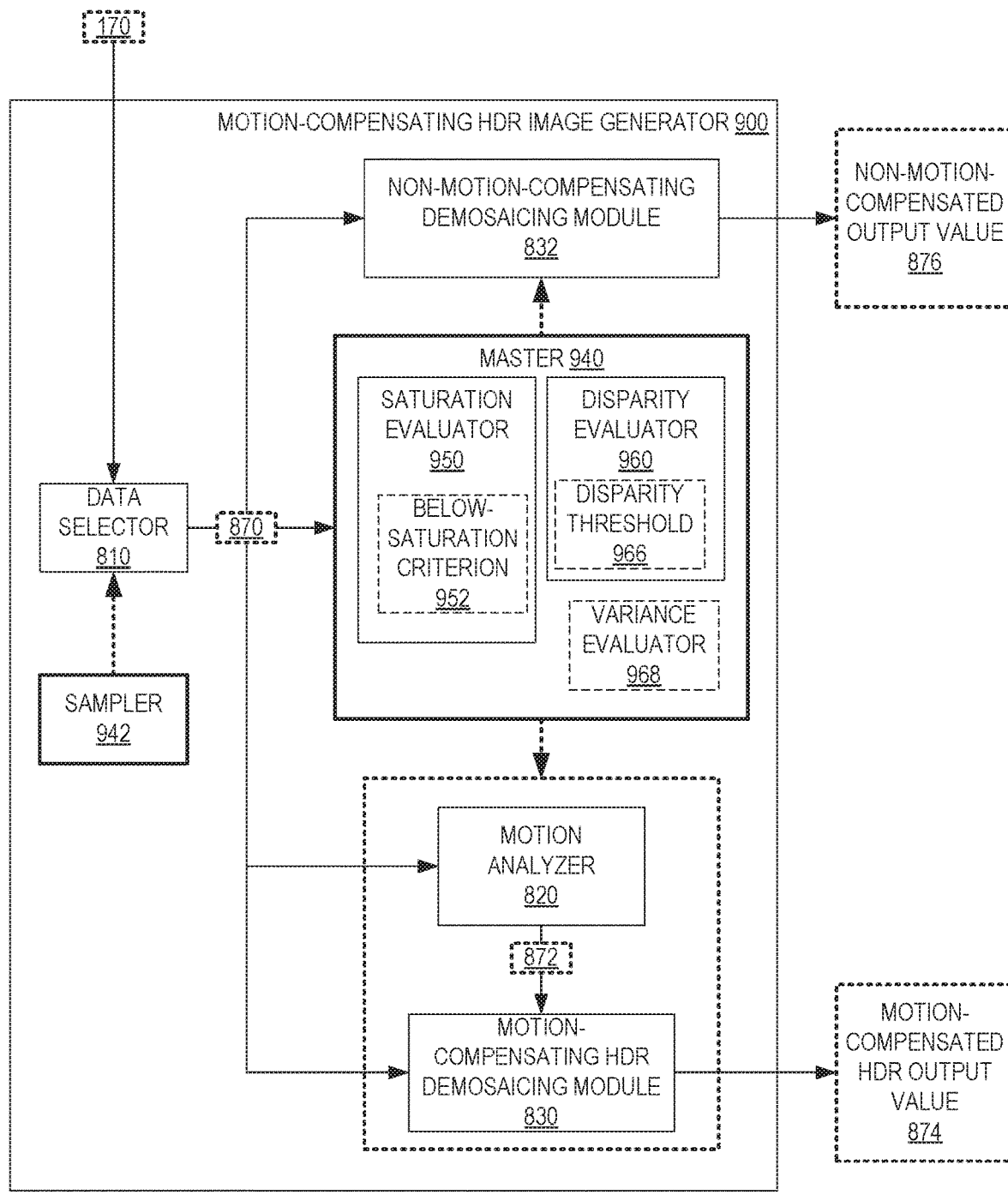
FIG. 9 illustrates a motion-compensating HDR image generator for generating a motion-compensated HDR color image from pixel values generated by a dual-exposure-time single-shot color HDR image sensor in a single shot, according to an embodiment.

FIG. 9 illustrates one motion-compensating HDR image generator 900 for generating motion-compensated HDR color image 180 from pixel values 170 generated by dual-exposure-time single-shot HDR color image sensor 120 in a single shot. HDR image generator 900 is an embodiment of motion-compensating HDR image generator 800 that includes non-motion-compensating demosaicing module 832 and further includes a sampler 942 and a master 940. Master 940 is an implementation of evaluator 812. HDR image generator 900 may perform method 500.

For each image pixel of HDR color image 180, sampler 942 controls the selection, by data selector 810, of corresponding local region pixel values 870 from pixel values 170. Sampler 942 and data selector 810 together perform an example of step 510. Sampler 942 is configured to control the pixel value selection, by data selector 810, according to a desired pixel resolution of HDR color image 180 and according to a desired size of the local region.

Figure 10:
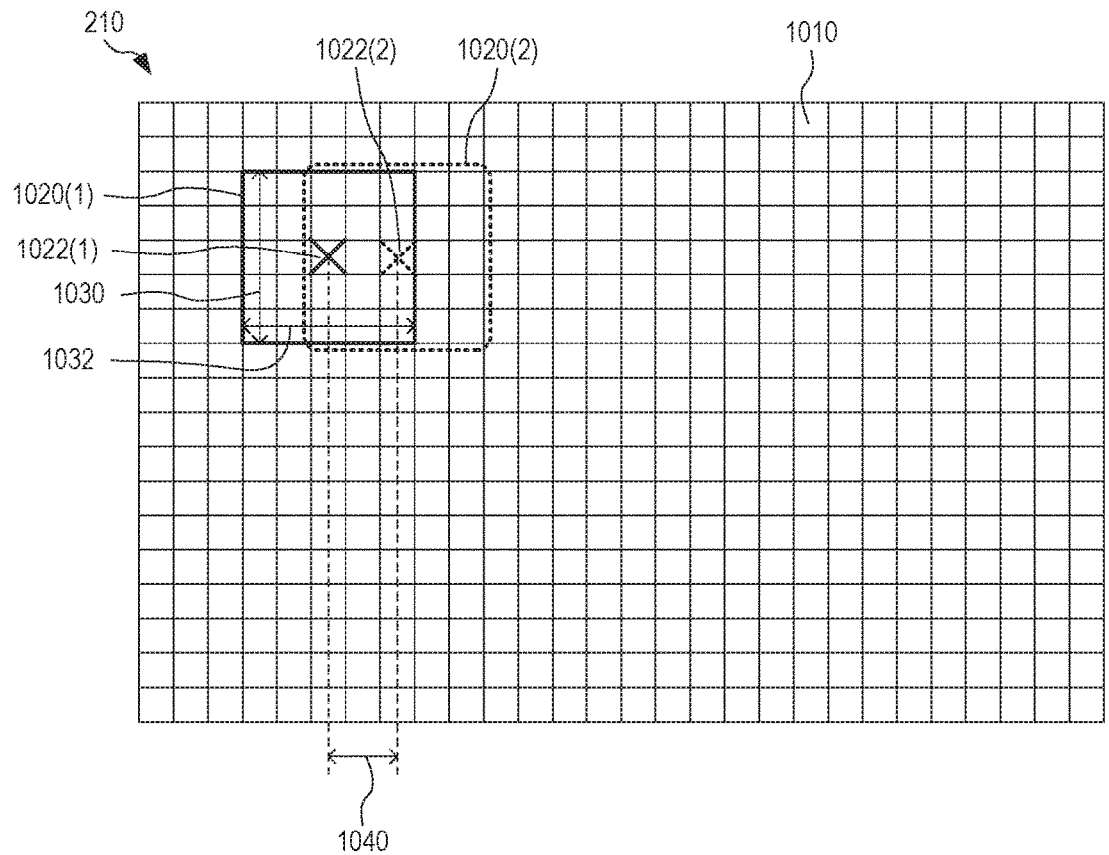
FIG. 10 shows an example of local region definition.

FIG. 10 shows an example of local region definition by sampler 942. FIG. 10 depicts pixel array 210 of image sensor 120. Pixel array 210 includes a plurality of sensor pixels 1010. Sensor pixel 1010 collectively refers to any one of pixels 232S, 232L, 234S, 234L, 236S, and 236L. For clarity of illustration, only one sensor pixel 1010 is labeled in FIG. 10. FIG. 10 indicates two local regions 1020(1) and 1020(2) corresponding to local region pixel selection, by data selector 810, for two adjacent image pixels of HDR color image 180. Each local region 1020 has height 1030 and width 1032. In the FIG. 10 example, height 1030 and width 1032 define a 5×5 pixel local region 1020. However, sampler 942 may command data selector 810 to sample a smaller or larger region of pixel array 210 by defining height 1030 and width 1032 accordingly. FIG. 10 shows local region 1020 as being square. However, local region 1020 may have a different shape, such as elongated rectangular, without departing from the scope hereof.

Local regions 1020(1) and 1020(2) have center pixels 1022(1) and 1022(2), respectively. Center pixels 1022(1) and 1022(2) are examples of sensor pixels 1010. Local regions 1020(1) and 1020(2) have center-to-center spacing 1040. In the FIG. 10 example, center-to-center spacing 1040 is two pixels 1010, such that the resolution of HDR color image 180 is down-sampled by a factor of two at least in the horizontal dimension. Sampler 942 may set center-to-center spacing 1040 to achieve a desired resolution. For example, sampler 942 may set center-to-center spacing 1040 to one pixel to retain, in HDR color image 180, the full pixel resolution of pixel array 210. Alternatively, sampler 942 may set center-to-center spacing 1040 to down-sample the pixel resolution of HDR color image 180, for example by a factor of two, four, or eight, or a factor of up to 10 in each of the horizontal and vertical dimensions.

Referring again to FIG. 9, master 940 processes local region pixel values 870 to determine which type of motion-compensation is appropriate for each color of the associated image pixel. Master 940 performs an example of step 520. The resulting HDR color image 180 may be composed of a combination of motion-compensated HDR output values 874 and non-motion-compensated output values 876. It is even possible that the output value for one color of an image pixel is a motion-compensated HDR output value 874, while the output value for another color of the same image pixel is a non-motion-compensated output value 876. Master 940 includes saturation evaluator 950 and disparity evaluator 960.

Saturation evaluator 950 evaluates the saturation level of each instance of local region pixel values 870, as discussed above in reference to step 522. In an embodiment, saturation evaluator 950 includes a below-saturation criterion 952. For each color, below-saturation criterion 952 is, for example, a requirement that a certain number of local region pixel values 870, associated with this color, must be unsaturated.

Disparity evaluator 960 evaluates, for local region pixel values 870, the disparity between long-exposure-time pixels and short-exposure-time pixels (scaled to a common scale to compensate for the difference in exposure time) associated with the first color, as discussed above in reference to step 524. In an embodiment, disparity evaluator 960 includes a disparity threshold 966. When the disparity is calculated according to Eq. 2, disparity threshold 966 may be zero or near zero. When the disparity is calculated according to Eq. 1, disparity threshold 966 may be $k\sqrt{r^2 \text{Var}_S + \text{Var}_L}$. Alternatively, disparity threshold 966 is defined to achieve a desired compromise between motion compensation and processing time (since motion-compensating demosaicing is generally computationally more costly than non-motion-compensating demosaicing).

In certain embodiments, master 940 further includes a variance evaluator 968 that evaluates the variance of local region pixel values 870, as discussed above in reference to step 526. Master 940 may further be configured to perform step 502.

HDR image generator 900 may be implemented in the form of a processor and machine-readable instructions, encoded in non-transitory memory, that, upon execution by the processor, process pixel values 170 from image sensor 120 to generate motion-compensated HDR output values 874 and/or non-motion-compensated output values 876. Master 940, sampler 942, data selector 810, motion analyzer 820, motion-compensating HDR demosaicing module 830, and non-motion-compensating demosaicing module 832 may share the same processor. Furthermore, a non-transitory memory containing such machine-readable instructions associated with master 940, sampler 942, data selector 810, motion analyzer 820, and motion-compensating HDR demosaicing module 830, and non-motion-compensating demosaicing module 832 may be provided as a standalone product configured to cooperate with a third-party processor to process pixel values 170 from image sensor 120 to generate motion-compensated HDR output values 874 and/or non-motion-compensated output values 876.

Figure 11A:
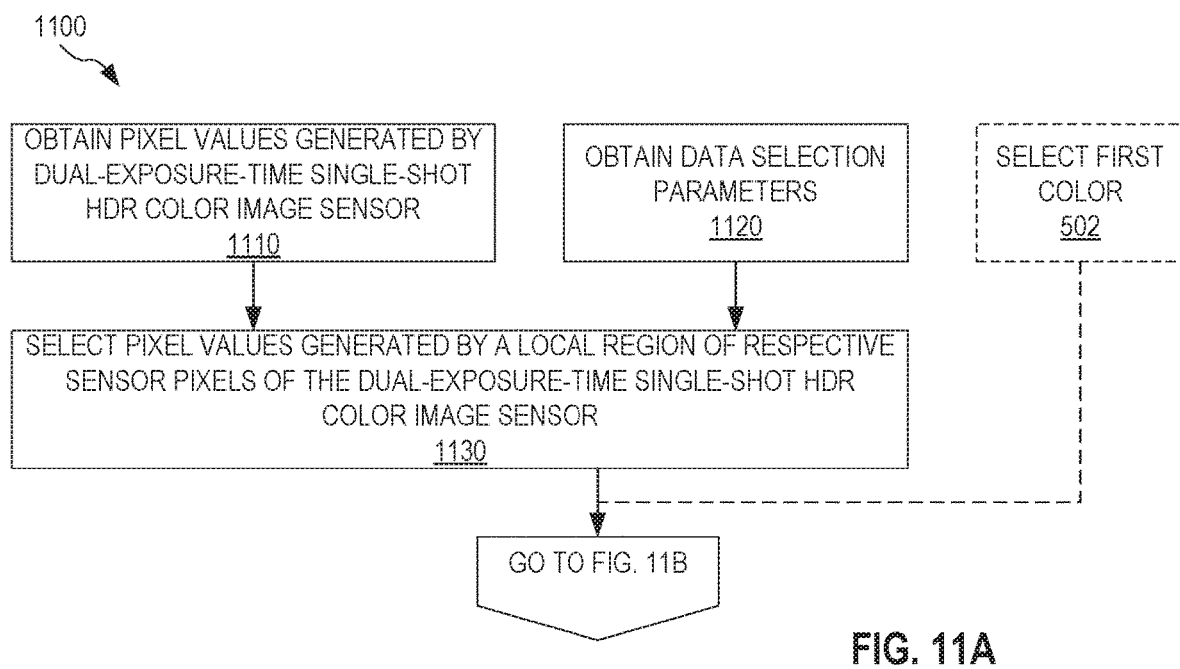
FIGS. 11A and 11B illustrate a method for generating, with conditional demosaicing, a motion-compensated HDR color image based upon pixel values obtained from a single image frame captured by a dual-exposure-time single-shot HDR color image sensor, according to an embodiment.
Figure 11B:
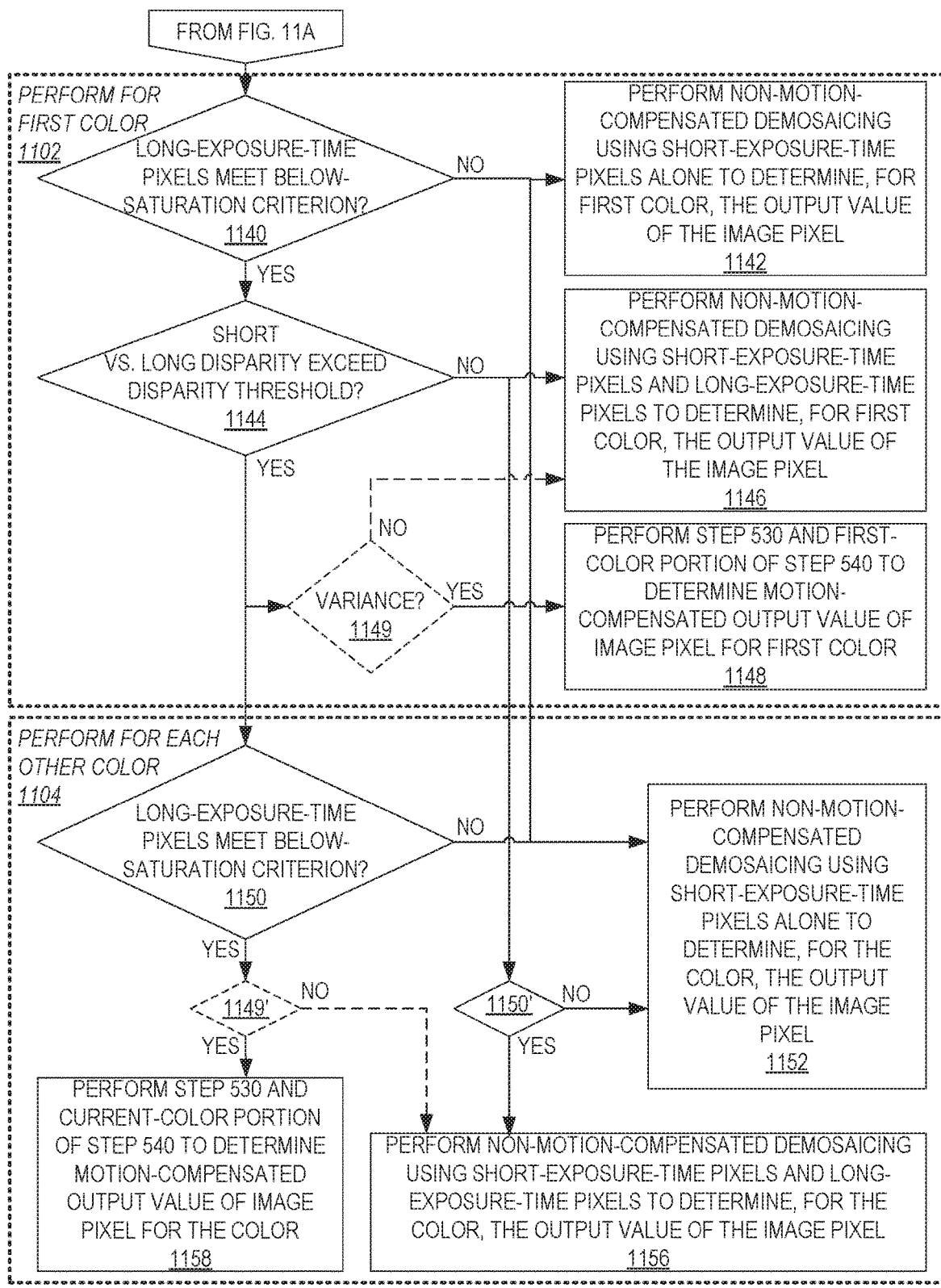

FIGS. 11A and 11B illustrate one method 1100 for generating, with conditional demosaicing, motion-compensated HDR color image 180 based upon pixel values obtained from a single image frame captured by dual-exposure-time single-shot HDR color image sensor 120. Method 1100 evaluates at least saturation level and motion disparity to apply, for each image pixel of HDR color image 180 and each associated color, a correspondingly appropriate type of demosaicing. Each iteration of method 1100 generates an output value for each of the first, second, and third colors of an image pixel of HDR color image 180. Method 1100 may be repeated for each image pixel of HDR color image 180 to populate the full HDR color image 180. Method 1100 is an embodiment of method 500. Method 1100 is, for example, performed by HDR image generator 900. FIG. 11A shows a first portion of method 1100, and FIG. 11B shows a second portion of method 1100. FIGS. 11A and 11B are best viewed together in the following description.

Method 1100 includes steps 1110, 1120, and 1130. Step 1110 obtains pixel values 170. Step 1120 obtains data selection parameters. In one example of steps 1110 and 1120, data selector 810 receives (a) pixel values 170 from image sensor 120 and (b) data selection parameters, such as height 1030, width 1032, and center-to-center spacing 1040, from sampler 942. Step 1130 selects, from pixel values 170 obtained in step 1110 and according to the data selection parameters obtained in step 1120, pixel values 870 generated by a local region of respective sensor pixels of the dual-exposure-time single-shot HDR color image sensor. In one example of step 1130, data selector 810 selects pixel values 870 generated by image sensor 120 according to the definition of local region 1020 obtained in step 1120. In an embodiment, method 1100 further includes step 502 to select the first color.

After completion of steps 1110, 1120, and 1130, and optionally 502, method 1100 proceeds to perform a block 1102 of steps for the first color and a block 1104 of steps for each of the second and third color. Block 1102 starts with a decision 1140. Decision 1140 evaluates saturation of long-exposure-time pixels associated with the first color. If the pixel values 870 for long-exposure-time pixels associated with the first color meet a below-saturation criterion, method 1100 proceeds to another decision 1144. Otherwise, method 1100 proceeds to (a) process pixel values 870 of the first color in a step 1142 and (b) process pixel values 870 for each of the second and third color according to a step 1152. In one example of decision 1140, saturation evaluator 950 compares the saturation level of pixel values 870 of long-exposure-time pixels 232L with below-saturation criterion 952. Next, in this example, if long-exposure-time pixels 232L fail to meet below-saturation criterion 952, master 940 commands non-motion-compensating demosaicing module 832 to process pixel values 870 for each of the first, second, and third colors according to steps 1142 and 1152 as discussed in further detail in the following. If, on the other hand, long-exposure-time pixels 232L meet below-saturation criterion 952, master 940 proceeds to apply disparity evaluator 960 to pixel values 870 associated with the first color.

When the pixel values 870 for long-exposure-time pixels associated with the first color fail to meet the saturation criterion in decision 1140, the data quality of the long-exposure-time pixels is deemed insufficient for motion analysis. In this case, method 1100 does not obtain knowledge of motion. Therefore, method 1100 resorts to non-motion-compensated demosaicing of pixel values 870. Furthermore, even if the long-exposure-time pixels associated with the second or the third color meet the saturation criterion, method 1100 does not have knowledge of any potential motion disparity between the short-exposure-time pixels and the long-exposure-time pixels. In this case, method 1100 therefore, for each of the first, second, and third colors, performs non-motion-compensated demosaicing based upon the short-exposure-time pixels alone. Thus, step 1142 performs non-motion-compensated demosaicing using short-exposure-time pixels alone to determine, for first color, the output value of the image pixel. Similarly, step 1152 performs non-motion-compensated demosaicing using short-exposure-time pixels alone to determine, for each of the second and third color, the output value of the image pixel. In one example of steps 1142 and 1152, master 940 commands non-motion-compensating demosaicing module 832 to process pixel values 870 of the short-exposure-time pixels associated with each of the first, second, and third colors, to determine non-motion-compensated output value 876 for each color. In this example, non-motion-compensating demosaicing module 832 (a) demosaics pixel values 870 for short-exposure-time pixels 232S for the first color, (b) demosaics pixel values 870 for short-exposure-time pixels 234S for the second color, and (c) demosaics pixel values 870 for short-exposure-time pixels 236S for the third color.

Decision 1144 calculates the disparity between short-exposure-time pixels and long-exposure-time pixels (scaled to a common scale to compensate for the difference in exposure time) associated with the first color, and compares this disparity to a disparity threshold. If the disparity exceeds the disparity threshold, method 1100 proceeds to (a) a step 1148 of processing pixel values 870, associated with the first color, according to steps 530 and 540, to determine a motion-compensated output value for the first color of the image pixel, and (b) evaluate the saturation level of the long-exposure-time pixels of each of the second and third colors in a decision 1150. If, on the other hand, the disparity fails to exceed the disparity threshold, method 1100 proceeds to (a) process pixel values 870, associated with the first color, according to a step 1146, and (b) evaluate the saturation level of the long-exposure-time pixels of each of the second and third colors in another instance 1150' of decision 1150. In one example of decision 1144, disparity evaluator 960 calculates the disparity between pixel values 870 of short-exposure-time pixels 232S and long-exposure-time pixels 232L (scaled to a common scale to compensate for the difference in exposure time), and compares this disparity to disparity threshold 966, as discussed above in reference to FIG. 9. In this example, if the disparity exceeds the disparity threshold, master 940 commands non-motion-compensating demosaicing module 832 to process pixel values 870 associated with the first color to determine non-motion-compensated output value 876 for the first color of the image pixel in step 1146. If, instead, the disparity is below the disparity threshold, master 940 proceeds to apply saturation evaluator 950 to pixel values 870 of long-exposure-time pixels, associated with the second and third colors, in decision 1150. When the disparity is below the disparity threshold, and pixel values 870 for long-exposure-time pixels associated with the first color meet the saturation criterion (corresponding to the outcome "NO" in decision 1144), method 1100 can utilize both the short-exposure-time pixels and the long-exposure-time pixels to determine the output value for the first color of the image pixel. However, motion compensation is deemed unnecessary. Therefore, step 1146 performs non-motion-compensated demosaicing using short-exposure-time pixels and long-exposure-time pixels, associated with the first color, to determine the output value for the first color of the image pixel. In the case where the disparity exceeds the disparity threshold, and pixel values 870 for long-exposure-time pixels associated with the first color meet the saturation criterion (corresponding to the outcome "YES" in decision 1144), it is deemed appropriate to perform motion-compensated demosaicing for the first color. Thus, step 1148 performs step 530 and step 540, for the first color, to determine a motion-compensated output value of the image pixel for first color. Step 1146 may omit saturated long-exposure-time pixels from consideration and base the determination of each output value on short-exposure-time pixels and unsaturated long-exposure-time pixels. In an example of step 1146, non-motion-compensating demosaicing module 832 determines non-motion-compensated output value 876 for the first color based upon a combination of pixel values 870 of short-exposure-time pixels 232S and unsaturated long-exposure-time pixels 232L. In an example of step 1148, motion analyzer 820 and motion-compensating HDR demosaicing module 830 process pixel values 870 of short-exposure-time pixels 232S and long-exposure-time pixels 232L, associated with the first color, to determine motion-compensated HDR output value 874 for the first color of the image pixel.

Decision 1150 is similar to decision 1140 except for being applied to each of the second and third colors, instead of the first color. If decision 1150 determines that the long-exposure-time pixels meet the saturation criterion, method 1100 proceeds to a step 1158 of performing step 530 and a portion of step 540, associated with the color under consideration, to determine a motion-compensated output value of image pixel for the color under consideration. Otherwise, method 1100 proceeds to step 1152. Step 1158 is similar to step 1148 except for being applied to the second and/or third color. Decision 1150' is identical to decision 1150, but is situated at a different point in the decision process of method 1100. If the answer to decision 1150' is "NO", method 1100 proceeds to step 1152. It the answer to decision 1150' is "YES", method 1100 proceeds to a step 1156. Step 1156 is similar to step 1146 apart from being applied to the second and/or third color.

In one embodiment, method 1100 further considers the variance of pixel values 870 to determine the optimal type of demosaicing. This embodiment of method 1100 further includes decisions 1149 and 1149'. Decision 1149 intercepts the path from decision 1144 to step 1148. Decision 1149 is an embodiment of step 526 and evaluates if the variance of pixel values 870, associated with the first color, exceeds a threshold variance. If yes, method 1100 proceeds to step 1148. If not, method 1100 instead reroutes to step 1146. Decision 1149' intercepts the path from decision 1150 to step 1158. Decision 1149' is an embodiment of step 526 and evaluates, for each of the second and third color, if the variance of pixel values 870, associated with the color under consideration, exceeds a threshold variance. If yes, method 1100 proceeds to step 1158 for that color. If not, method 1100 reroutes to step 1156 for that color.

FIG. 12 illustrates one method 1200 for evaluating motion discrepancy between short-exposure-time pixels and long-exposure-time pixels associated with the first color. Method 1200 is an embodiment of step 530 and determines motion parameter m. Method 1200 may be performed by motion analyzer 820 to determine motion parameter 872 based upon pixel values 870. Method 1200 includes steps 1210, 1220, and 1230.

Step 1210 fits a first model to pixel values 870 of the short-exposure-time pixels 232S (associated with the first color) to determine a short-exposure-time first-color value for the image pixel, e.g., $\beta_{1,S}$ of Eq. 1. This short-exposure-time first-color value represents a best estimate of the actual first-color luminance associated with the image pixel. Since, as discussed above in reference to step 510, the local region, from which pixel values 870 are obtained, includes a plurality of short-exposure-time pixels 232S sensitive to the first color, a plurality of pixel values are available to determine a short-exposure-time first-color value for the image pixel. The center of the local region may or may not coincide with a short-exposure-time pixels 232S. Step 1210 considers all short-exposure-time pixels 232S within the local region to interpolate the short-exposure-time first-color value for the image pixel. Even when the center of the local region does coincide with a short-exposure-time pixels 232S, the fitting process used by step 1210 may serve to average out noise and thus add robustness to the determination of the short-exposure-time first-color value.

Step 1220 is similar to step 1210 except for pertaining to the long exposure time. Step 1220 fits a second model to pixel values 870 of the long-exposure-time pixels 232L (associated with the first color) to determine a long-exposure-time first-color value for the image pixel, e.g., $\beta_{1,L}$ of Eq. 1.

Steps 1210 and 1220 may include scaling $\beta_{1,S}$ and $\beta_{1,L}$ to a common scale to compensate for the difference in exposure time. Alternatively, step 1230 performs this scaling.

Step 1230 calculates a disparity between the short-exposure-time first-color value, determined in step 1210, and the long-exposure-time first-color value, determined in step 1220, to determine the motion parameter, wherein the short-exposure-time first-color value and long-exposure-time first-color value are scaled to a common scale. Step 1230 may utilize Eqs. 1-3, 5 or 6. In an embodiment, step 1230 computes the motion parameter as $m=\sinh(\Delta/\alpha_1)$, as $m=\tanh(\Delta/\alpha_1)$, or as $m=0/\alpha_1$, as discussed above in reference to step 530, or according to one of Eqs. 7-13.

In an embodiment, step 1210 includes a step 1212 and step 1220 includes a step 1222. On the one hand, step 1212 applies a fit weight to each pixel value 870 used in the fit by step 1210. For example, step 1212 may apply the fit weight to the short-exposure-time pixels by multiplying the pixel values of the short-exposure-time pixels with said fit weight. The fit weight of step 1212 is an increasing function of the signal quality of pixel value 870, or the expected signal quality of pixel value 870, such that pixel values 870 of better data quality are assigned relatively more weight in the fit. The fit weight of step 1212 may be derived from a model of sensor noise of image sensor 120. On the other hand, step 1222 applies a fit weight to each pixel value 870 used in the fit by step 1220. For example, step 1222 may apply the fit weight to the long-exposure-time pixels by multiplying the pixel values of the long-exposure-time pixels with said fit weight. The fit weight of step 1222 is also an increasing function of the signal quality of pixel value 870, or the expected signal quality of pixel value 870. The fit weights of steps 1212 and 1222 may be based upon a model of noise properties and/or saturation behavior of image sensor 120.

FIGS. 13A and 13B show example fit weight functions that may be used in steps 1212 and 1222. FIG. 13A shows a fit weight function 1310 applicable to short-exposure-time pixels, such as short-exposure-time pixels 232S. FIG. 13B shows a fit weight function 1350 applicable to long-exposure-time pixels, such as long-exposure-time pixels 232L. FIGS. 13A and 13B are best viewed together in the following description. Each of FIGS. 13A and 13B plots the respective fit weight function as fit weight 1304 versus pixel value 1302.

Fit weight function 1310 is unity between a lower threshold 1312 and a maximum pixel value 1314, and fit weight function 1310 gradually tapers to zero when the pixel value decreases from lower threshold 1312 to zero. This decrease reflects deteriorating data quality as sensor noise becomes an increasingly significant contribution to the pixel value. In one embodiment, fit weight function 1310 also tapers off at the highest pixel values, as indicated by dashed line 1320. This decrease reflects deteriorating data quality as saturation begins to limit the pixel value.

Fit weight function 1350 is unity between zero and an upper threshold 1352, and fit weight function 1350 gradually tapers to zero when the pixel value increases from upper threshold 1352 to a maximum pixel value 1354. This decrease reflects deteriorating data quality as saturation begins to limit the pixel value. In one implementation, maximum pixel value 1354 is the highest pixel value that the image sensor can output. In another implementation, maximum pixel value 1354 is less than the highest pixel value that the image sensor can output and instead defines a level above which saturation is unacceptable. This implementation removes significantly saturated pixel values from consideration.

In one embodiment, fit weight function 1350 also tapers off at the lowest pixel values, as indicated by dashed line 1360. This decrease reflects deteriorating data quality as sensor noise becomes an increasingly significant contribution to the pixel value.

Referring again to FIG. 12, step 1212 may utilize fit weight function 1310 (with or without taper 1320), and step 1222 may utilize fit weight function 1350 (with or without taper 1360).

In an embodiment, step 1210 includes a step 1214 of using one two-dimensional (2D) polynomial model, and step 1220 includes a step 1224 of using another 2D polynomial model. The 2D polynomial models of steps 1214 and 1224 may be the same or be different from each other. Each 2D polynomial model is a polynomial function having both the horizontal and vertical pixel coordinate as input parameters and having a respective fit weight as output parameter. Similar to the fit weight functions 1310 and 1350 illustrated in FIGS. 13A and 13B, the polynomial function may be normalized e.g. normalized to a maximum value of 1.

The order of the 2D polynomial applied in step 1214 may depend on the size of the local region. For example, a 5×5 region, such as those depicted in FIGS. 6 and 7, may allow for robust fitting of a first-order 2D polynomial to pixel values 870 of short-exposure-time pixels 232S, whereas a 7×7 region may allow for robust fitting of a second- or third-order 2D polynomial to pixel values 870 of short-exposure-time pixels 232S. Generally, a larger region allows for fitting of a higher-order polynomial. On one hand, a higher-order polynomial allows for a more accurate fit to the pixel variation within the local region. On the other hand, a larger local region may induce more blurring than desired. In addition, fitting a higher-order polynomial to a large local region is more computationally costly than fitting a lower-order polynomial to a small local region. In one embodiment, step 1210 utilizes a first order polynomial (a plane) or a zeroth order polynomial (a constant), for example to minimize processing time.

Since step 1220 processes long-exposure-time pixels 232L more susceptible to saturation, step 1220 may omit pixel values 870 obtained from saturated pixels and consider only unsaturated pixel values 870. Therefore, the number of pixel values 870 available for the fitting process of step 1220 may be less than the number of long-exposure-time pixels 232L in the local region. Thus, the order of the 2D polynomial applied in step 1224 may further depend on the actual number of unsaturated long-exposure-time pixels 232L.

In one embodiment, the 2D polynomial model of step 1212 is a first, second, or third order 2D polynomial, and the 2D polynomial model of step 1224 is one or two orders less than the 2D polynomial model of step 1212. For example, the 2D polynomial model of step 1212 is a second or third order 2D polynomial, while the 2D polynomial model of step 1212 is a zeroth or first order 2D polynomial. In another embodiment, the first and second models are 2D polynomials of the same order.

FIG. 14 illustrates one method 1400 for motion-compensating demosaicing of the pixel values of the local region associated with an image pixel of HDR color image 180. Method 1400 determines the output value for one color of the image pixel. Step 540 may perform method 1400 for each color. Motion-compensating HDR demosaicing module 830 may perform method 1400 to generate motion-compensated HDR output value 874 based upon pixel values 870 and motion parameter 872. Method 1400 includes steps 1410, 1420, and 1430.

Step 1410 fits a first model to pixel values 870 of the short-exposure-time pixels 222, associated with the color under consideration, to determine a short-exposure-time value for this color of the image pixel, e.g., $\beta_{C,S}$ of Eq. 4. This short-exposure-time value represents a best estimate of the actual luminance associated with this color of the image pixel. The benefits of fitting a model to pixel values 870 are similar to those discussed above in reference to step 1210.

Step 1420 is similar to step 1410 except for pertaining to the long exposure time. Step 1420 fits a second model to pixel values 870 of the long-exposure-time pixels 224, associated with the color under consideration, to determine a long-exposure-time value for this color of the image pixel, e.g., $\beta_{C,L}$ of Eq. 4.

Steps 1410 and 1420 may include scaling $\beta_{C,S}$ and $\beta_{C,L}$ to a common scale to compensate for the difference in exposure time. Alternatively, step 1430 performs this scaling.

Step 1430 calculates the output value for the image pixel, for the color under consideration, as a weighted average of (a) the short-exposure-time value determined in step 1410 and (b) the long-exposure-time value. The weighted average uses the motion parameter m as weight, as discussed above in reference to Eq. 4.

In an embodiment, step 1410 includes a step 1412 and step 1420 includes a step 1422. Each of steps 1412 and 1422 fit a model to the respectively associated pixel values. Step 1412 is similar to step 1210 except for being applicable to any one of the first, second, and third color. Likewise, step 1422 is similar to step 1220 except for being applicable to any one of the first, second, and third color. Step 1412 may include one or both of steps 1414 and 1416, and step 1422 may include one or both of steps 1424 and 1426. Steps 1414 and 1424 are similar to steps 1212 and 1222, respectively. Step 1416 is similar to step 1214, except that the order of the 2D polynomial of step 1416 may depend on the color under consideration. For example, step 1416 may apply a 2D polynomial to the second and third colors that is of lower order than that applied to the first color in step 1214, to account for fewer pixel values 870 pertaining to each of the second and third colors than to the first color. Similarly, step 1426 is similar to step 1224, except that the order of the 2D polynomial of step 1426 may depend on the color under consideration. For example, step 1426 may apply a 2D polynomial to the second and third colors that is of lower order than that applied to the first color in step 1224.

Referring now to FIGS. 5, 12, and 14 together, method 500 may use method 1200 to perform step 530 and use method 1400 to perform step 540. In such an embodiment, method 1400 does not need to repeat the calculations in steps 1410 and 1420 for the first color since step 530, using method 1200, already performed these calculations. In this embodiment, steps 1410 and 1420 may implement steps 1418 and 1428, respectively, when the color under consideration is the first color. Step 1418 sets the short-exposure-time value, for the first color, to the short-exposure-time first-color value determined in step 1210. Likewise, step 1428 sets the long-exposure-time value, for the first color, to the long-exposure-time first-color value determined in step 1220.

Referring now to FIGS. 11, 12, and 14 together, each of steps 1148 and 1158 may be performed according to methods 1200 and 1400. Each of steps 1146 and 1156 may be performed according to method 1400, with the one modification that the weighted average in step 1430 is replaced by either a simple unweighted average or a weighted average that does not use the motion parameter as a weight. In the latter case, the weight may be derived from a collective consideration of the fit weights shown in FIGS. 13A and 13B. Each of steps 1142 and 1152 may be performed according to step 1410. In addition, decision 1144 may utilize at least a portion of method 1200 to determine the disparity of decision 1144.

Figure 15:
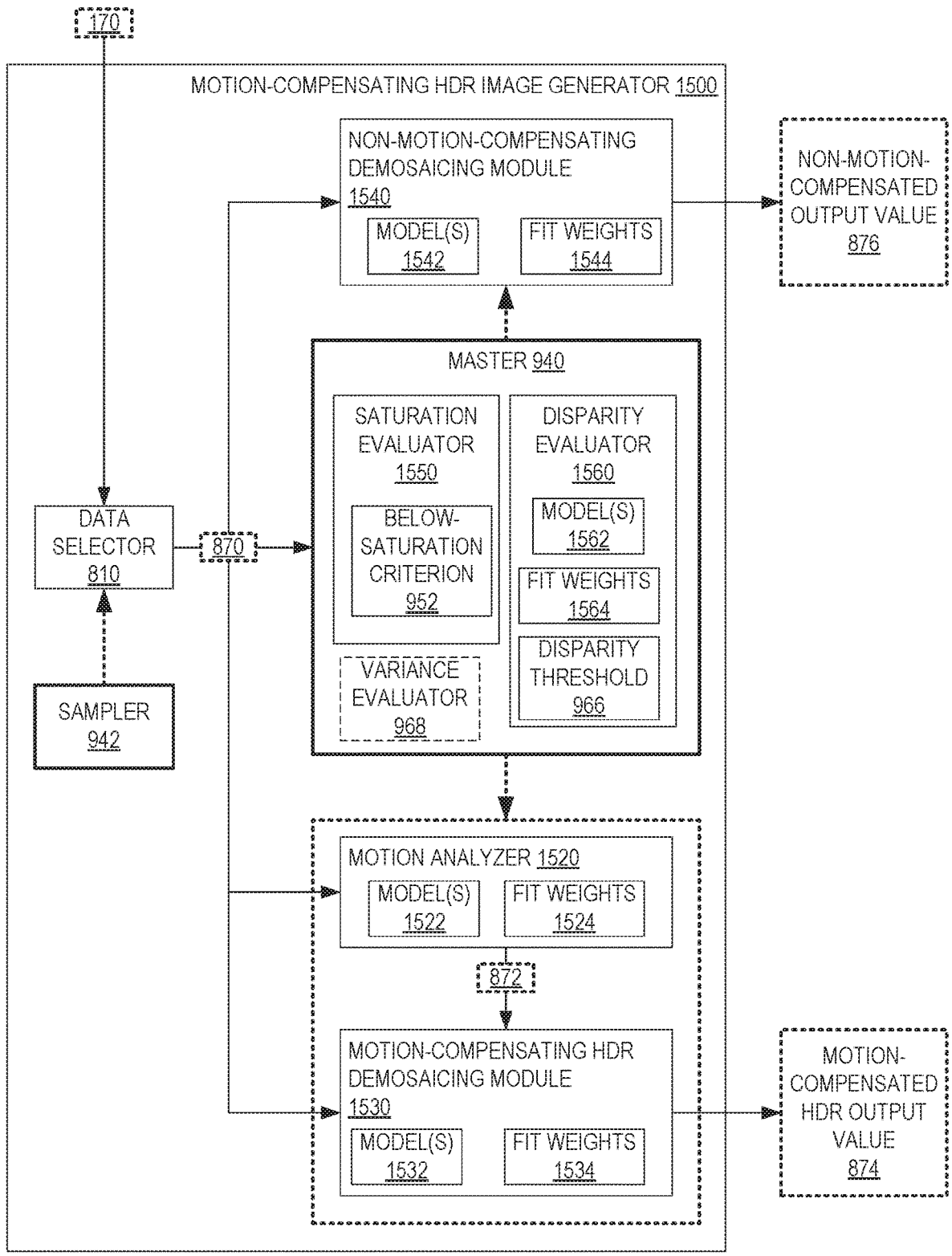
FIG. 15 illustrates another motion-compensating HDR image generator for generating motion-compensated HDR color image from pixel values generated by a dual-exposure-time single-shot color HDR image sensor in a single shot, according to an embodiment.

FIG. 15 illustrates another motion-compensating HDR image generator 1500 for generating motion-compensated HDR color image 180 from pixel values 170 generated by dual-exposure-time single-shot HDR color image sensor 120 in a single shot. HDR image generator 1500 is an embodiment of motion-compensating HDR image generator 900 that is adapted to perform method 1100 implementing method 1200 and an embodiment of 1400 that includes steps 1412 and 1422.

In HDR image generator 1500, master 940 implements a saturation evaluator 1550 and a disparity evaluator 1560, as respective embodiments of saturation evaluator 950 and a disparity evaluator 960. Saturation evaluator 1550 includes below-saturation criterion 952 and is configured to perform decisions 1140, 1150, and 1150'. Disparity evaluator 1560 includes one or more model 1562, and fit weights 1564 configured to be used in decision 1144 to determine the disparity according to at least a portion of method 1200. Fit weights 1564 are for example the fit weights of FIGS. 13A and 13B. Each model 1562 is a 2D polynomial, for example. Disparity evaluator 1560 also includes disparity threshold 966. Master 940, as implemented in HDR image generator 1500, may further include variance evaluator 968 to perform decisions 1149 an 1149'.

HDR image generator 1500 includes a motion analyzer 1520 and a motion-compensating HDR demosaicing module 1530, respective embodiments of motion analyzer 820 and a motion-compensating HDR demosaicing module 830. Motion analyzer 1520 includes one or more models 1522, and fit weights 1524. Motion analyzer 1520 utilizes model(s) 1522 and fit weights 1524 to perform an embodiment of method 1200 that includes steps 1212, 1214, 1222, and 1224. Motion-compensating HDR demosaicing module 1530 includes one or more models 1532, and fit weights 1534. Motion-compensating HDR demosaicing module 1530 utilizes model(s) 1532 and fit weights 1534 to perform an embodiment of method 1400 that includes steps 1414, 1416, 1424, and 1426. Each model 1522 and 1532 is a 2D polynomial, for example. Fit weights 1524 and 1534 are for example the fit weights of FIGS. 13A and 13B. Motion analyzer 1520 and motion-compensating HDR demosaicing module 1530 are configured to perform steps 1148 and 1158.

HDR image generator 1500 includes a non-motion-compensating demosaicing module 1540 which is an embodiment of non-motion-compensating demosaicing module 832. Non-motion-compensating demosaicing module 1540 includes one or more models 1542, and fit weights 1544. Non-motion-compensating demosaicing module 1540 is configured to utilize model(s) 1522 and fit weights 1524 to perform steps 1142, 1146, 1152, and 1156.

In an embodiment, at least some of fit weights 1524, 1534, 1544, and 1564 are identical. It is understood that, in this embodiment, HDR image generator 1500 does not need to include duplicate copies of the same fit weights but may instead include just one instance of such fit weights. Similarly, at least some of models 1522, 1532, 1542, and 1562 may be identical, in which case HDR image generator 1500 does not need to include duplicate copies of the same model but may instead include just one instance of such a model.

HDR image generator 1500 may be implemented in the form of a processor and machine-readable instructions, encoded in non-transitory memory, that, upon execution by the processor, process pixel values 170 from image sensor 120 to generate motion-compensated HDR output values 874 and/or non-motion-compensated output values 876. Master 940, sampler 942, data selector 810, motion analyzer 1520, motion-compensating HDR demosaicing module 1530, and non-motion-compensating demosaicing module 1540 may share the same processor. Furthermore, a non-transitory memory containing such machine-readable instructions associated with master 940, sampler 942, data selector 810, motion analyzer 1520, motion-compensating HDR demosaicing module 1530, and non-motion-compensating demosaicing module 1540 may be provided as a standalone product configured to cooperate with a third-party processor to process pixel values 170 from image sensor 120 to generate motion-compensated HDR output values 874 and/or non-motion-compensated output values 876.

Figure 16:
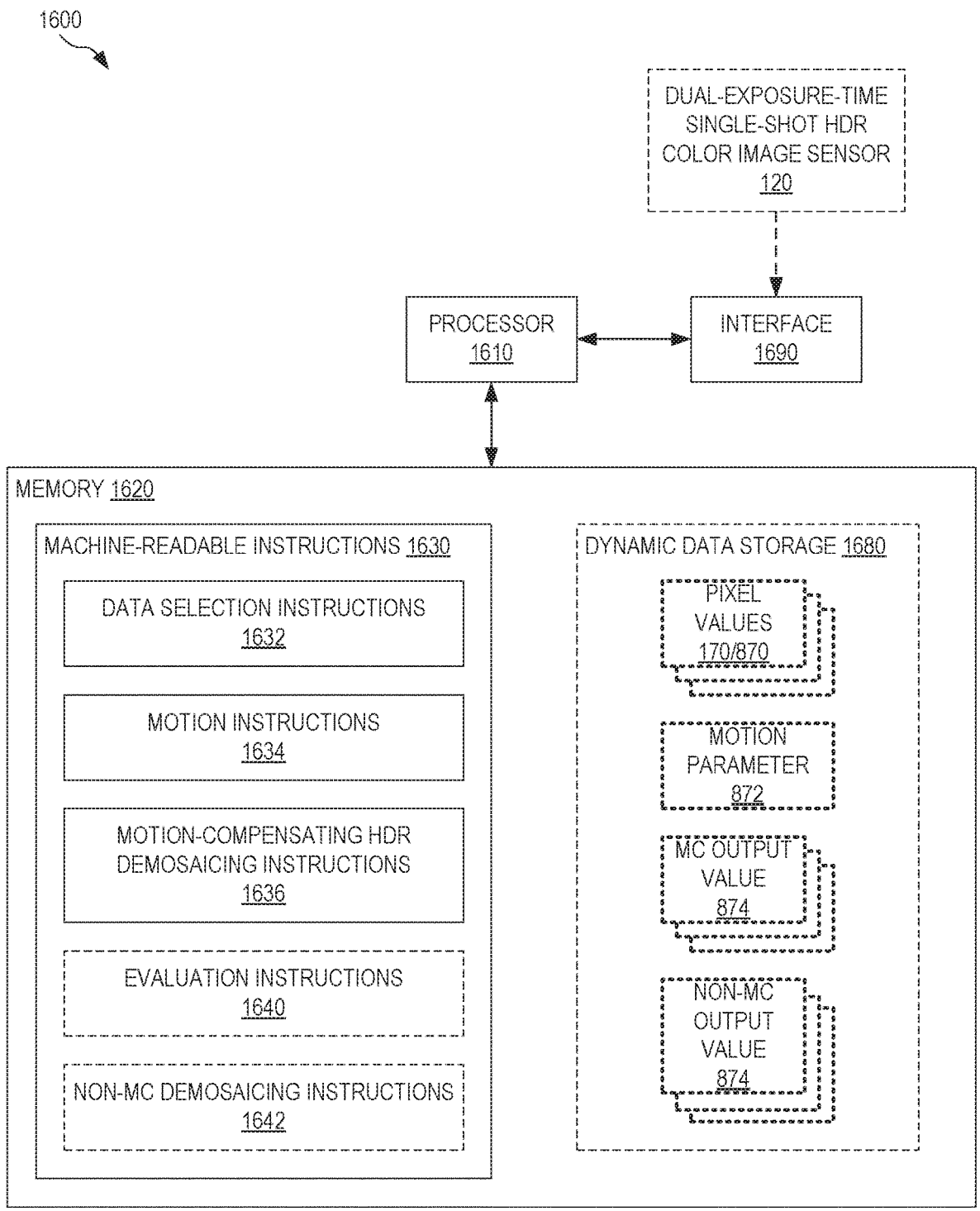
FIG. 16 illustrates a system for generating a motion-compensated HDR color image from a dual-exposure-time single-shot HDR color image sensor, according to an embodiment.

FIG. 16 illustrates one system 1600 for generating motion-compensated HDR color image 180 from dual-exposure-time single-shot HDR color image sensor 120. System 1600 may be implemented by a computer and is configured to perform method 500. System 1600 includes a processor 1610, a non-transitory memory 1620, and an interface 1690. Processor 1610 and memory 1620 (and, in certain embodiments, interface 1690) cooperate to form an embodiment of HDR image generator 800. System 1600 may further include dual-exposure-time single-shot HDR color image sensor 120, in which case system 1600 is an embodiment of HDR camera 802.

Memory 1620 includes machine-readable instructions 1630. Instructions 1630 may be encoded in a non-volatile portion of memory 1620. Instructions 1630 include data selection instructions 1632, motion instructions 1634, and motion-compensating HDR demosaicing instructions 1636. In one embodiment, memory 1620 may further include a dynamic data storage 1680 configured to store data received via interface 1690 and/or data generated by instructions 1630 when executed by processor 1610. In another embodiment, system 1600 does not include memory 1620 but is instead configured to cooperate with an external memory, for example provided by a third party.

Upon execution by processor 1610, data selection instructions 1632 obtains local region pixel values 870. Data selection instructions 1632 may be configured to obtain local region pixel values 870 via interface 1690 or from dynamic data storage 1680. Dynamic data storage 1680 may contain all pixel values 170 of a frame recorded by image sensor 120, such that data selection instructions 1632 may be configured to select local region pixel values 870 from pixel values 170. Data selection instructions 1632 and processor 1610 cooperate to form an embodiment of data selector 810.

Upon execution by processor 1610, motion instructions 1634 process a subset of local region pixel values 870, associated with the first color, to determine motion parameter 872. Motion instructions 1634 may be configured to store motion parameter 872 in dynamic data storage 1680. Motion instructions 1634 and processor 1610 cooperate to form an embodiment of motion analyzer 820.

Upon execution by processor 1610, motion-compensating HDR demosaicing instructions 1636 determine, for each of the first, second, and third colors, motion-compensated HDR output value 874 from (a) a subset of local region pixel values 870 associated with the color and (b) motion parameter 872. Motion-compensating HDR demosaicing instructions 1636 may be configured to (a) retrieve motion parameter 872 and the subset of local region pixel values 870 from dynamic data storage 1680 and (b) store motion-compensated HDR output value 874 to dynamic data storage 1680 or output motion-compensated HDR output value 874 via interface 1690. Motion-compensating HDR demosaicing instructions 1636 and processor 1610 cooperate to form an embodiment of motion-compensating HDR demosaicing module 830.

In an embodiment, instructions 1630 further include evaluation instructions 1640 and non-motion-compensating demosaicing instructions 1642. Upon execution by processor 1610, evaluation instructions 1640 determine, for each of the first, second, and third colors, whether or not motion compensation is appropriate. Evaluation instructions 1640 and processor 1610 cooperate to form an embodiment of evaluator 812. If execution of evaluation instructions 1640, by processor 1610, leads to the determination that motion-compensation is appropriate, processor 1610 executes motion-compensating HDR demosaicing instructions 1636 as discussed above. On the other hand, if execution of evaluation instructions 1640, by processor 1610, leads to the determination that motion-compensation is not appropriate, processor 1610 instead executes non-motion-compensating demosaicing instructions 1642. Upon execution by processor 1610, non-motion-compensating demosaicing instructions 1642 process a subset of local region pixel values 870, associated with the color under consideration, to determine non-motion-compensated output value 876 for that color of the image pixel. Non-motion-compensating demosaicing instructions 1642 may be configured to (a) retrieve the subset of local region pixel values 870 from dynamic data storage 1680 and (b) store non-motion-compensated output value 876 to dynamic data storage 1680 or output non-motion-compensated output value 876 via interface 1690. Non-motion-compensating demosaicing instructions 1642 and processor 1610 cooperate to form an embodiment of non-motion-compensating demosaicing module 832.

Without departing from the scope hereof, machine-readable instructions 1630 may be provided as a stand-alone software product configured for implementation on a third-party computer that has (a) a non-transitory memory for storage of machine-readable instructions 1630 and (b) a processor for execution of machine-readable instructions 1630.

Figure 17:
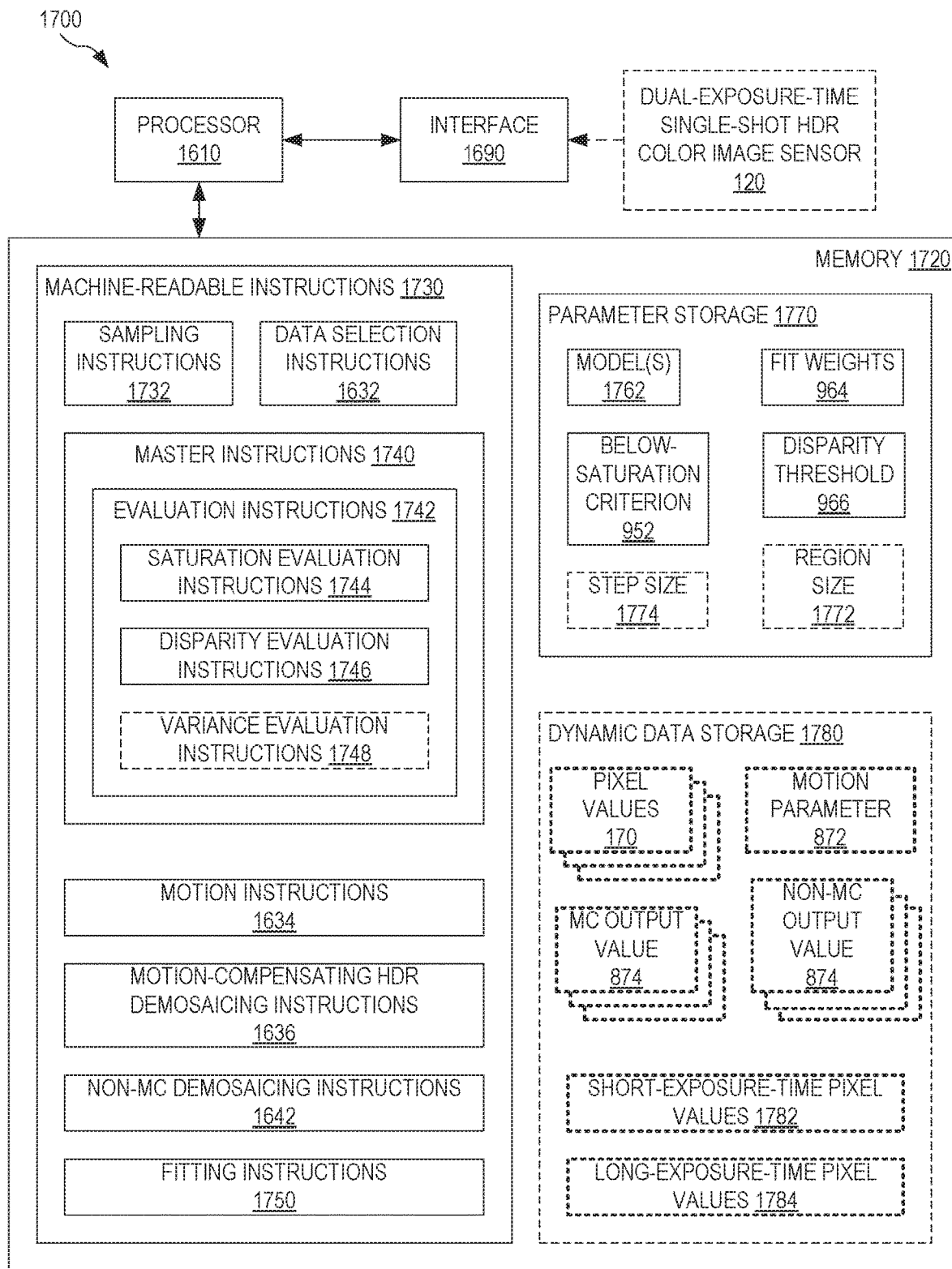
FIG. 17 illustrates another system for generating a motion-compensated HDR color image from a dual-exposure-time single-shot HDR color image sensor, according to an embodiment.

FIG. 17 illustrates another system 1700 for generating motion-compensated HDR color image 180 from dual-exposure-time single-shot HDR color image sensor 120. System 1700 may be implemented by a computer and is configured to perform method 1100 implementing method 1200 and an embodiment of 1400 that includes steps 1412 and 1422. System 1700 includes processor 1610, a non-transitory memory 1720, and interface 1690. Processor 1610 and memory 1720 (and, in certain embodiments, interface 1690) cooperate to form an embodiment of HDR image generator 1500. System 1700 may further include dual-exposure-time single-shot HDR color image sensor 120, in which case system 1700 is an embodiment of HDR camera 802, configured to perform method 1100 implementing method 1200 and an embodiment of 1400 that includes steps 1412 and 1422. Furthermore, system 1700 is an embodiment of system 1600.

Memory 1720 includes machine-readable instructions 1730 and parameter storage 1770. Instructions 1730 may be encoded in a non-volatile portion of memory 1720. Memory 1720 is an embodiment of memory 1620. Instructions 1730 are an embodiment of instructions 1630 that further include sampling instructions 1732, fitting instructions 1750, and master instructions 1740. Master instructions 1740 include evaluation instructions 1742. Evaluation instructions 1742 are an embodiment of evaluation instructions 1640 that include saturation evaluation instructions 1744 and disparity evaluation instructions 1746. Evaluation instructions 1742 may further include variance evaluation instructions 1748. Parameter storage 1770 includes one or more models 1762, fit weights 964, below-saturation criterion 952, and disparity threshold 966. Parameter storage 1770 may further include region size 1772 and step size 1774.

Upon execution by processor 1610, sampling instructions 1732 specify the selection of local region pixel values 870 to be used when processor 1610 executes data selection instructions 1632. Sampling instructions 1732 may be configured to retrieve region size 1772 (e.g., height 1030 and width 1032) and step size 1774 (e.g., center-to-center spacing 1040) from parameter storage 1770, or, alternatively, receive region size 1772 and step size 1774 via interface 1690 and then store region size 1772 and step size 1774 to parameter storage 1770 or dynamic data storage 1780. Sampling instructions 1732 and processor 1610 cooperate to form an embodiment of sampler 942.

Upon execution by processor 1610, fitting instructions 1750 (a) retrieves a model 1762 and fit weights 964 from parameter storage 1770 and (b) fits this model 1762 to certain local region pixel values 870, using fit weights 964, to determine either short-exposure-time pixel value 1782 or long-exposure-time pixel value 1784. Fitting instructions 1750 may be configured to store short-exposure-time pixel values 1782 and long-exposure-time pixel values 1784 to dynamic data storage 1780.

In system 1700, motion-compensating HDR demosaicing instructions 1636 and non-motion-compensating demosaicing instructions 1642 are configured to command execution of fitting instructions 1750. Thus, motion-compensating HDR demosaicing instructions 1636 and non-motion-compensating demosaicing instructions 1642, as implemented in system 1700, form embodiments of motion-compensating HDR demosaicing module 1530 and non-motion-compensating demosaicing module 1540, respectively. Similarly, in system 1700, motion instructions 1634 are configured to command execution of fitting instructions 1750. Thus, motion instructions 1634, as implemented in system 1700, form an embodiment of motion analyzer 1520.

Upon execution by processor 1610, saturation evaluation instructions 1744 evaluate if local region pixel values 870 meet below-saturation criterion 952, retrieved from parameter storage 1770. Saturation evaluation instructions 1744 utilize fitting instructions 1750. Saturation evaluation instructions 1744 may be configured to retrieve local region pixel values 870 from dynamic data storage 1780. Saturation evaluation instructions 1744 and processor 1610 cooperate to form an embodiment of saturation evaluator 1550.

Upon execution by processor 1610, disparity evaluation instructions 1746 compare the disparity between long-exposure-time pixel values 870 and short-exposure-time pixel values 870, associated with the first color, to disparity threshold 966 retrieved from parameter storage 1770. Disparity evaluation instructions 1746 utilize fitting instructions 1750. Disparity evaluation instructions 1746 may be configured to retrieve local region pixel values 870 from dynamic data storage 1780. Disparity evaluation instructions 1746 and processor 1610 cooperate to form an embodiment of disparity evaluator 1560.

Upon execution by processor 1610, variance evaluation instructions 1748 evaluate variance of pixel values 870.

Variance evaluation instructions 1748 may be configured to retrieve local region pixel values 870 from dynamic data storage 1780. Variance evaluation instructions 1748 and processor 1610 cooperate to form an embodiment of variance evaluator 968.

Upon execution by processor 1610, master instructions 1740 commands execution, by processor 1610, of (a) evaluation instructions 1742, and (b) according to the outcome of execution of evaluation instructions 1742, motion-compensating HDR demosaicing instructions 1636 or non-motion-compensating demosaicing instructions 1642. Master instructions 1740 and processor 1610 cooperate to form an embodiment of master 940 as implemented in HDR image generator 1500.

Without departing from the scope hereof, machine-readable instructions 1730 may, for example together with parameters of parameter storage 1770, be provided as a stand-alone software product configured for implementation on a third-party computer that has (a) a non-transitory memory for storage of machine-readable instructions 1730 and, optionally, parameters of parameter storage 1770, and (b) a processor for execution of machine-readable instructions 1730.

Figure 18:
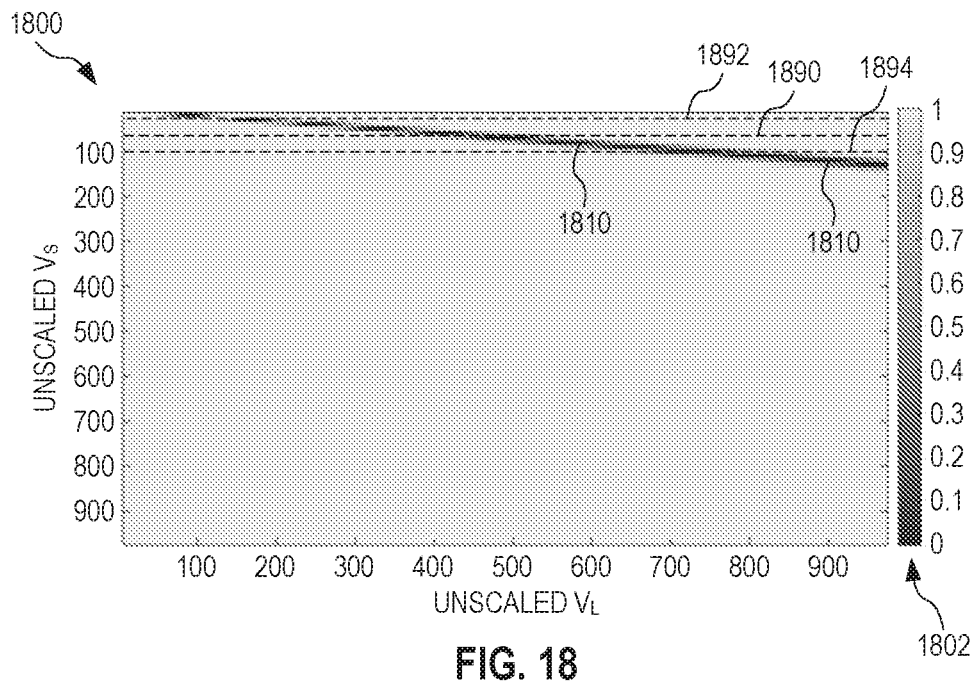
FIG. 18 is a map of a blending function that defines the relative combination weights of a short-exposure-time color image and a long-exposure-time color image to generate an HDR image, according to an embodiment.

FIG. 18 is a map 1800 of one example blending function $f$ that defines the relative combination weights of a short-exposure-time color image and a long-exposure-time color image to generate an HDR image. The pixel value $V_{out,C}$ of each pixel of the HDR image may be expressed as:

$$V_{out,C} = (1-f)V_{C,L} + frV_{C,S},\quad\text{(Eq. 14)}$$

wherein the index C takes on one of the values 1, 2, and 3 to indicate the first, second, or third color, respectively, wherein $V_{C,S}$ and $V_{C,L}$ are short-exposure-time and long-exposure-time values, respectively, for the HDR image pixel and the color under consideration, and wherein r is the ratio of the long exposure time to the short exposure time. Eq. 14 treats each color separately, and the resulting HDR image is therefore in the form of a color mosaic. This color mosaic may be demosaiced to produce an HDR color image, wherein each pixel has full color information. The blending function $f$ of Eq. 14 is a function of $V_{C,S}$ and $V_{C,L}$ for at least one color. For example, the blending function $f$ may be determined based upon $V_{1,S}$ and $V_{1,L}$ and then applied to $V_{2,S}$, $V_{2,L}$, $V_{3,S}$, and $V_{3,L}$ for spatially co-located pixels. Alternatively, the blending function $f$ is determined separately for each color. The blending function $f$ may be the same as, or similar to, the motion parameter m discussed above in reference to FIG. 5 and Eqs. 7-13. $V_{C,S}$ and $V_{C,L}$ may be $\beta_{C,S}$ and $\beta_{C,L}$, respectively.

Map 1800 plots the value of blending function $f$ a function of $V_{C,S}$ (vertical axis) and $V_{C,L}$ (horizontal axis), according to scale 1802. Away from a region 1810 where $V_{C,L}$ is similar to $rV_{C,S}$, the value of blending function $f$ is close to one. The blending function $f$ dips to zero in region 1810 where $V_{C,L}$ is similar to $rV_{C,S}$ (seen as a dark belt in map 1800).

The example blending function $f$, plotted in FIG. 18, is of the same form as the motion parameter m according to Eq. 13. This example blending function $f$ is therefore defined by the transcendental equation $$f = \tanh\left[\frac{\max\left[0, |rV_{1,S} - V_{1,L}| - k\sqrt{\mathrm{Var}(V_{1,S}, V_{1,L}, f)}\right]}{\alpha_1 \sqrt{\mathrm{Var}(V_{1,S}, V_{1,L}, f)}} \tanh(\alpha_2 V_{1,S})\right],\quad\text{(Eq. 15)}$$

However, without departing from the scope hereof, the blending function $f$ may be another transcendental function that is generally close to one but dips to zero when $V_{C,L}$ is similar to $rV_{C,S}$. In the example plotted in FIG. 18, the exposure time ratio r equals 8, such that the blending function $f$ dips to zero in the region around $V_{C,L}=8V_{C,S}$. The exposure time ratio r may be different from 8, without departing from the scope hereof.

Figure 19:
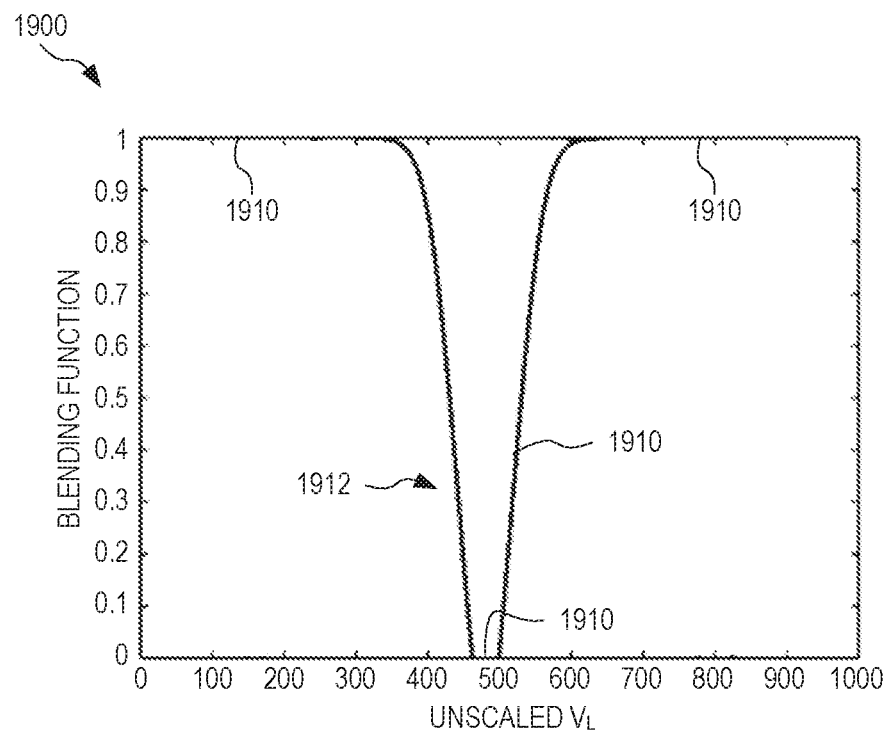
FIG. 19 is a plot of the blending function of FIG. 18 versus the long-exposure-time pixel.

FIG. 19 is a plot 1900 of the blending function $f$ of FIG. 18, plotted as curve 1910, versus the long-exposure-time pixel value $V_{C,L}$ for a single value of the short-exposure-time value $V_{C,S}$, namely $V_{C,S}=60$. Curve 1910 is equivalent to a line profile of map 1800 taken along dashed line 1890 (defined by $V_{C,S}=60$). Curve 1910 is generally close to one, except for at dip 1912 that peaks at $V_{C,L}=8V_{C,S}=480$. In a region around $V_{C,L}=8V_{C,S}$, dip 1912 is clamped to zero by the max function in Eq. 15.

It is possible to solve Eq. 14 numerically to determine the blending function $f$ for each set of pixel values $V_{C,S}$ and $V_{C,L}$, respectively associated with each output pixel value of the HDR image, for example using Newton's iterative method. The time and/or computational power required may, however, make such an approach less attractive, especially if the computations are to be performed onboard a mobile device (e.g., a cell phone) for each frame of a video stream. As an alternative to solving Eq. 14 in real time, map 1800 may be pre-calculated and encoded as a two-dimensional lookup table.

Figure 20:
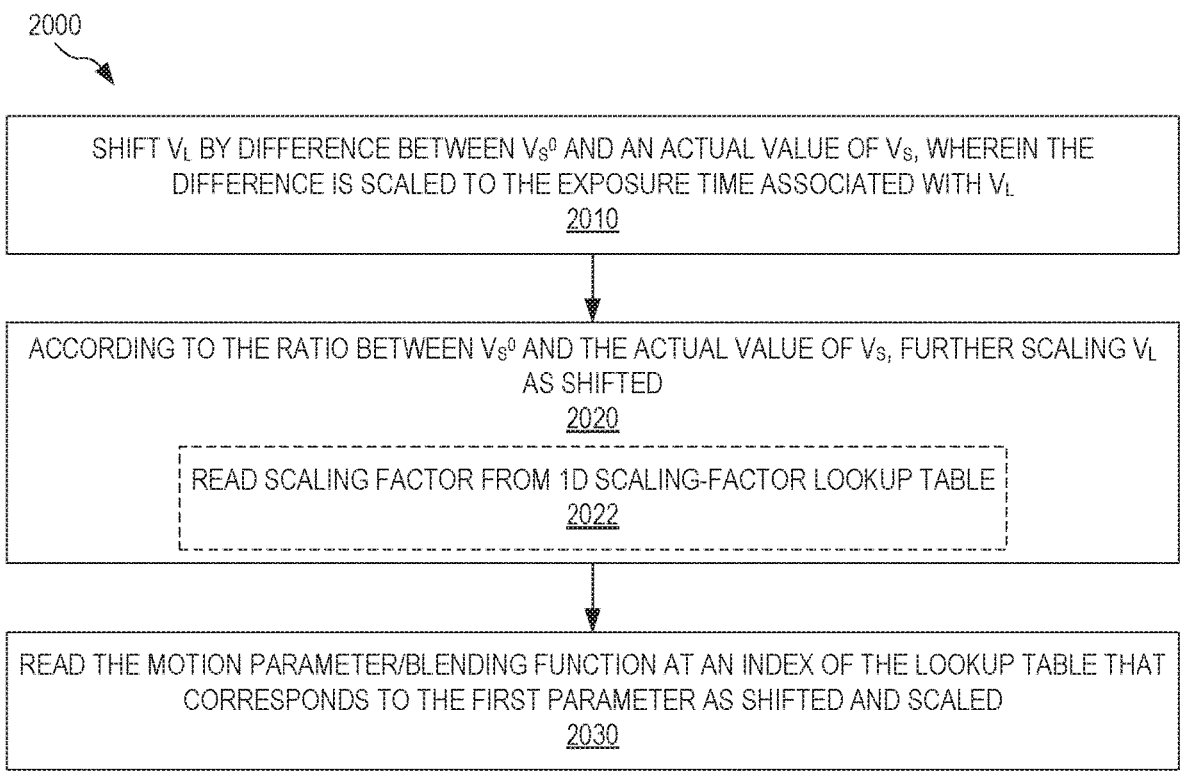
FIG. 20 illustrates a method that uses a one-dimensional lookup table to determine the value of a transcendental blending function, according to an embodiment.

FIG. 20 illustrates one method 2000 that uses a one-dimensional (1D) lookup table to determine the value of a transcendental blending function. Method 2000 may be used to determine the value of the blending function $f$, discussed above in reference to FIGS. 18 and 19, for any pair of values of the short-exposure-time value $V_{C,S}$ and the long-exposure-time pixel value $V_{C,L}$. Method 2000 may be implemented in step 530 of method 500. Method 2000 utilizes a one-dimensional lookup table that encodes the $f(V_{C,L})$ for a single value $V_{C,S}^0$ of $V_{C,S}$.

Curve 1910 of FIG. 19 is one example of the values encoded in the 1D lookup table used by method 2000. More generally, the 1D lookup table encodes a function that has a peak. In the following, the peak is considered to be a negative peak, i.e., a dip, but the peak may be a positive peak instead.

By manipulation of the value of $V_{C,L}$ prior to lookup in the 1D lookup table and according to how the actual value of $V_{C_S}$ differs $V_{C,S}^0$, method 2000 can use the 1D lookup table, valid for $V_{C,S}^0$, to read the value of the blending function for values of $V_{C_S}$ that are different from $V_{C,S}^0$. Method 2000 includes a shifting step 2010 and a scaling step 2020 to manipulate the value of $V_{C,L}$ before performing a lookup step 2030. Step 2010 shifts the value of $V_{C,L}$ to determine a shifted value $V_{C,S}' = V_{C,L} - r(V_{C,S} - V_{C,S}^0)$.

In certain implementation scenarios, method 2000 may be significantly faster than a method using a 2D lookup table to determine the value of the blending function $f$. In a mobile device with limited memory resources, such as a camera-equipped smartphone, the 1D lookup table used by method 2000 may be stored in fast local memory cache, such that readouts from the 1D lookup table is fast. The preceding operations of method 2000, steps 2010 and 2020, may be performed using multiplication and addition/subtraction operations, which are computationally cheap and therefore relatively fast. For comparison, a 2D lookup table would require several megabytes of storage space, which exceeds the capacity of the fast local memory cache of a typical mobile camera device. In such devices, the 2D lookup table would therefore need to be stored in slower memory, and the readout process would be significantly slower than for a 1D lookup table stored in fast local memory cache.

Figure 21:
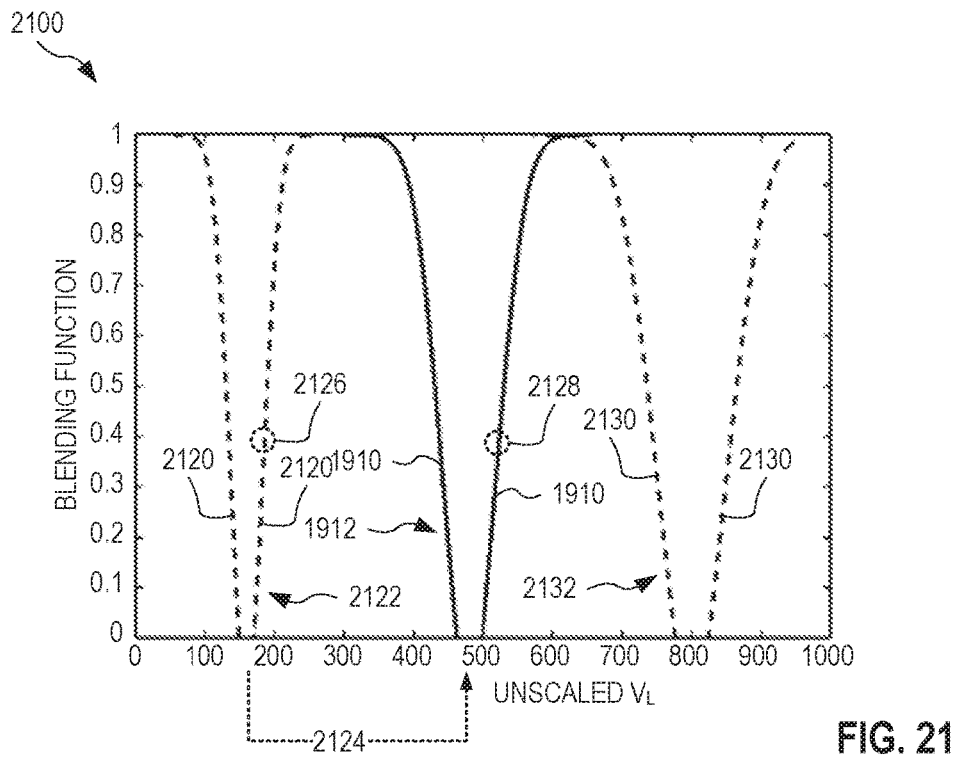
FIG. 21 is a plot that shows one example of pixel-value shifting in a step of the method of FIG. 20.

FIG. 21 is a plot 2100 that shows one example of pixel-value shifting in step 2010 of method 2000. FIG. 21 plots curve 1910 of FIG. 19 together with curves 2120 and 2130. Curve 1910 specifies $f(V_{C,L})$ for $V_{C,S}^0=60$. Curve 2120 specifies $f(V_{C,L})$ for $V_{C,S}=20$. Curve 2120 is equivalent to a line profile of map 1800 taken along dashed line 1892. Curve 2120 has a dip 2122 where $V_{C,L} \approx 8 \times 20 = 160$. Curve 2130 specifies $f(V_{C,L})$ for $V_{C,S}=100$. Curve 2130 is equivalent to a line profile of map 1800 taken along dashed line 1894. Curve 2130 has a dip 2132 where $V_{C,L} \approx \% 8 \times 100 = 800$.

Referring now to FIGS. 20 and 21 in combination for an example, when the actual value $V_{C,S}=20$, step 2010 computes a shifted value $V_{C,S}'=V_{C,L}-r(V_{C,S}-V_{C,S}^0)=V_{C,L}-8(20-60)=V_{C,L}+320$. For example, if the actual value of $V_{C,L}$ is 160, curve 2120 indicates that the value of the blending function $f$ should be zero. However, the 1D lookup table contains the data of curve 1910, not curve 2120. Step 2010 partly corrects this issue by shifting the actual value of $V_{C,L}$ (i.e., 160) to $V_{C,L}'=160+320=480$, which coincides with dip 1912 of curve 1910 where the blending function $f$ is indeed zero. This shift, indicated by arrow 2124, compensates for the offset between dips 2122 and 1912. An issue remains, namely that dip 2122 is narrower than dip 1912. (As indicated by the widths of dips 2122, 1912, and 2132, the width of the dip increases with the value of $V_{C,S}$.) Thus, for actual values of $V_{C,L}$ that are on the slope of dip 2122, further correction is required to determine the value of the blending function $f$ with accuracy.

Step 2020 further scales $V_{C,L}'$ according to the ratio between $V_{C,S}^0$ and the actual value of $V_{C,S}$. Step 2020 thereby, at least approximately, corrects for the issue of the dip width increasing with the value of $V_{C,S}$. Step 2020 computes a scaled value $V_{C,L}''V_{C,L}^0 + \sqrt{V_{C,S}^0/V_{C,S}}(V_{C,L}'-V_{C,L}^0)$ wherein $V_{C,L}^0$ is the center position of the dip of $f(V_{C,L},V_{C,S}^0)$. In the example of $V_{C,S}^0=60$ (curve 1910), the center position $V_{C,L}^0=480$. In the example of $V_{C,S}^0=60$ and $V_{C,S}=20$, the scaling performed in step 2020 corresponds to scaling of the dip width by a factor $\sqrt{V_{C,S}^0/V_{C,S}}=60/20=1.73$. Simulations have shown that the scaling performed in step 2020 is an excellent approximation and at least nearly perfectly corrects for the dip width dependence on $V_{C,S}$.

In certain embodiments, step 2020 includes a step 2022 of reading the scaling factor $\sqrt{V_{C,S}^0/V_{C,S}}$ from a 1D scaling-factor lookup table, wherein each entry of the 1D scaling-factor lookup table lists the scaling factor $\sqrt{V_{C,S}^0/V_{C,S}}$ for a respective value of $V_{C,S}$. Reading the scaling factor $\sqrt{V_{C,S}^0/V_{C,S}}$ from a 1D scaling-factor lookup table may be faster than calculating the scaling factor. In a mobile device with limited memory resources, such as a camera-equipped smartphone, the 1D lookup table used by step 2022 may be stored in fast local memory cache and step 2022 may thus benefit from the same fast readout as discussed above, in reference to implementations of method 2000 encoding the 1D lookup table of step 2030 in fast local memory cache. Without departing from the scope hereof, the scaling factor may be a more complex function of $V_{C,S}$ than $\sqrt{V_{C,S}^0/V_{C,S}}$, in which case encoding of the scaling function in a 1D lookup table may be even more advantageous in terms of computational efficiency.

After shifting and scaling of $V_{C,L}$ in steps 2010 and 2020, step 2030 reads the value of the blending function $f$ at the index $V_{C,L}''$ of the 1D lookup table. For example, when $V_{C,S}=20$ and $V_{C,L}=180$ (corresponding to location 2126 on the righthand slope of curve 2120 in FIG. 21) and $V_{C,S}^0=60$, step 2030 reads the entry in the 1D lookup table at the index $V_{C,L}''=480+\sqrt{60/20}[(180-8(20-60))-480] \cong 515$. At this index location, step 2030 reads out the value of curve 1910 indicated at location 2128 in FIG. 21, which matches the value that location 2126 on curve 2120 shows is the correct value.

Without departing from the scope hereof, method 2000 may be performed with the roles of $V_{C,L}$ and $V_{C,S}$ switched and instead utilize a 1D lookup table that lists $f(V_{C,S})$ for a single value of $V_{C,L}$.

Method 2000 may be implemented in step 530 of method 500 to determine the motion parameter m (e.g., motion parameter 872). Method 200 may be encoded in motion instructions 1634 of system 1600, for example in conjunction with the 1D lookup table being either encoded as part of motion instructions 1634 or stored to dynamic data storage 1680.

Figure 22:
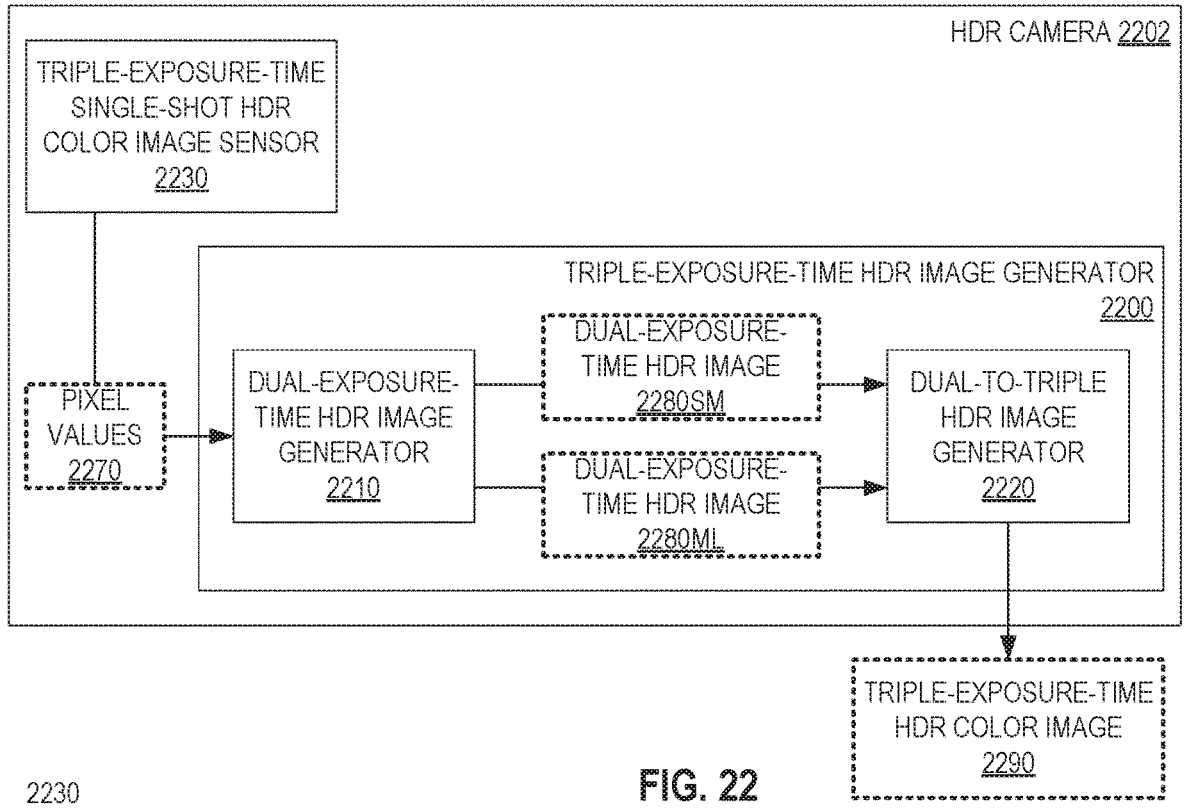
FIG. 22 illustrates a HDR camera for generating triple-exposure-time HDR color images, according to an embodiment.

FIG. 22 illustrates one HDR camera 2202 for generating triple-exposure-time HDR color images 2290. HDR camera 2202 may be implemented in image capture device 140. HDR camera 2202 includes a triple-exposure-time single-shot HDR color image sensor 2230 and a triple-exposure-time HDR image generator 2200. Image sensor 2230 is configured to expose some of its photosensitive pixels at a short exposure time $T_S$, others of its photosensitive pixels at a medium exposure time $T_M$, and yet others of its photosensitive pixels at a long exposure time $T_L$, wherein $T_S < T_M < T_L$. Hence, each image frame captured by image sensor 2230 contains short-exposure-time image data, medium-exposure-time image data, and long-exposure time image data. Triple-exposure-time HDR image generator 2200 combines the short-exposure-time image data, medium-exposure-time image data, and long-exposure time image data to form triple-exposure-time HDR color images 2290. Triple-exposure-time HDR image generator 2200 performs this image data combination in a two-stage process. First, a dual-exposure-time HDR image generator 2210 generates (a) a dual-exposure-time HDR image 2280SM from a combination of short-exposure-time pixel values from the short-exposure-time pixels and medium-exposure-time pixel values from the medium-exposure-time pixels, and (b) a dual-exposure-time HDR image 2280ML from a combination of medium-exposure-time pixel values from the medium-exposure-time pixels and long-exposure-time pixel values from the long-exposure-time pixels. Next, a dual-to-triple HDR image generator 2220 generates triple-exposure-time HDR color image 2290 from dual-exposure-time HDR images 2280SM and 2280ML.

As compared to HDR camera 110, HDR camera 2202 allows for further extension of the dynamic range by virtue of using three different exposure times as opposed to only two different exposure times. Alternatively, HDR camera 2202 may be configured to achieve a dynamic range similar to that of HDR camera 110 while using an embodiment of image sensor 2230 characterized by a smaller bit depth than image sensor 120.

Due to the different durations of the short, medium, and long exposure times, the short-exposure-time image data, medium-exposure-time image data, and long-exposure time image data may be representative of different scene compositions when the scene is subject to motion. Triple-exposure-time HDR image generator 2200 may be configured to compensate for motion in the scene to eliminate or at least reduce motion-artifacts. The bit depth of image sensor 2230 may be the same as, smaller than, or greater than the bit depth of image sensor 120.

Figure 23:
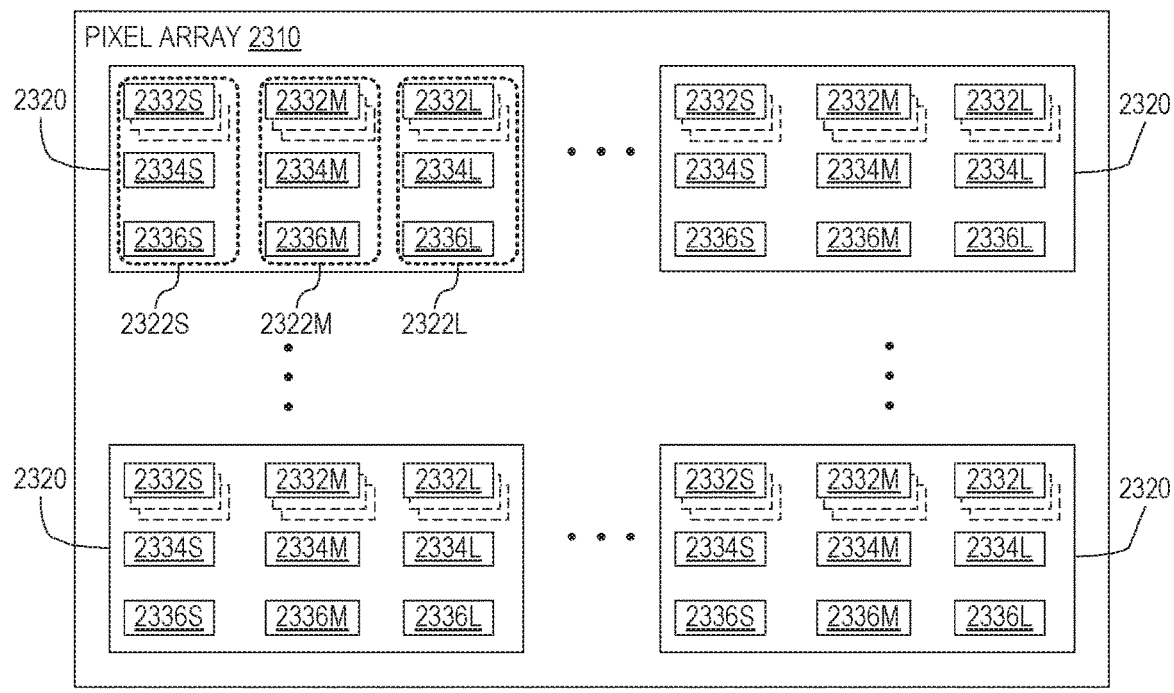
FIG. 23 shows the triple-exposure-time single-shot HDR color image sensor of the system of FIG. 22 in further detail.

FIG. 23 shows triple-exposure-time single-shot HDR color image sensor 2230 in further detail. Image sensor 2230 includes a pixel array 2310. Pixel array 2310 includes an array of identical pixel groups 2320. Each pixel group 2320 includes short-exposure-time pixels 2322S, medium-exposure-time pixels 2322M, and long-exposure-time pixels 2322L. Short-exposure-time pixels 2322S include pixels 2332S, 2334S, and 2336S sensitive to light of a first, second, and third color, respectively. The first second, and third colors may be green, red, and blue, respectively. Medium-exposure-time pixels 2322M include pixels 2332M, 2334M, and 2336M sensitive to light of the first, second, and third color, respectively. Long-exposure-time pixels 2322L include pixels 2332L, 2334L, and 2336L sensitive to light of the first, second, and third color, respectively.

Each pixel group 2320 may, without departing from the scope hereof, include more than one instance of one or more of sensor pixels 2332S, 2334S, 2336S, 2332M, 2334M, 2336M, 2332L, 2334L, and 2336L. For example, each pixel group 2320 may include a plurality of pixels 2332S, a plurality of pixels 2332M, and a plurality of pixels 232L sensitive to the first color. In one implementation, the first color is green.

Referring again to FIG. 22, triple-exposure-time HDR image generator 2200 processes pixel values 2270 produced by sensor pixels 2332S, 2334S, 2336S, 2332M, 2334M, 2336M, 2332L, 2334L, and 2336L of each pixel group 2320 to generate triple-exposure-time HDR color image 2290.

Triple-exposure-time HDR image generator 2200 may be implemented in the form of a processor and machine-readable instructions, encoded in non-transitory memory, that, upon execution by the processor, process pixel values 2270 from image sensor 2230 to generate triple-exposure-time HDR color image 2200 or a portion thereof. Certain embodiments of triple-exposure-time HDR image generator 2200 are provided as machine-readable instructions encoded in non-transitory memory, wherein the machine-readable instructions are configured to cooperate with a processor provided by a third party to process pixel values 2270 from image sensor 2230 to generate triple-exposure-time HDR color image 2290 or a portion thereof.

Without departing from the scope hereof, triple-exposure-time HDR image generator 2200 may be provided as a stand-alone product configured to generate triple-exposure-time HDR color image 2290 from pixel values 2270 received from a triple-exposure-time single-shot HDR color image sensor 2230 provided by a third party.

Figure 24:
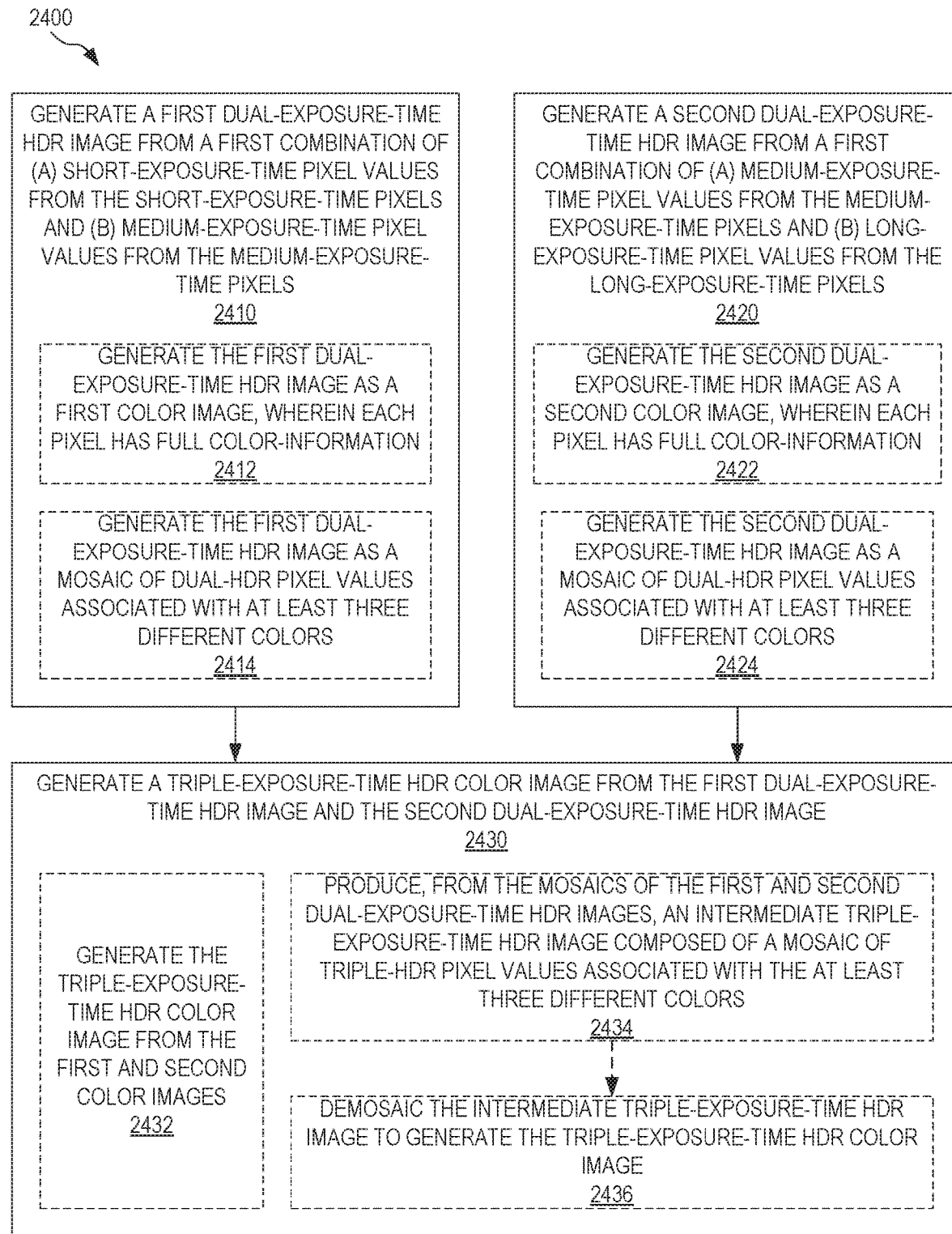
FIG. 24 illustrates a method for generating an HDR color image from a triple-exposure-time single-shot HDR color image sensor, according to an embodiment.

FIG. 24 illustrates one method 2400 for generating an HDR color image from a triple-exposure-time single-shot HDR color image sensor having a plurality of short-exposure-time pixels, a plurality of medium-exposure-time pixels, and a plurality of long-exposure-time pixels. Method 2400 is, for example, performed by triple-exposure-time HDR image generator 2200. Method 2400 includes steps 2410, 2420, and 2430.

Step 2410 generates a first dual-exposure-time HDR image from a combination of (a) short-exposure-time pixel values from the short-exposure-time pixels and (b) medium-exposure-time pixel values from the medium-exposure-time pixels. In one example of step 2410, dual-exposure-time image HDR generator 2210 generates dual-exposure-time HDR image 2280SM from a combination of (a) pixel values 2270 from short-exposure-time pixels 2322S and (b) pixel values 2270 from medium-exposure-time pixels 2322M.

Step 2420 generates a second dual-exposure-time HDR image from a combination of (a) medium-exposure-time pixel values from the medium-exposure-time pixels and (b) long-exposure-time pixel values from the long-exposure-time pixels. In one example of step 2420, dual-exposure-time HDR image generator 2210 generates dual-exposure-time HDR image 2280ML from a combination of (a) pixel values 2270 from medium-exposure-time pixels 2322M and (b) pixel values 2270 from long-exposure-time pixels 2322L.

Step 2430 generates a triple-exposure-time HDR color image from the first dual-exposure-time HDR image and the second dual-exposure-time HDR image, generated in steps 2410 and 2420, respectively. In one example of step 2430, dual-to-triple HDR image generator 2220 generates triple-exposure-time HDR color image 2290 from dual-exposure-time HDR images 2280SM and 2280ML received from dual-exposure-time HDR image generator 2210.

In one embodiment, the dual-exposure-time images formed in steps 2410 and 2420 are full-color images. In another embodiment, the dual-exposure-time images formed in steps 2410 and 2420 are color-mosaic images. Herein, a "full-color image" refers to an image, wherein each pixel has full color information, whereas a "color-mosaic image" refers to an image formed by a mosaic of different types of color-specific pixels (e.g., red, green, and blue).

In the full-color embodiment, steps 2410 and 2420 implement steps 2412 and 2422, respectively, and step 2430 implements a step 2432. Steps 2412 and 2422 generate the first and second dual-exposure-time HDR image as first and second full-color images, respectively. Each of steps 2412 and 2422 include a demosacing step. In one example of steps 2412 and 2422, dual-exposure-time HDR image generator 2210 generates dual-exposure-time HDR images 2280SM and 2280ML as full-color images. In this example, dual-exposure-time HDR image generator 2210 may generate each of dual-exposure-time HDR images 2280SM and 2280ML according to a method similar to method 500, that is, with demosaicing being integrated in the HDR combination. Alternatively, dual-exposure-time HDR image generator 2210 may first generate each of dual-exposure-time HDR images 2280SM and 2280ML as a color-mosaic HDR image and then, subsequently, demosaic the color-mosaic HDR image to generate an HDR full-color image. Step 2432 generates the triple-exposure-time HDR color image from the first and second color images. In one example of step 2432, dual-to-triple HDR image generator 2220 generates a triple-exposure-time HDR color image 2290 from full-color embodiments of dual-exposure-time HDR images 2280SM and 2280ML received from dual-exposure-time HDR image generator 2210.

In the color-mosaic embodiment, steps 2410 and 2420 implement steps 2414 and 2424, respectively, and step 2430 implements sequential steps 2434 and 2436. Steps 2414 and 2424 generate the first and second dual-exposure-time HDR image as first and second color-mosaic images, respectively. In one example of steps 2414 and 2424, dual-exposure-time HDR image generator 2210 generates dual-exposure-time HDR images 2280SM and 2280ML as color-mosaic images. For example, dual-exposure-time HDR image generator 2210 (a) combines pixel values 2270 from pixels 2332S and 2332M to generate a set of first-color pixels of dual-exposure-time HDR image 2280SM, and (b) combines pixel values 2270 from pixels 2332M and 2332L to generate a set of first-color pixels of dual-exposure-time HDR image 2280ML. Step 2434 produces, from the first and second color-mosaic images generated in steps 2414 and 2424, an intermediate triple-exposure-time HDR image that is a color-mosaic image. Next, step 2436 demosaics the intermediate triple-exposure-time HDR image to generate an HDR full-color image. In one example of steps 2434 and 2436, dual-to-triple HDR image generator 2220 combines (in step 2434) color-mosaic embodiments of dual-exposure-time HDR images 2280SM and 2280ML to form a color-mosaic triple-exposure-time HDR image, and then (in step 2436) demosaics the color-mosaic triple-exposure-time HDR image to generate triple-exposure-time HDR color image 2290.

Figure 25:
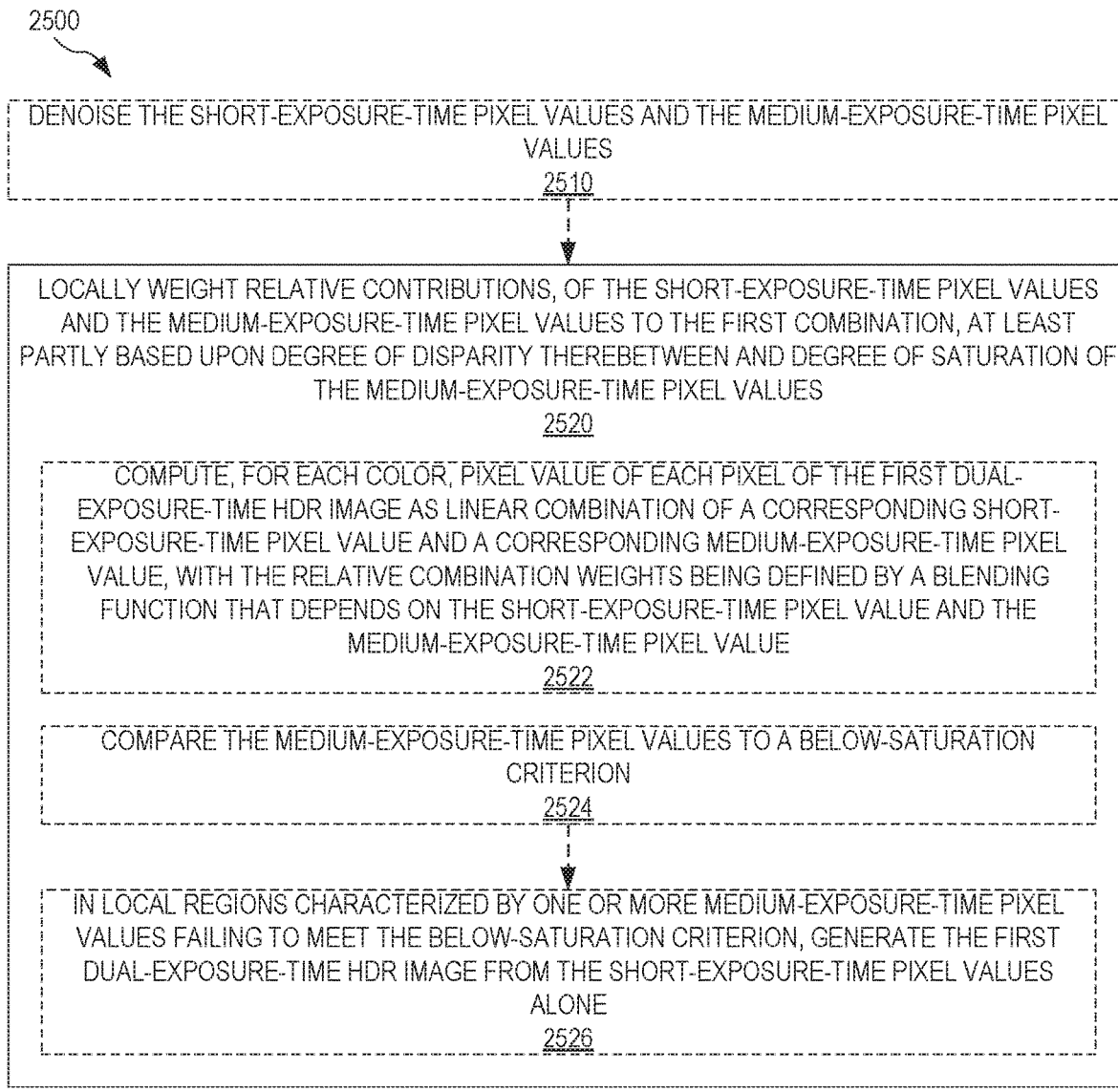
FIG. 25 illustrates a method for generating a dual-exposure-time HDR image from a triple-exposure-time HDR color image sensor, according to an embodiment.

FIG. 25 illustrates one method 2500 for generating the first dual-exposure-time HDR image from a triple-exposure-time HDR color image sensor. Method 2500 is an embodiment of step 2410 of method 2400 and may be performed by dual-exposure-time HDR image generator 2210. Method 2500 may be implemented in either one of the full-color embodiment of method 2400 and the color-mosaic embodiment of method 2400.

Method 2500 includes a step 2520 of locally weighting relative contributions of the short-exposure-time pixel values and the medium-exposure-time pixel values to the first combination. Step 2520 weights the relative contributions at least partly based upon (a) the degree of disparity (e.g., any one of $\Delta_a$, $\Delta_n$, and $\Delta_r$ discussed above in reference to FIG. 5) between the short-exposure-time pixel values and the medium-exposure-time pixel values and (b) the degree of saturation of the medium-exposure-time pixel values. In one example of step 2520, dual-exposure-time HDR image generator 2210 locally weights the contribution, to dual-exposure-time HDR image 2280SM, of pixel values 2270 of short-exposure-time pixels 2322S versus the contribution of pixel values 2270 of medium-exposure-time pixels 2322M at least partly based upon (a) the degree of disparity between short-exposure-time pixels 2322S and medium-exposure-time pixels 2322M and (b) the degree of saturation of medium-exposure-time pixels 2322M.

Step 2520 may include a step 2522 of computing, for each color, the pixel value of each pixel of the first dual-exposure-time HDR image as linear combination of a corresponding short-exposure-time pixel value and a corresponding medium-exposure-time pixel value. In step 2522, the relative combination weights are defined by a blending function that depends on the short-exposure-time pixel value and the medium-exposure-time pixel value. In one example of step 2522, pertaining to the color-mosaic embodiment of method 2400, dual-exposure-time HDR image generator 2210 computes the pixel value of each pixel of dual-exposure-time HDR image 2280SM according to Eq. 14. In another example of step 2522, pertaining to the full-color embodiment of method 2400, dual-exposure-time HDR image generator 2210 computes the pixel value of each pixel of dual-exposure-time HDR image 2280SM according to method 500.

Step 2520 may include steps 2524 and 2526. Step 2524 compares the medium-exposure-time pixel values to a below-saturation criterion. In one example of step 2524, dual-exposure-time HDR image generator 2210 compares medium-exposure-time pixels 2322M to below-saturation criterion 952. Step 2526 uses the comparison performed in step 2524 to ensure that, in local regions characterized by one or more of the medium-exposure-time pixel values failing to meet the below-saturation criterion, step 2520 generates the first dual-exposure-time HDR image from the short-exposure-time pixel values alone. In one example of step 2526, dual-exposure-time HDR image generator 2210 uses the information about in which local regions medium-exposure-time pixels 2322M meet below-saturation criterion 952 and in which local regions medium-exposure-time pixels 2322M fail to meet below-saturation criterion 952. Step 2526 imposes this information on the computation of pixel values of the first dual-exposure-time HDR image: For the regions, where medium-exposure-time pixels 2322M fail to meet below-saturation criterion 952, step 2526 ensures that dual-exposure-time HDR image generator 2210 generates dual-exposure-time HDR image 2280SM exclusively from pixel values 2270 of short-exposure-time pixels 2322S.

Method 2500 may include a step 2510 that precedes step 2520. Step 2510 denoises the short-exposure-time pixel values and the medium-exposure-time pixel values prior to HDR combination in step 2520. Step 2510 may apply more aggressive denoising to the short-exposure-time pixel values than to the medium-exposure-time pixel values, since the short-exposure-time pixel values are scaled up relative to the medium-exposure-time pixel values when combining these pixel values in step 2520. Thus, any residual noise in the short-exposure-time pixel values is likely to have a greater impact on the accuracy of step 2520 than any residual noise in the medium-exposure-time pixel values. In one example of step 2520, dual-exposure-time HDR image generator 2210 denoises pixel values 2270 of short-exposure-time pixels 2322S and medium-exposure-time pixels 2322M. Step 2520 may use one or more denoising methods known in the art.

Method 2500 has a counterpart that forms an embodiment of step 2420 of method 2400 instead of step 2410. This counterpart method is similar to method 2500, apart from processing medium-exposure-time pixel values and long-exposure-time pixel values instead of short-exposure-time pixel values and medium-exposure-time pixel values, respectively, so as to generate the second dual-exposure-time HDR image instead of the first dual-exposure-time HDR image. In certain embodiments, one further difference applies: the counterpart method may skip computation of pixel values of the second dual-exposure-time HDR image in local regions characterized by the medium-exposure-time pixel values failing to meet the below-saturation criterion.

FIG. 26 illustrates one disparity-based method 2600 for generating a triple-exposure-time HDR color image from two dual-exposure-time HDR images. Method 2600 is an embodiment of step 2430 of method 2400 and may be implemented in either one of the full-color and color-mosaic embodiments of method 2400. Method 2600 may be performed by dual-to-triple HDR image generator 2220.

Method 2600 includes a step 2610 that locally weights relative contributions, of the first and second dual-exposure-time HDR images to the triple-exposure-time HDR color image. Step 2610 weights these relative contributions at least partly based upon at least (a) the degree of disparity between the short-exposure-time and medium-exposure-time pixel values, hereinafter referred to as the "short-medium disparity" and/or (b) the degree of disparity between the medium-exposure-time and long-exposure-time pixel values, hereinafter referred to as the "medium-long disparity". For example, if the short-medium disparity and the medium-long disparity are both significant for a local region, this could indicate that the local region is affected by motion, and step 2610 may assign greater weight to the first dual-exposure-time HDR image. If, for a local region, the medium-long disparity is significant and exceeds the short-medium disparity, this may also be an indication of motion, and step 2610 may assign greater weight to the first dual-exposure-time HDR image. Conversely, if the short-medium disparity significantly exceeds the medium-long disparity, this may be a result of excess noise in the first dual-exposure-time HDR image, and step 2610 may assign greater weight to the second dual-exposure-time HDR image. In one example of step 2610, dual-to-triple HDR image generator 2220 locally weights relative contributions of dual-exposure-time HDR images 2280SM and 2280ML to triple-exposure-time HDR color image 2290 based at least in part upon (a) the degree of disparity between short-exposure-time pixels 2322S and medium-exposure-time pixels 2322M determined in step 2520 of method 2500 and/or (b) the degree of disparity between medium-exposure-time pixels 2322M and long-exposure-time pixels 2322L determined in the counterpart of step 2520 pertaining to generation of the second dual-exposure-time HDR image.

Step 2610 may include a step 2612. Step 2612 imposes that, in local regions characterized by one or more long-exposure-time pixel values failing to meet the below-saturation criterion, step 2610 generates the triple-exposure-time HDR image from the first dual-exposure-time HDR image alone. In one example of step 2612, dual-to-triple HDR image generator 2220 generates triple-exposure-time HDR color image such that, in local regions characterized by long-exposure-time pixels 2322L failing to meet a below-saturation-criterion (e.g., below-saturation criterion 952), the corresponding pixel values are based upon dual-exposure-time HDR image 2280SM alone.

FIG. 27 illustrates one fusion-based method 2700 for generating a triple-exposure-time HDR color image from two dual-exposure-time HDR images. Method 2700 is an embodiment of step 2430 of method 2400. Method 2700 is an alternative to method 2600 and may be performed by dual-to-triple HDR image generator 2220. Whereas method 2600 looks backwards and combines the first and second dual-exposure-time images (generated in steps 2410 and 2420 of method 2400) based at least in part upon knowledge of the data from which the input images to method 2600 are generated, method 2700 looks forward and combines the first and second dual-exposure-time images according to an optimization of desirable qualities of the output image generated by method 2700.

Method 2700 includes a step 2710 that fuses two dual-exposure-time HDR images according to a local optimization of one or more quality measures of the triple-exposure-time HDR color image. Thus, step 2710 applies position-sensitive combination weights to the first and second dual-exposure-time images so as to optimize, in a position sensitive manner, one or more quality measures of the triple-exposure-time HDR color image. In one example of step 2710, dual-to-triple HDR image generator 2220 generates triple-exposure-time HDR color image 2290 by fusing dual-exposure-time HDR images 2280SM and 2280ML according to a local optimization of one or more quality measures of triple-exposure-time HDR color image 2290.

In an embodiment, step 2710 implements a step 2712 that sets the relative contributions, of the first and second dual-exposure-time HDR images to the triple-exposure-time HDR color image, exclusively according to the local optimization. In contrast to the approach of method 2600, step 2712 sets these relative contributions without consideration of either one of (a) the degree of disparity between the short-exposure-time and medium-exposure-time pixel values and (b) the degree of disparity between the medium-exposure-time and long-exposure-time pixel values. In one example of this embodiment, dual-exposure-time HDR images 2280SM and 2280ML are the only data fed to dual-to-triple HDR image generator 2220 that originates from pixel values 2270.

Step 2710 may implement a step 2714 of optimizing at least one of contrast, saturation, and well-exposedness of the triple-exposure-time HDR color image. Step 2714 may optimize these parameters in a manner similar to that discussed in Mertens, T., Kautz, J. and Van Reeth, F., 2007, October, "Exposure fusion", in Computer Graphics and Applications, 2007, PG'07, 15th Pacific Conference, pp. 382-390, IEEE (although in the present case, the optimization is applied to an output image of higher dynamic range than the input images without tone mapping, whereas the Mertens et al. paper is concerned with combination of input images to form a tone mapped output image having the same dynamic range as the input images).

In certain embodiments, step 2710 includes steps 2716 and 2718. Step 2716 scales at least one of the first and second dual-exposure-time HDR images to place the first and second dual-exposure-time HDR images on a common scale. In one example of step 2716, dual-to-triple HDR image generator 2220 scales at least one of dual-exposure-time HDR images 2280SM and 2280ML to place dual-exposure-time HDR images 2280SM and 2280ML on a common scale. For example, dual-exposure-time HDR image 2280SM may initially be on a scale that reflects the medium exposure time and dual-exposure-time HDR image 2280ML may initially be on a scale that reflects the long exposure time. Step 2718 generates the triple-exposure-time HDR color image with a dynamic range that encompasses the dynamic range of each of the first and second dual-exposure-time HDR images. In one example of step 2718, dual-to-triple HDR image generator 2220 generates triple-exposure-time HDR color image 2290 with a dynamic range that encompasses the dynamic range of each of dual-exposure-time HDR images 2280SM and 2280ML. For example, consider a scenario where the bit depth of triple-exposure-time HDR color image sensor 2230 is 10 bits and the exposure time relates according to the expressions $T_L=8*T_M$ and $T_M=8*T_S$. In this scenario, the bit depth of each of dual-exposure-time HDR images 2280SM and 2280ML may be 13 bits, such that (a) dual-exposure-time HDR image 2280SM encompasses the combined dynamic range of short-exposure-time pixels 2322S and medium-exposure-time pixels 2322M, and (b) dual-exposure-time HDR image 2280ML encompasses the combined dynamic range of medium-exposure-time pixels 2322M and long-exposure-time pixels 2322L. Further, in this scenario, the bit depth of triple-exposure-time HDR color image 2290 may be 16 bits to encompass the combined dynamic range of dual-exposure-time HDR images 2280SM and 2280ML and thus also the combined dynamic range of short-exposure-time pixels 2322S, medium-exposure-time pixels 2322M, and long-exposure-time pixels 2322L.

In a modified embodiment, step 2710 includes step 2718 but omits step 2716. This embodiment of method 2700 may be useful when the first and second dual-exposure-time images are already on the same scale when received by method 2700.

Method 2700 may optimize each color separately when fusing the first and second dual-exposure-time images. Alternatively, method 2700 may optimize the different colors (e.g., red, green, and blue) in a mutually dependent manner, or optimize only one of the colors (e.g., green).

Figure 28:
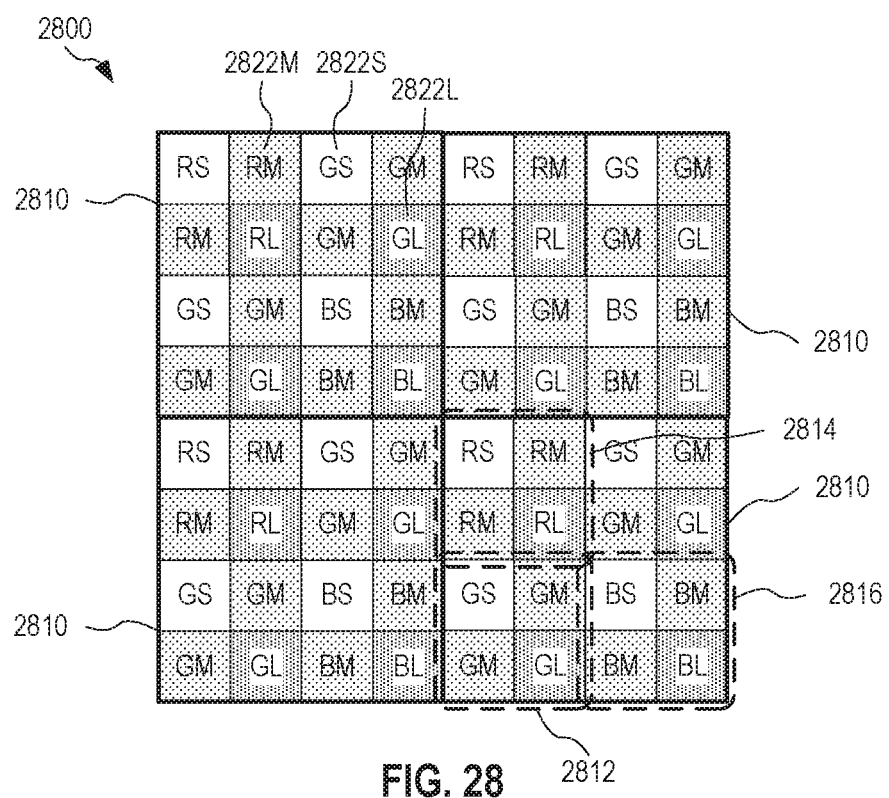
FIG. 28 illustrates a triple-exposure-time HDR color image sensor having its pixels arranged in color-specific quadruplets that each includes pixels sensitive to the three different exposure times, according to an embodiment.

FIG. 28 illustrates one triple-exposure-time HDR color image sensor 2800 having its pixels arranged in color-specific quadruplets that each includes pixels sensitive to the three different exposure times Image sensor 2800 is an embodiment of image sensor 2230. Image sensor 2800 includes an array of identical 4×4 pixel blocks 2810. For clarity of illustration, FIG. 28 depicts only four 4×4 pixel blocks 2810. It is understood that image sensor 2800 may include hundreds, thousands, or millions of 4×4 pixel blocks 2810. Each 4×4 pixel block 2810 includes four color-specific quadruplets, namely two 2×2 pixel groups 2812 sensitive to a first color (e.g., green), one 2×2 pixel group 2814 sensitive to a second color (e.g., red), and one 2×2 pixel group 2816 sensitive to a third color (e.g., blue). Each of 2×2 pixel groups 2812, 2814, and 1816 includes one short-exposure-time pixel 2822S, two medium-exposure-time pixels 2822M, and one long-exposure-time pixels 2822L.

In the specific example depicted in FIG. 28, image sensor 2800 is specifically sensitive to the colors red, green, and blue. In this example, each 2×2 pixel group 2812 is sensitive to green light and includes one short-exposure-time pixel 2822S labeled "GS", two medium-exposure-time pixels 2822M labeled "GM", and one long-exposure-time pixel 2822L labeled "GL". Similarly, each 2×2 pixel group 2814 is sensitive to red light and includes one short-exposure-time pixel 2822S labeled "RS", two medium-exposure-time pixels 2822M labeled "RM", and one long-exposure-time pixel 2822L labeled "RL"; and each 2×2 pixel group 2816 is sensitive to blue light and includes one short-exposure-time pixel 2822S labeled "BS", two medium-exposure-time pixels 2822M labeled "BM", and one long-exposure-time pixel 2822L labeled "BL".

Figure 29:
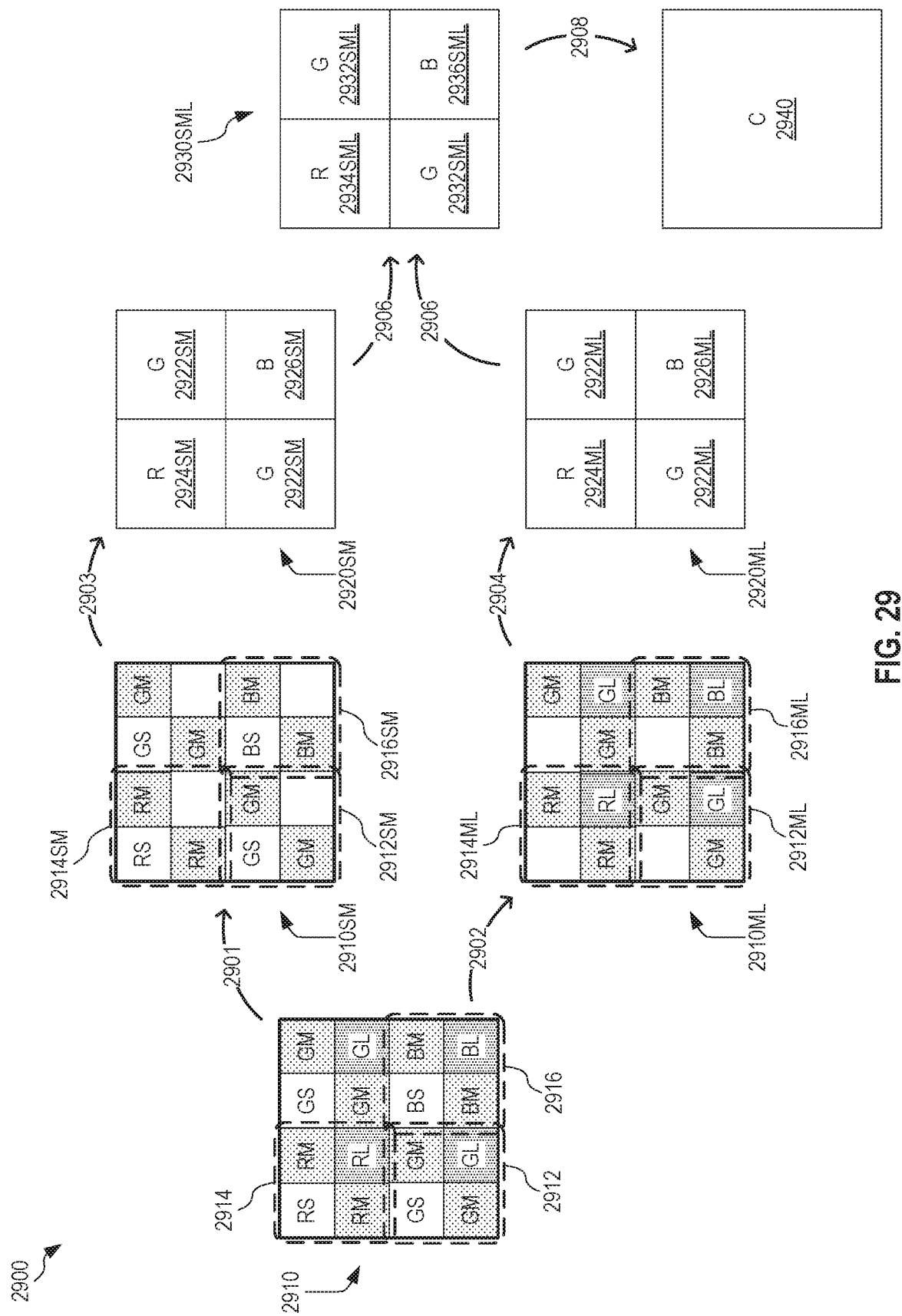
FIG. 29 illustrates a method for generating a triple-exposure-time HDR color image from the triple-exposure-time HDR color image sensor of FIG. 28, according to an embodiment.

FIG. 29 illustrates one method 2900 for generating a triple-exposure-time HDR color image from triple-exposure-time HDR color image sensor 2800. Method 2900 is an example of the color-mosaic embodiment of method 2400. Method 2900 may be performed by triple-exposure-time HDR image generator 2200.

The input to method 2900 is a plurality of 4×4 pixel value blocks 2910. For clarity of illustration, only a single block 2910 is depicted in FIG. 29. Each 4×4 pixel value block 2910 contains pixel values of a corresponding 4×4 pixel block 2810 of image sensor 2800. Each 4×4 pixel value block 2910 includes two 2×2 pixel value groups 2912 containing the pixel values of two corresponding 2×2 pixel groups 2812 of image sensor 2800. Each 2×2 pixel value group 2912 thus contains one pixel value GS, two pixel values GM, and one pixel value GL obtained from corresponding pixels GS, GM, and GL of image sensor 2800. Each 2×2 pixel value group 2914 contains one pixel value RS, two pixel values RM, and one pixel value RL obtained from corresponding pixels RS, RM, and RL of image sensor 2800. Each 2×2 pixel value group 2916 contains one pixel value BS, two pixel values BM, and one pixel value BL obtained from corresponding pixels BS, BM, and BL of image sensor 2800.

Method 2900 includes steps 2901, 2902, 2903, 2904, 2906, and 2908. Steps 2901 and 2903 form an embodiment of step 2410 of method 2400. Steps 2902 and 2904 form an embodiment of step 2420 of method 2400. Steps 2906 and 2908 are embodiments of steps 2434 and 2436, respectively, of method 2400. Steps 2901, 2902, 2903, and 2904 may be performed by dual-exposure-time HDR image generator 2210. Steps 2906 and 2908 may be performed by dual-to-triple HDR image generator 2220.

Step 2901 extracts short-exposure-time pixel values and medium-exposure-time pixel from each 4×4 pixel value block 2910. For each pixel value block 2910, step 2901 thus obtains a pixel block 2910SM that contains (a) in each of two 2×2 pixel groups 2912SM, one pixel value GS and two pixel values GM, (b) in a 2×2 pixel group 2914SM, one pixel value RS and two pixel values RM, and (c) in a 2×2 pixel group 2916SM, one pixel value BS and two pixel values BM.

Step 2903 then performs HDR combination within each of 2×2 pixel groups 2912SM, 2914SM, and 2916SM. Step 2903 may combine short-exposure-time pixel values and medium-exposure-time pixel according to method 2500. The output of step 2903 is a 2×2 HDR pixel block 2920SM that contains two dual-exposure-time HDR pixel values 2922SM pertaining to the green color channel (G), one dual-exposure-time HDR pixel value 2924SM pertaining to the red color channel (R), and one dual-exposure-time HDR pixel value 2926SM pertaining to the blue color channel (B). The plurality of 2×2 pixel blocks 2920SM, formed in step 2903, together form an example of a color-mosaic embodiment of dual-exposure-time HDR image 2280SM. This example of dual-exposure-time image 2280SM has half the resolution, in each of the vertical and horizontal dimension, as compared to the resolution of image sensor 2800. For example, if image sensor 2800 has 4000×3000 pixels, the dual-exposure-time HDR image formed in step 2903, in this scenario, has 2000×1500 pixels.

In one implementation, step 2903 performs the color-mosaic embodiment of method 2500 with the inclusion of step 2522 and optionally, also steps 2524 and 2526. In this implementation, step 2522 may utilize the blending function $f$ of Eq. 14 to set the relative combination weights of short-exposure-time pixels and medium-exposure-time pixels within each 2×2 pixel group 2912SM, 2914SM, and 2916SM of each 4×4 pixel block 2910SM. Step 2913 may determine the blending $f$ for each color separately, such that a separate determination of the blending function $f$ is made for each 2×2 pixel group 2912SM, 2914SM, and 2916SM. Alternatively, step 2913 may, for each 4×4 pixel block 2910SM, make one determination of the blending function $f$ for a predefined color (e.g., green based upon the pixel values in the two 2×2 pixel groups 2912SM) and then apply that value of the blending function $f$ to all 2×2 pixel groups 2912SM, 2914SM, and 2916SM within that 4×4 pixel block 2910SM. Step 2903 may utilize method 2000 to determine the value of the blending function $f$.

Steps 2902 and 2904 are similar to steps 2901 and 2903, respectively, except for being concerned with the combination of medium-exposure-time and long-exposure-time pixel values. Step 2902 extracts medium-exposure-time pixel values and long-exposure-time pixel from each 4×4 pixel value block 2910. For each pixel value block 2910, step 2902 thus obtains a pixel value block 2910ML that contains (a) in each of two 2×2 pixel groups 2912ML, one pixel value GL and two pixel values GM, (b) in a 2×2 pixel group 2914ML, one pixel value RL and two pixel values RM, and (c) in a 2×2 pixel group 2916ML, one pixel value BL and two pixel values BM.

Step 2904 then performs HDR combination within each of 2×2 pixel groups 2912ML, 2914ML, and 2916ML, in a manner similar to that discussed above for 2903. The output of step 2904 is a 2×2 HDR pixel block 2920ML that contains two dual-exposure-time HDR pixel values 2922ML pertaining to the green color channel (G), one dual-exposure-time HDR pixel value 2924ML pertaining to the red color channel (R), and one dual-exposure-time HDR pixel value 2926ML pertaining to the blue color channel (B). The plurality of 2×2 pixel blocks 2920ML, formed in step 2904, together form an example of a color-mosaic embodiment of dual-exposure-time image HDR 2280ML.

In certain embodiments, each of steps 2903 and 2904 apply denoising. In one such embodiment, step 2903 applies more aggressive denoising than step 2904 because residual noise in 2×2 pixel blocks 2920SM will be scaled up relative to residual noise in 2×2 pixel blocks 2920ML in subsequent step 2906. Step 2903 may also apply more aggressive denoising to short-exposure-time pixel values than to medium-exposure-time pixel values because step 2903 scales up residual noise in the short-exposure-time pixel values relative to residual noise in the medium-exposure-time pixel values. For similar reasons, step 2904 may apply more aggressive denoising to medium-exposure-time pixel values than to long-exposure-time pixel values.

Step 2906 combines corresponding pairs of 2×2 pixel blocks 2920SM and 2920ML to achieve triple-exposure-time HDR pixel values for each color separately. More specifically, step 2906 combines the color mosaic of each 2×2 pixel blocks 2920SM with the color mosaic of the corresponding 2×2 pixel blocks 2920ML to generate an intermediate 2×2 pixel block 2930. Each 2×2 pixel block 2930 includes two triple-exposure-time HDR pixel values 2932SML pertaining to the green channel (G), one triple-exposure-time HDR pixel value 2934SML pertaining to the red channel (R), and one triple-exposure-time HDR pixel value 2936SML pertaining to the blue channel (B).

Step 2906 forms each triple-exposure-time HDR pixel value 2932SML from a corresponding, co-located pair of dual-exposure-time HDR pixel values 2922SM and 2922ML, for example according to method 2600 or 2700. Step 2906 forms each triple-exposure-time HDR pixel value 2934SML from a corresponding, co-located pair of dual-exposure-time HDR pixel values 2924SM and 2924ML, for example according to method 2600 or 2700. Step 2906 forms each triple-exposure-time HDR pixel value 2936SML from a corresponding, co-located pair of dual-exposure-time HDR pixel values 2926SM and 2926ML, for example according to method 2600 or 2700. The plurality of intermediate 2×2 pixel block 2930, formed in step 2906 cooperate to form a color-mosaic triple-exposure-time HDR image, wherein each pixel has color-specific information.

Step 2908 demosaics each intermediate 2×2 pixel block 2930 to form a respective full-color, triple-exposure-time HDR 2940. Step 2908 may use demosaicing methods known in the art. The plurality of triple-exposure-time HDR 2940 cooperate to form an embodiment of triple-exposure-time HDR color image 2290.

Figure 30:
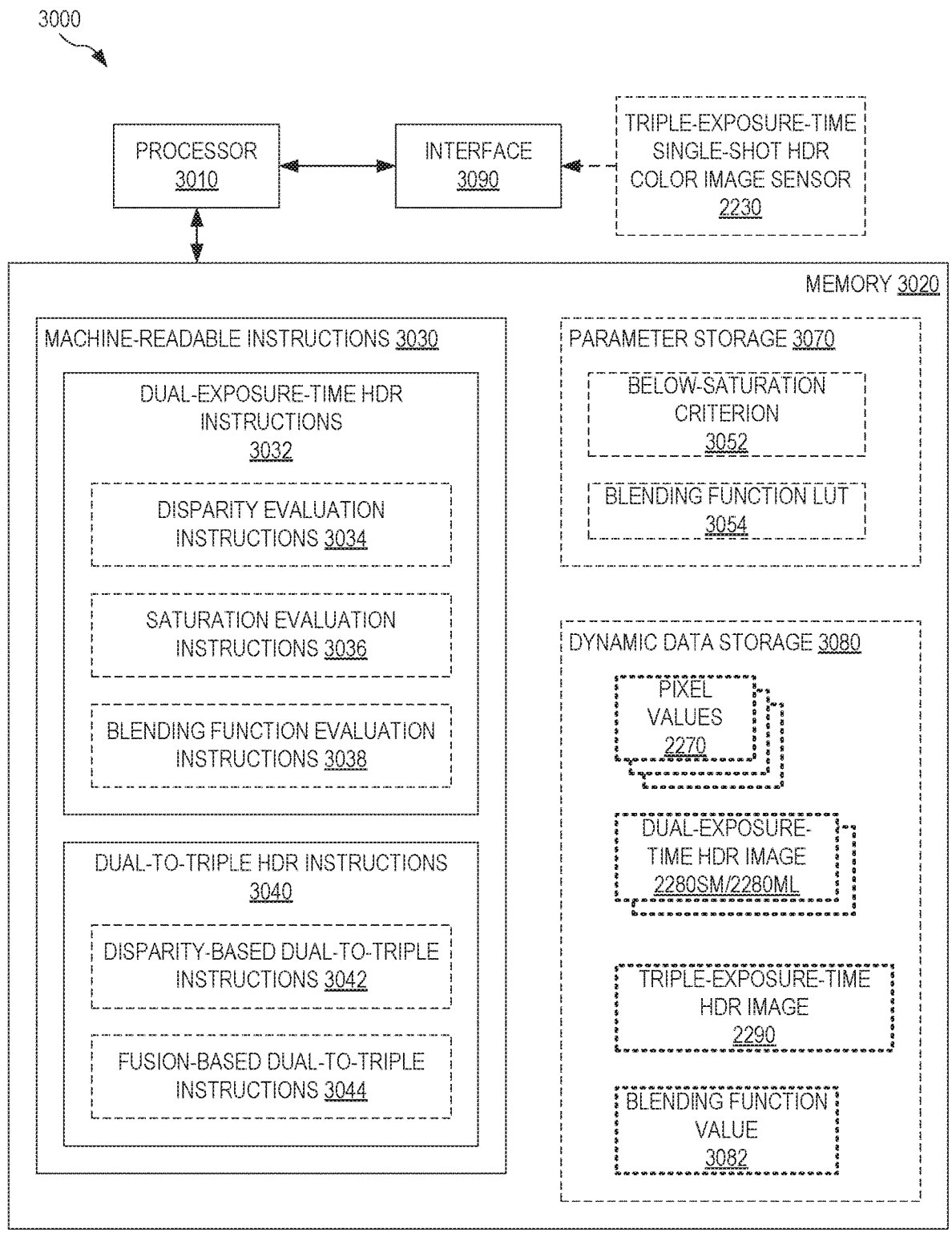
FIG. 30 illustrates a system for a generating triple-exposure-time HDR color image from a triple-exposure-time single-shot HDR color image sensor, according to an embodiment.

FIG. 30 illustrates one system 3000 for generating triple-exposure-time HDR color image 2290 from triple-exposure-time single-shot HDR color image sensor 2230. System 3000 may be implemented by a computer and is configured to perform method 2400. System 3000 includes a processor 3010, a non-transitory memory 3020, and an interface 3090. Processor 3010 and memory 3020 (and, in certain embodiments, interface 3090) cooperate to form an embodiment of triple-exposure-time HDR image generator 2200. System 3000 may further include triple-exposure-time single-shot HDR color image sensor 2230, in which case system 3000 is an embodiment of HDR camera 2202.

Memory 3020 includes machine-readable instructions 3030. Instructions 3030 may be encoded in a non-volatile portion of memory 3020. Instructions 3030 include dual-exposure-time instructions 3032 and dual-to-triple HDR instructions 3040. In one embodiment, memory 3020 further include a dynamic data storage 3080 configured to store data received via interface 3090 and/or data generated by instructions 3030 when executed by processor 3010. In another embodiment, system 3000 does not include memory 3020 but is instead configured to cooperate with an external memory, for example provided by a third party. Memory 3020 may also include a parameter storage 3070.

Upon execution by processor 3010, dual-exposure-time instructions 3032 obtains pixel values 2270 from image sensor 2230 or from dynamic data storage 3080, and performs (a) step 2410 of method 2400 to generate dual-exposure-time HDR image 2280SM and/or (b) step 2420 of method 2400 to generate dual-exposure-time HDR image 2280ML. Dual-exposure-time instructions 3032 may command processor 3010 to store dual-exposure-time HDR images 2280SM and/or 2280ML to dynamic data storage 3080.

In an embodiment, dual-exposure-time instructions 3032 are configured to perform step 2410 according to method 2500 and also perform step 2420 according to the corresponding counterpart of method 2500 (discussed above in reference to FIG. 25). In this embodiment, dual-exposure-time instructions 3032 may include one or more of disparity evaluation instructions 3034, saturation evaluation instructions 3036, and blending function evaluation instructions 3038. Upon execution by processor 3010, disparity evaluation instructions 3034 perform step 2520 of method 2500. Disparity evaluation instructions 3034 may be configured to call saturation evaluation instructions 3036 to perform steps 2524 and 2526 of method 2500. Saturation evaluation instructions 3036 may be configured to command processor 3010 to retrieve a below-saturation criterion 3052 from parameter storage 3070. Below-saturation criterion 3052 is an example of below-saturation criterion 952. Disparity evaluation instructions 3034 may also be configured to call blending function evaluation instructions 3038 to perform step 2524 of method 2500. In one implementation, blending function evaluation instructions 3038 are configured to perform method 2000. In this implementation, blending function evaluation instructions 3038 may command processor 3010 to access a blending function lookup table 3054 from parameter storage 3070. Blending function evaluation instructions 3038 may command processor 3010 to store blending function values 3082 to dynamic data storage 3080 and retrieve blending function values 3082 from dynamic data storage 3080 when needed.

Upon execution by processor 3010, dual-to-triple HDR instructions 3040 obtains dual-exposure-time HDR images 2280SM and 2280ML from dynamic data storage 3080, and performs step 2430 of method 2400 to generate triple-exposure-time HDR color image 2290. Dual-to-triple HDR instructions 3040 may command processor 3010 to store triple-exposure-time HDR color image 2290 to dynamic data storage 3080 or output triple-exposure-time HDR color image 2290 via interface 3090. In one embodiment, dual-to-triple HDR instructions 3040 include disparity-based dual-to-triple instructions 3042 that, upon execution by processor 3010, perform method 2600. In another embodiment, dual-to-triple HDR instructions 3040 include fusion-based dual-to-triple instructions 3044 that, upon execution by processor 3010, perform method 2700.

Without departing from the scope hereof, machine-readable instructions 3030 may be provided as a stand-alone software product configured for implementation on a third-party computer that has (a) a non-transitory memory for storage of machine-readable instructions 3030 and (b) a processor for execution of machine-readable instructions 3030.

Changes may be made in the above devices, systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present devices, systems, and methods, which, as a matter of language, might be said to fall therebetween.

The invention claimed is:

1. A method for generating a motion-compensated high-dynamic-range (HDR) color image from a dual-exposure-time single-shot HDR color image sensor, comprising:
   obtaining pixel values generated by a local region of respective sensor pixels of the dual-exposure-time single-shot HDR color image sensor, the local region corresponding to position of an image pixel of the motion-compensated HDR color image, the sensor pixels of the local region including, for each of three different colors, a plurality of short-exposure-time pixels and a plurality of long-exposure-time pixels sensitive to the respective color;
   selecting a first color based upon an evaluation of luminance of each of the colors in the local region;
   determining a motion parameter for the local region from the pixel values of the short-exposure-time pixels and the long-exposure-time pixels associated with the first color; and
   demosaicing the pixel values of the local region to determine, for each color, an output value of the image pixel from the short-exposure-time pixels and the long-exposure-time pixels, relative contributions of the short-exposure-time pixels and the long-exposure-time pixels to the output value being weighted according to the motion parameter.

2. The method of claim 1, further comprising for each image pixel of the motion-compensated HDR color image to be generated:
   after obtaining pixel values generated by a local region of respective sensor pixels of the dual-exposure-time single-shot HDR color image sensor, for each color:
   evaluating if motion compensation is possible and/or necessary, and
   generating an output value for the image pixel associated with the color, said generating including:
   (i) when motion compensation is possible and/or necessary, performing the steps of determining the motion parameter and demosaicing to determine, with motion-compensation and for the color, the output value of the image pixel, and
   (ii) when motion compensation is not possible and/or unnecessary, performing non-motion-compensated demosaicing to determine, for the color, the output value of the image pixel.

3. The method of claim 2, the step of evaluating if motion compensation is possible and/or necessary comprising determining that motion compensation is possible and/or necessary only when:
   (a) the pixel values of the long-exposure-time pixels of the local region and associated with the color meet a below-saturation criterion;
   (b) if the color is different from the first color, the pixel values of the long-exposure-time pixels of the local region and associated with the first color meet the below-saturation criterion; or
   (c) if the pixel values of the long-exposure-time pixels of the local region and associated with the first color meet the below-saturation criterion, disparity between the short-exposure-time pixels and long-exposure-time pixels of the local region and associated with the first color exceed a disparity threshold associated with sensor-noise-related pixel value variation.

4. The method of claim 3, the step of evaluating if motion compensation is possible and/or necessary further comprising:
   multiplying the pixel values of the short-exposure-time pixels, associated with the first color, with respective first fit weights according to a first model to determine a short-exposure-time first-color value for the image pixel;
   multiplying the pixel values of unsaturated ones of the long-exposure-time pixels associated with the first color with respective second fit weights according to a second model to determine a long-exposure-time first-color value for the image pixel; and
   calculating the disparity as absolute value of difference between the short-exposure-time first-color value and the long-exposure-time first-color value scaled to a common scale.

5. The method of claim 3, the step of evaluating if motion compensation is possible and/or necessary further comprising:
   estimating an expectation value of pixel value variation, associated with the image pixel and the first color, based upon a noise model for the dual-exposure-time single-shot HDR color image sensor; and
   computing the disparity threshold from the expectation value.

6. The method of claim 2, the step of obtaining comprising selecting the local region to produce the motion-compensated HDR color image at down-sampled resolution compared to the dual-exposure-time single-shot HDR color image sensor, or selecting the local region to produce the motion-compensated HDR color image at same resolution as the dual-exposure-time single-shot HDR color image sensor.

7. The method of claim 1, the step of determining the motion parameter comprising:
   multiplying the pixel values of the short-exposure-time pixels, associated with the first color, with respective first fit weights according to a first model to determine a short-exposure-time first-color value for the image pixel;
   multiplying the pixel values of unsaturated ones of the long-exposure-time pixels associated with the first color with respective second fit weights according to a second model to determine a long-exposure-time first-color value for the image pixel; and
   calculating a disparity between the short-exposure-time first-color value and the long-exposure-time first-color value to determine the motion parameter;
   wherein the first and second model are models of noise properties and/or saturation behavior of the dual-exposure-time single-shot HDR color image sensor.

8. The method of claim 1, the step of determining the motion parameter comprising:
   multiplying the pixel values of the short-exposure-time pixels, associated with the first color, with respective first fit weights according to a first model to determine a short-exposure-time first-color value for the image pixel;
   multiplying the pixel values of unsaturated ones of the long-exposure-time pixels associated with the first color with respective second fit weights according to a second model to determine a long-exposure-time first-color value for the image pixel; and calculating a disparity between the short-exposure-time first-color value and the long-exposure-time first-color value to determine the motion parameter;

wherein each of the first model and the second model is a two-dimensional polynomial function of sensor pixel location, and wherein output values of the two-dimensional polynomial function are the first fit weights or the second fit weights, respectively.

9. The method of claim 1, the step of demosaicing comprising:
   determining a short-exposure-time value for the image pixel based upon the short-exposure time pixels associated with the color;
   determining a long-exposure-time value for the image pixel based upon unsaturated ones of the long-exposure time pixels associated with the color; and
   calculating the output value as a weighted average of the short-exposure-time value and the long-exposure-time value, using the motion parameter as weight.

10. The method of claim 9, comprising:
    in the step of determining the motion parameter:
      (a) determining a short-exposure-time first-color value for the image pixel based upon the short-exposure time pixels of the first color,
      (b) determining a long-exposure-time first-color value for the image pixel based upon the long-exposure time pixels, and
      (c) calculating a disparity between the short-exposure-time first-color value with the long-exposure-time first-color value to determine the motion parameter; and
    in the step of demosaicing, for the first color, setting the short-exposure-time value for the image pixel to the short-exposure-time first-color value and setting the long-exposure-time value for the image pixel to the long-exposure-time first-color value.

11. The method of claim 9, comprising:
    in the step of determining the short-exposure-time value, multiplying the pixel values of the short-exposure-time pixels, associated with the color, with respective first fit weights according to a first model to determine the short-exposure-time value; and
    in the step of determining the long-exposure-time value, multiplying the pixel values of unsaturated ones of the long-exposure-time pixels, associated with the color, with respective second fit weights according to a second model to determine the long-exposure-time value;
    wherein the first and second model are models of noise properties and/or saturation behavior of the dual-exposure-time single-shot HDR color image sensor.

12. The method of claim 9, comprising
    in the step of determining the short-exposure-time value, multiplying the pixel values of the short-exposure-time pixels, associated with the color, with respective first fit weights according to a first model to determine the short-exposure-time value; and
    in the step of determining the long-exposure-time value, multiplying the pixel values of unsaturated ones of the long-exposure-time pixels, associated with the color, with respective second fit weights according to a second model to determine the long-exposure-time value;
    wherein each of the first model and the second model is a two-dimensional polynomial function of sensor pixel location.

13. The method of claim 12,
    for the first color, the two-dimensional polynomial function being a first-order polynomial, a second-order polynomial, or a third-order polynomial; and
    for each color different from the first color, the two-dimensional polynomial function being of lesser order than the two-dimensional polynomial used for the first color.

14. The method of claim 1, the step of determining the motion parameter comprising using, as the first color, the color associated with the greatest number of sensor pixels of the dual-exposure-time single-shot HDR color image sensor.

15. The method of claim 14, the three colors being red, green, and blue, the first color being green.

16. The method of claim 14, the first color being green, the remaining two of the three colors being different respective linear combinations of red, green, and blue.

17. The method of claim 1, further comprising using a square section of the dual-exposure-time single-shot HDR color image sensor defined by at least 5×5 adjacent sensor pixels as the local region.

18. The method of claim 17, further comprising using a zig-zag HDR image sensor as the dual-exposure-time single-shot HDR color image sensor.

19. The method of claim 1, further comprising, for each image pixel of the motion-compensated HDR color image:
    performing the step of obtaining; and
    generating an output value for each of the three different colors, said generating including:
    (i) for the first color:
      (a) when the long-exposure-time pixels associated with the first color meet a below-saturation criterion:
        (1) computing disparity between short-exposure-time pixels and long-exposure-time pixels of the local region and associated with the first color,
        (2) computing a disparity threshold from an expectation value of pixel value variation associated with the image pixel and the first color,
        (3) when the disparity exceeds the disparity threshold, performing the step of determining the motion parameter and the step of demosaicing for the first color to determine, with motion-compensation, the output value of the image pixel associated with the first color, and
        (4) when the disparity does not exceed the disparity threshold, performing non-motion-compensated HDR demosaicing for the first color to determine, from a combination of the short-exposure-time pixels and the long-exposure-time pixels associated with the first color, the output value of the image pixel associated with the color, and
      (b) when the long-exposure-time pixels associated with the first color do not meet the below-saturation criterion, performing non-motion-compensated demosaicing for the first color to determine, from only the short-exposure-time pixels associated with the first color, the output value for the image pixel associated with the first color, and
    (ii) for each color different from the first color:
      (a) when the long-exposure-time pixels associated with the color and the first color meet the below-saturation criterion and the disparity exceeds the disparity threshold, performing the step of demosaicing for the color to determine, with motion-compensation, the output value of the image pixel associated with the color, (b) when the long-exposure-time pixels associated with the color and the first color meet the below-saturation criterion and the disparity does not exceed the disparity threshold, performing non-motion-compensated demosaicing for the color to determine, from a combination of the short-exposure-time pixels and the long-exposure-time pixels associated with the color, the output value of the image pixel associated with the color, and (c) when the long-exposure-time pixels associated with the color do not meet the below-saturation criterion or the long-exposure-time pixels associated with the first color do not meet the below-saturation criterion, performing non-motion-compensated demosaicing for the color to determine, from only the short-exposure-time pixels associated with the color, the output value for the image pixel associated with the color.

20. A computer program product for generating a motion-compensated high-dynamic-range (HDR) color image from a dual-exposure-time single-shot HDR color image sensor, comprising machine-readable instructions encoded in non-transitory memory, the instructions including:
  data selection instructions that, when executed by a processor, retrieve pixel values generated by a local region of respective sensor pixels of the dual-exposure-time single-shot HDR color image sensor, the local region corresponding to position of an image pixel of the motion-compensated HDR color image, the sensor pixels of the local region including, for each of three different colors, a plurality of short-exposure-time pixels and a plurality of long-exposure-time pixels sensitive to the respective color, and select a first color based upon an evaluation of luminance of each of the colors in the local region;
  motion instructions that, when executed by the processor, determine a motion parameter for the local region from the pixel values of the short-exposure-time pixels and the long-exposure-time pixels associated with the first color; and
  demosaicing instructions that, when executed by a processor, demosaic the pixel values of the local region to determine, for each color, an output value of the image pixel from the short-exposure-time pixels and the long-exposure-time pixels, relative contributions of the short-exposure-time pixels and the long-exposure-time pixels to the output value being weighted according to the motion parameter.

21. The computer program product of claim 20, further comprising:
  a model for pixel value variation originating from sensor noise within the local region;
  a fit weight function increasing with signal quality of the pixel value; and
  and in the motion instructions:
  fitting instructions that are invoked when the processor executes the motion instructions, to apply fit weights from the fit weight function, derived from the model for pixel value variation, to pixel values of the local region associated with the first color to determine, for the image pixel, a short-exposure-time first-color value and a long-exposure-time first-color value, and
  disparity instructions that that are invoked when the processor executes the motion instructions, to calculate a disparity between the short-exposure-time first-color value and the long-exposure-time first-color value to determine the motion parameter.

22. The computer program product of claim 21, the demosaicing instructions being configured to, when executed by the processor:
  for each color different from the first color, determine a short-exposure-time value for the image pixel based upon the short-exposure time pixels associated with the color, and determine a long-exposure-time value for the image pixel based upon unsaturated ones of the long-exposure time pixels associated with the color;
  for the first color, set the short-exposure-time value to the short-exposure-time first-color value, and set the long-exposure-time value to the long-exposure-time first-color value; and
  for each color, calculate the output value as a weighted average of the short-exposure-time value and the long-exposure-time value, using the motion parameter as weight.

23. The computer program product of claim 20, further comprising:
  a parameter storage encoded in non-transitory memory, the parameter storage including:
    a region size, and
    a step size; and
  in the instructions:
    sampling instructions that, when executed by the processor, commands execution, by the processor, of the data selection instructions for each image pixel of the motion-compensated HDR color image with (i) the local region sized according to the region size and (ii) center-to-center distance between local regions, corresponding to adjacent image pixels, set according to the step size, and
    master instructions that, when executed by the processor, generate, for each image pixel processed according to the sampling instructions, an output value for each of the colors, the master instructions being configured to apply the motion instructions and demosaicing instructions for image pixels associated with motion and long-exposure-time pixels meeting a below-saturation criterion.

24. The computer program product of claim 20, the instructions further including:
  non-motion-compensated demosaicing instructions that, when executed by the processor, perform non-motion-compensated demosaicing to determine an output value for an image pixel of the motion-compensated HDR color image and an associated color; and
  master instructions that, when executed by the processor and for each image pixel of the motion-compensated HDR color image:
    command execution, by the processor, of the data selection instructions;
    for each color associated with the image pixel, evaluate if motion compensation is possible and/or necessary,
    when motion compensation is a possible and/or necessary, command execution, by the processor, of the motion instructions and the demosaicing instructions to determine, with motion-compensation and for the color, the output value of the image pixel, and
    when motion compensation is not possible and/or unnecessary, command execution, by the processor, of the non-motion-compensated demosaicing instructions to determine, for the color, the output value of the image pixel.

25. The computer program product of claim 24, further comprising:

a parameter storage encoded in non-transitory memory, the parameter storage including:

a below-saturation criterion defining an upper acceptance limit for pixel values of long-exposure-time pixels, and a disparity threshold associated with sensor-noise-related pixel value variation and defining a minimum threshold for motion; and in the master instructions, evaluation instructions that, when executed by the processor, evaluate, for each image pixel and color, pixel values of the local region against the below-saturation criterion and the disparity threshold to determine if motion compensation is possible and/or necessary.

26. A motion-compensated high-dynamic-range (HDR) camera, comprising:

the computer program product of claim 20 stored on non-transitory memory, which is connected to a processor; and the dual-exposure-time single-shot HDR color image sensor for generating the pixel values processed by the product.

\* \* \* \* \*